(12) United States Patent  
Taylor et al.

(10) Patent No.: US 8,768,805 B2  
(45) Date of Patent: Jul. 1, 2014

(54) METHOD AND APPARATUS FOR HIGH-SPEED PROCESSING OF FINANCIAL MARKET DEPTH DATA

(75) Inventors: David E. Taylor, St. Louis, MO (US); Scott Parsons, St. Charles, MO (US); Jeremy Walter Whatley, Ballwin, MO (US); Richard Bradley, St. Louis, MO (US); Kwame Gyang, St. Louis, MO (US); Michael DeWulf, St. Louis, MO (US)

(73) Assignee: IP Reservoir, LLC, St. Louis, MO (US)

( * ) Notice: Subject to any disclaimer, the term of this patent is extended or adjusted under 35 U.S.C. 154(b) by 0 days.

(21) Appl. No.: 13/154,804

(22) Filed: Jun. 7, 2011

(65) Prior Publication Data  
US 2012/0089496 A1    Apr. 12, 2012

Related U.S. Application Data

(62) Division of application No. PCT/US2009/067935, filed on Dec. 14, 2009.

(60) Provisional application No. 61/122,673, filed on Dec. 15, 2008.

(51) Int. Cl.  
*G06Q 40/00* (2012.01)

(52) U.S. Cl.  
USPC .......................................... 705/35; 705/36 R

(58) Field of Classification Search  
USPC ..................................................... 705/35–40  
See application file for complete search history.

(56) References Cited

U.S. PATENT DOCUMENTS

| | | | |
|---|---|---|---|
| 2,046,381 | A | 7/1936 | Hicks et al. |
| 3,082,402 | A | 3/1963 | Scantlin |
| 3,296,597 | A | 1/1971 | Scantlin et al. |
| 3,573,747 | A | 4/1971 | Adams et al. |
| 3,581,072 | A | 5/1971 | Nymeyer |
| 3,601,808 | A | 8/1971 | Vlack |
| 3,611,314 | A | 10/1971 | Pritchard, Jr. et al. |
| 3,729,712 | A | 4/1973 | Glassman |
| 3,824,375 | A | 7/1974 | Gross et al. |
| 3,848,235 | A | 11/1974 | Lewis et al. |

(Continued)

FOREIGN PATENT DOCUMENTS

| | | |
|---|---|---|
| EP | 0573991 | 12/1993 |
| EP | 0880088 | 11/1996 |

(Continued)

OTHER PUBLICATIONS

Adachi, "Yoku Wakaru Kinyu Sakimono Torihiki" (guidance for financial futures trading), Nippon Jitsugyo Publishing, Aug. 30, 1997, pp. 113-115 and pp. 221-227.

(Continued)

*Primary Examiner* — Thu Thao Havan  
(74) *Attorney, Agent, or Firm* — Thompson Coburn LLP; Benjamin L. Volk, Jr.

(57) ABSTRACT

A variety of embodiments for hardware-accelerating the processing of financial market depth data are disclosed. A coprocessor, which may be resident in a ticker plant, can be configured to update order books based on financial market depth data at extremely low latency. Such a coprocessor can also be configured to enrich a stream of limit order events pertaining to financial instruments with data from a plurality of updated order books.

82 Claims, 17 Drawing Sheets

(56) References Cited

U.S. PATENT DOCUMENTS

| | | |
|---|---|---|
| 3,906,455 A | 9/1975 | Houston et al. |
| 4,044,334 A | 8/1977 | Bachman et al. |
| 4,081,607 A | 3/1978 | Vitols et al. |
| 4,298,898 A | 11/1981 | Cardot |
| 4,300,193 A | 11/1981 | Bradley et al. |
| 4,314,356 A | 2/1982 | Scarbrough |
| 4,385,393 A | 5/1983 | Chaure et al. |
| 4,412,287 A | 10/1983 | Braddock, III |
| 4,464,718 A | 8/1984 | Dixon et al. |
| 4,550,436 A | 10/1985 | Freeman et al. |
| 4,674,044 A | 6/1987 | Kalmus et al. |
| 4,823,306 A | 4/1989 | Barbic et al. |
| 4,903,201 A | 2/1990 | Wagner |
| 4,941,178 A | 7/1990 | Chuang |
| 5,023,910 A | 6/1991 | Thomson |
| 5,038,284 A | 8/1991 | Kramer |
| 5,050,075 A | 9/1991 | Herman et al. |
| 5,063,507 A | 11/1991 | Lindsey et al. |
| 5,077,665 A | 12/1991 | Silverman et al. |
| 5,101,353 A | 3/1992 | Lupien et al. |
| 5,101,424 A | 3/1992 | Clayton et al. |
| 5,126,936 A | 6/1992 | Champion et al. |
| 5,140,692 A | 8/1992 | Morita |
| 5,161,103 A | 11/1992 | Kosaka et al. |
| 5,163,131 A | 11/1992 | Row et al. |
| 5,179,626 A | 1/1993 | Thomson |
| 5,226,165 A | 7/1993 | Martin |
| 5,243,655 A | 9/1993 | Wang |
| 5,249,292 A | 9/1993 | Chiappa |
| 5,255,136 A | 10/1993 | Machado et al. |
| 5,258,908 A | 11/1993 | Hartheimer et al. |
| 5,265,065 A | 11/1993 | Turtle |
| 5,267,148 A | 11/1993 | Kosaka et al. |
| 5,270,922 A | 12/1993 | Higgins |
| 5,297,032 A | 3/1994 | Trojan et al. |
| 5,313,560 A | 5/1994 | Maruoka et al. |
| 5,315,634 A | 5/1994 | Tanaka et al. |
| 5,319,776 A | 6/1994 | Hile et al. |
| 5,327,521 A | 7/1994 | Savic et al. |
| 5,339,411 A | 8/1994 | Heaton, Jr. |
| 5,371,794 A | 12/1994 | Diffie et al. |
| 5,375,055 A | 12/1994 | Togher et al. |
| 5,388,259 A | 2/1995 | Fleischman et al. |
| 5,396,253 A | 3/1995 | Chia |
| 5,404,488 A | 4/1995 | Kerrigan et al. |
| 5,418,951 A | 5/1995 | Damashek |
| 5,432,822 A | 7/1995 | Kaewell, Jr. |
| 5,461,712 A | 10/1995 | Chelstowski et al. |
| 5,465,353 A | 11/1995 | Hull et al. |
| 5,481,735 A | 1/1996 | Mortensen et al. |
| 5,488,725 A | 1/1996 | Turtle et al. |
| 5,497,317 A | 3/1996 | Hawkins et al. |
| 5,497,488 A | 3/1996 | Akizawa et al. |
| 5,500,793 A | 3/1996 | Deming, Jr. et al. |
| 5,517,642 A | 5/1996 | Bezek et al. |
| 5,535,384 A | 7/1996 | Kasahara |
| 5,544,352 A | 8/1996 | Egger |
| 5,546,578 A | 8/1996 | Takada et al. |
| 5,596,569 A | 1/1997 | Madonna et al. |
| 5,619,574 A | 4/1997 | Johnson et al. |
| 5,651,125 A | 7/1997 | Witt et al. |
| 5,684,980 A | 11/1997 | Casselman |
| 5,701,464 A | 12/1997 | Aucsmith |
| 5,712,942 A | 1/1998 | Jennings et al. |
| 5,721,898 A | 2/1998 | Beardsley et al. |
| 5,740,244 A | 4/1998 | Indeck et al. |
| 5,740,466 A | 4/1998 | Geldman et al. |
| 5,774,835 A | 6/1998 | Ozawa et al. |
| 5,774,839 A | 6/1998 | Shlomot |
| 5,781,772 A | 7/1998 | Wilkinson, III et al. |
| 5,781,921 A | 7/1998 | Nichols |
| 5,802,290 A | 9/1998 | Casselman |
| 5,805,832 A | 9/1998 | Brown et al. |
| 5,809,483 A | 9/1998 | Broka et al. |
| 5,813,000 A | 9/1998 | Furlani |
| 5,819,273 A | 10/1998 | Vora et al. |
| 5,819,290 A | 10/1998 | Fujita et al. |
| 5,826,075 A | 10/1998 | Bealkowski et al. |
| 5,845,266 A | 12/1998 | Lupien et al. |
| 5,857,176 A | 1/1999 | Ginsberg |
| 5,864,738 A | 1/1999 | Kessler et al. |
| 5,870,730 A | 2/1999 | Furuya et al. |
| 5,873,071 A | 2/1999 | Ferstenberg et al. |
| 5,884,286 A | 3/1999 | Daughtery, III |
| 5,905,974 A | 5/1999 | Fraser et al. |
| 5,913,211 A | 6/1999 | Nitta |
| 5,930,753 A | 7/1999 | Potamianos et al. |
| 5,943,421 A | 8/1999 | Grabon |
| 5,943,429 A | 8/1999 | Händel |
| 5,950,196 A | 9/1999 | Pyreddy et al. |
| 5,963,923 A | 10/1999 | Garber |
| 5,978,801 A | 11/1999 | Yuasa |
| 5,987,432 A | 11/1999 | Zusman et al. |
| 5,991,881 A | 11/1999 | Conklin et al. |
| 5,995,963 A | 11/1999 | Nanba et al. |
| 6,006,264 A | 12/1999 | Colby et al. |
| 6,016,483 A | 1/2000 | Rickard et al. |
| 6,023,755 A | 2/2000 | Casselman |
| 6,023,760 A | 2/2000 | Karttunen |
| 6,028,939 A | 2/2000 | Yin |
| 6,044,407 A | 3/2000 | Jones et al. |
| 6,058,391 A | 5/2000 | Gardner |
| 6,061,662 A | 5/2000 | Makivic |
| 6,064,739 A | 5/2000 | Davis |
| 6,067,569 A | 5/2000 | Khaki et al. |
| 6,070,172 A | 5/2000 | Lowe |
| 6,073,160 A | 6/2000 | Grantham et al. |
| 6,084,584 A | 7/2000 | Nahi et al. |
| 6,105,067 A | 8/2000 | Batra |
| 6,134,551 A | 10/2000 | Aucsmith |
| 6,138,176 A | 10/2000 | McDonald et al. |
| RE36,946 E | 11/2000 | Diffie et al. |
| 6,147,976 A | 11/2000 | Shand et al. |
| 6,169,969 B1 | 1/2001 | Cohen |
| 6,173,270 B1 | 1/2001 | Cristofich et al. |
| 6,173,276 B1 | 1/2001 | Kant et al. |
| 6,178,494 B1 | 1/2001 | Casselman |
| 6,195,024 B1 | 2/2001 | Fallon |
| 6,226,676 B1 | 5/2001 | Crump et al. |
| 6,236,980 B1 | 5/2001 | Reese |
| 6,263,321 B1 | 7/2001 | Daughtery, III |
| 6,272,616 B1 | 8/2001 | Fernando et al. |
| 6,278,982 B1 | 8/2001 | Korhammer et al. |
| 6,279,113 B1 | 8/2001 | Vaidya |
| 6,279,140 B1 | 8/2001 | Slane |
| 6,289,440 B1 | 9/2001 | Casselman |
| 6,295,530 B1 | 9/2001 | Ritchie et al. |
| 6,304,858 B1 | 10/2001 | Mosler et al. |
| 6,309,424 B1 | 10/2001 | Fallon |
| 6,317,728 B1 | 11/2001 | Kane |
| 6,317,795 B1 | 11/2001 | Malkin et al. |
| 6,321,258 B1 | 11/2001 | Stollfus et al. |
| 6,336,150 B1 | 1/2002 | Ellis et al. |
| 6,339,819 B1 | 1/2002 | Huppenthal et al. |
| 6,370,592 B1 | 4/2002 | Kumpf |
| 6,370,645 B1 | 4/2002 | Lee |
| 6,377,942 B1 | 4/2002 | Hinsley et al. |
| 6,397,259 B1 | 5/2002 | Lincke et al. |
| 6,397,335 B1 | 5/2002 | Franczek et al. |
| 6,412,000 B1 | 6/2002 | Riddle et al. |
| 6,415,269 B1 | 7/2002 | Dinwoodie |
| 6,418,419 B1 | 7/2002 | Nieboer et al. |
| 6,430,272 B1 | 8/2002 | Maruyama et al. |
| 6,456,982 B1 | 9/2002 | Pilipovic |
| 6,463,474 B1 | 10/2002 | Fuh et al. |
| 6,499,107 B1 | 12/2002 | Gleichauf et al. |
| 6,535,868 B1 | 3/2003 | Galeazzi et al. |
| 6,546,375 B1 | 4/2003 | Pang et al. |
| 6,578,147 B1 | 6/2003 | Shanklin et al. |
| 6,581,098 B1 | 6/2003 | Kumpf |
| 6,594,643 B1 | 7/2003 | Freeny, Jr. |
| 6,597,812 B1 | 7/2003 | Fallon et al. |
| 6,601,094 B1 | 7/2003 | Mentze et al. |
| 6,601,104 B1 | 7/2003 | Fallon |

(56) References Cited

U.S. PATENT DOCUMENTS

| | | |
|---|---|---|
| 6,604,158 B1 | 8/2003 | Fallon |
| 6,624,761 B2 | 9/2003 | Fallon |
| 6,625,150 B1 | 9/2003 | Yu |
| 6,691,301 B2 | 2/2004 | Bowen |
| 6,704,816 B1 | 3/2004 | Burke |
| 6,711,558 B1 | 3/2004 | Indeck et al. |
| 6,765,918 B1 | 7/2004 | Dixon et al. |
| 6,766,304 B2 | 7/2004 | Kemp, II et al. |
| 6,772,132 B1 | 8/2004 | Kemp, II et al. |
| 6,772,136 B2 | 8/2004 | Kant et al. |
| 6,772,345 B1 | 8/2004 | Shetty |
| 6,778,968 B1 | 8/2004 | Gulati |
| 6,785,677 B1 | 8/2004 | Fritchman |
| 6,804,667 B1 | 10/2004 | Martin |
| 6,807,156 B1 | 10/2004 | Veres et al. |
| 6,820,129 B1 | 11/2004 | Courey, Jr. |
| 6,839,686 B1 | 1/2005 | Galant |
| 6,847,645 B1 | 1/2005 | Potter et al. |
| 6,850,906 B1 | 2/2005 | Chadha et al. |
| 6,877,044 B2 | 4/2005 | Lo et al. |
| 6,886,103 B1 | 4/2005 | Brustoloni et al. |
| 6,901,461 B2 | 5/2005 | Bennett |
| 6,931,408 B2 | 8/2005 | Adams et al. |
| 6,944,168 B2 | 9/2005 | Paatela et al. |
| 6,978,223 B2 | 12/2005 | Milliken |
| 6,981,054 B1 | 12/2005 | Krishna |
| 7,003,488 B2 | 2/2006 | Dunne et al. |
| 7,024,384 B2 | 4/2006 | Daughtery, III |
| 7,046,848 B1 | 5/2006 | Olcott |
| 7,058,735 B2 | 6/2006 | Spencer |
| 7,065,475 B1 | 6/2006 | Brundobler |
| 7,089,206 B2 | 8/2006 | Martin |
| 7,093,023 B2 | 8/2006 | Lockwood et al. |
| 7,099,838 B1 | 8/2006 | Gastineau et al. |
| 7,103,569 B1 | 9/2006 | Groveman et al. |
| 7,117,280 B2 | 10/2006 | Vasudevan |
| 7,124,106 B1 | 10/2006 | Stallaert et al. |
| 7,127,424 B2 | 10/2006 | Kemp, II et al. |
| 7,130,913 B2 | 10/2006 | Fallon |
| 7,139,743 B2 | 11/2006 | Indeck et al. |
| 7,149,715 B2 | 12/2006 | Browne et al. |
| 7,161,506 B2 | 1/2007 | Fallon |
| 7,167,980 B2 | 1/2007 | Chiu |
| 7,177,833 B1 | 2/2007 | Marynowski et al. |
| 7,181,437 B2 | 2/2007 | Indeck et al. |
| 7,181,608 B2 | 2/2007 | Fallon et al. |
| 7,212,998 B1 | 5/2007 | Muller et al. |
| 7,222,114 B1 | 5/2007 | Chan et al. |
| 7,224,185 B2 | 5/2007 | Campbell et al. |
| 7,225,188 B1 | 5/2007 | Gai et al. |
| 7,228,289 B2 | 6/2007 | Brumfield et al. |
| 7,249,118 B2 | 7/2007 | Sandler et al. |
| 7,251,629 B1 | 7/2007 | Marynowski et al. |
| 7,257,842 B2 | 8/2007 | Barton et al. |
| 7,277,887 B1 | 10/2007 | Burrows et al. |
| 7,287,037 B2 | 10/2007 | An et al. |
| 7,305,383 B1 | 12/2007 | Kubesh et al. |
| 7,305,391 B2 | 12/2007 | Wyschogrod et al. |
| 7,321,937 B2 | 1/2008 | Fallon |
| 7,356,498 B2 | 4/2008 | Kaminsky et al. |
| 7,363,277 B1 | 4/2008 | Dutta et al. |
| 7,378,992 B2 | 5/2008 | Fallon |
| 7,386,046 B2 | 6/2008 | Fallon et al. |
| 7,406,444 B2 | 7/2008 | Eng et al. |
| 7,411,957 B2 | 8/2008 | Stacy et al. |
| 7,417,568 B2 | 8/2008 | Fallon et al. |
| 7,454,418 B1 | 11/2008 | Wang |
| 7,457,834 B2 | 11/2008 | Jung et al. |
| 7,461,064 B2 | 12/2008 | Fontoura et al. |
| 7,478,431 B1 | 1/2009 | Nachenberg |
| 7,487,327 B1 | 2/2009 | Chang et al. |
| 7,496,108 B2 | 2/2009 | Biran et al. |
| 7,558,753 B2 | 7/2009 | Neubert et al. |
| 7,558,925 B2 | 7/2009 | Bouchard et al. |
| 7,565,525 B2 | 7/2009 | Vorbach et al. |
| 7,580,719 B2 | 8/2009 | Karmarkar |
| 7,587,476 B2 | 9/2009 | Sato |
| 7,603,303 B1 | 10/2009 | Kraus et al. |
| 7,617,291 B2 | 11/2009 | Fan et al. |
| 7,636,703 B2 | 12/2009 | Taylor |
| 7,660,761 B2 | 2/2010 | Zhou et al. |
| 7,668,849 B1 | 2/2010 | Narancic et al. |
| 7,685,121 B2 | 3/2010 | Brown et al. |
| 7,701,945 B2 | 4/2010 | Roesch et al. |
| 7,714,747 B2 | 5/2010 | Fallon |
| 7,761,459 B1 | 7/2010 | Zhang et al. |
| 7,788,293 B2 | 8/2010 | Pasztor et al. |
| 7,840,482 B2 | 11/2010 | Singla et al. |
| 7,856,545 B2 | 12/2010 | Casselman |
| 7,856,546 B2 | 12/2010 | Casselman et al. |
| 7,908,213 B2 | 3/2011 | Monroe et al. |
| 7,908,259 B2 | 3/2011 | Branscome et al. |
| 7,917,299 B2 | 3/2011 | Buhler et al. |
| 7,921,046 B2 | 4/2011 | Parsons et al. |
| 7,945,528 B2 | 5/2011 | Cytron et al. |
| 7,949,650 B2 | 5/2011 | Indeck et al. |
| 7,953,743 B2 | 5/2011 | Indeck et al. |
| 7,954,114 B2 | 5/2011 | Chamberlain et al. |
| 7,991,667 B2 | 8/2011 | Kraus et al. |
| 8,015,099 B2 | 9/2011 | Reid |
| 8,024,253 B2 | 9/2011 | Peterffy et al. |
| 8,027,893 B1 | 9/2011 | Burrows et al. |
| 8,032,440 B1 | 10/2011 | Hait |
| 8,046,283 B2 | 10/2011 | Burns et al. |
| 8,069,102 B2 | 11/2011 | Indeck et al. |
| 8,073,763 B1 | 12/2011 | Merrin et al. |
| 8,095,508 B2 | 1/2012 | Chamberlain et al. |
| 8,131,697 B2 | 3/2012 | Indeck et al. |
| 8,140,416 B2 | 3/2012 | Borkovec et al. |
| 8,156,101 B2 | 4/2012 | Indeck et al. |
| 8,407,122 B2 | 3/2013 | Parsons et al. |
| 8,458,081 B2 | 6/2013 | Parsons et al. |
| 8,478,680 B2 | 7/2013 | Parsons et al. |
| 8,515,682 B2 | 8/2013 | Buhler et al. |
| 8,549,024 B2 | 10/2013 | Indeck et al. |
| 8,595,104 B2 | 11/2013 | Parsons et al. |
| 8,600,856 B2 | 12/2013 | Parsons et al. |
| 8,620,881 B2 | 12/2013 | Chamberlain et al. |
| 8,626,624 B2 | 1/2014 | Parsons et al. |
| 2001/0013048 A1 | 8/2001 | Imbert de Tremiolles et al. |
| 2001/0042040 A1 | 11/2001 | Keith |
| 2001/0047473 A1 | 11/2001 | Fallon |
| 2001/0056547 A1 | 12/2001 | Dixon |
| 2002/0010825 A1 | 1/2002 | Wilson |
| 2002/0019812 A1 | 2/2002 | Board et al. |
| 2002/0023010 A1 | 2/2002 | Rittmaster et al. |
| 2002/0069375 A1 | 6/2002 | Bowen |
| 2002/0072893 A1 | 6/2002 | Wilson |
| 2002/0080871 A1 | 6/2002 | Fallon et al. |
| 2002/0082967 A1 | 6/2002 | Kaminsky et al. |
| 2002/0100029 A1 | 7/2002 | Bowen |
| 2002/0101425 A1 | 8/2002 | Hamid |
| 2002/0105911 A1 | 8/2002 | Pruthi et al. |
| 2002/0129140 A1 | 9/2002 | Peled et al. |
| 2002/0138376 A1 | 9/2002 | Hinkle |
| 2002/0143521 A1 | 10/2002 | Call |
| 2002/0150248 A1 | 10/2002 | Kovacevic |
| 2002/0156998 A1 | 10/2002 | Casselman |
| 2002/0162025 A1 | 10/2002 | Sutton et al. |
| 2002/0166063 A1 | 11/2002 | Lachman et al. |
| 2002/0169873 A1 | 11/2002 | Zodnik |
| 2002/0180742 A1 | 12/2002 | Hamid |
| 2002/0199173 A1 | 12/2002 | Bowen |
| 2003/0009411 A1 | 1/2003 | Ram et al. |
| 2003/0009693 A1 | 1/2003 | Brock et al. |
| 2003/0014521 A1 | 1/2003 | Elson et al. |
| 2003/0014662 A1 | 1/2003 | Gupta et al. |
| 2003/0018630 A1 | 1/2003 | Indeck et al. |
| 2003/0023653 A1 | 1/2003 | Dunlop et al. |
| 2003/0023876 A1 | 1/2003 | Bardsley et al. |
| 2003/0028408 A1 | 2/2003 | RuDusky |
| 2003/0028690 A1 | 2/2003 | Appleby-Alis et al. |
| 2003/0028864 A1 | 2/2003 | Bowen |
| 2003/0033234 A1 | 2/2003 | RuDusky |

(56) References Cited

U.S. PATENT DOCUMENTS

| | | |
|---|---|---|
| 2003/0033240 A1 | 2/2003 | Balson et al. |
| 2003/0033450 A1 | 2/2003 | Appleby-Alis |
| 2003/0033514 A1 | 2/2003 | Appleby-Allis et al. |
| 2003/0033588 A1 | 2/2003 | Alexander |
| 2003/0033594 A1 | 2/2003 | Bowen |
| 2003/0035547 A1 | 2/2003 | Newton |
| 2003/0037037 A1 | 2/2003 | Adams et al. |
| 2003/0037321 A1 | 2/2003 | Bowen |
| 2003/0041129 A1 | 2/2003 | Appleby-Allis |
| 2003/0043805 A1 | 3/2003 | Graham et al. |
| 2003/0046668 A1 | 3/2003 | Bowen |
| 2003/0051043 A1 | 3/2003 | Wyschogrod et al. |
| 2003/0055658 A1 | 3/2003 | RuDusky |
| 2003/0055769 A1 | 3/2003 | RuDusky |
| 2003/0055770 A1 | 3/2003 | RuDusky |
| 2003/0055771 A1 | 3/2003 | RuDusky |
| 2003/0055777 A1 | 3/2003 | Ginsberg |
| 2003/0061409 A1 | 3/2003 | RuDusky |
| 2003/0065607 A1 | 4/2003 | Satchwell |
| 2003/0065943 A1 | 4/2003 | Geis et al. |
| 2003/0074177 A1 | 4/2003 | Bowen |
| 2003/0074582 A1 | 4/2003 | Patel et al. |
| 2003/0078865 A1 | 4/2003 | Lee |
| 2003/0079060 A1 | 4/2003 | Dunlop |
| 2003/0093343 A1 | 5/2003 | Huttenlocher et al. |
| 2003/0093347 A1 | 5/2003 | Gray |
| 2003/0097481 A1 | 5/2003 | Richter |
| 2003/0099254 A1 | 5/2003 | Richter |
| 2003/0105620 A1 | 6/2003 | Bowen |
| 2003/0105721 A1 | 6/2003 | Ginter et al. |
| 2003/0110229 A1 | 6/2003 | Kulig et al. |
| 2003/0115485 A1 | 6/2003 | Milliken |
| 2003/0117971 A1 | 6/2003 | Aubury |
| 2003/0120460 A1 | 6/2003 | Aubury |
| 2003/0121010 A1 | 6/2003 | Aubury |
| 2003/0126065 A1 | 7/2003 | Eng et al. |
| 2003/0140337 A1 | 7/2003 | Aubury |
| 2003/0154368 A1 | 8/2003 | Stevens et al. |
| 2003/0163715 A1 | 8/2003 | Wong |
| 2003/0177253 A1 | 9/2003 | Schuehler et al. |
| 2003/0184593 A1 | 10/2003 | Dunlop |
| 2003/0187662 A1 | 10/2003 | Wilson |
| 2003/0191876 A1 | 10/2003 | Fallon |
| 2003/0208430 A1 | 11/2003 | Gershon |
| 2003/0221013 A1 | 11/2003 | Lockwood et al. |
| 2003/0233302 A1 | 12/2003 | Weber et al. |
| 2004/0000928 A1 | 1/2004 | Cheng et al. |
| 2004/0015502 A1 | 1/2004 | Alexander et al. |
| 2004/0015633 A1 | 1/2004 | Smith |
| 2004/0019703 A1 | 1/2004 | Burton |
| 2004/0028047 A1 | 2/2004 | Hou et al. |
| 2004/0034587 A1 | 2/2004 | Amberson et al. |
| 2004/0049596 A1 | 3/2004 | Schuehler et al. |
| 2004/0059666 A1 | 3/2004 | Waelbroeck et al. |
| 2004/0064737 A1 | 4/2004 | Milliken et al. |
| 2004/0111632 A1 | 6/2004 | Halperin |
| 2004/0162826 A1 | 8/2004 | Wyschogrod et al. |
| 2004/0170070 A1 | 9/2004 | Rapp et al. |
| 2004/0177340 A1 | 9/2004 | Hsu et al. |
| 2004/0186804 A1 | 9/2004 | Chakraborty et al. |
| 2004/0186814 A1 | 9/2004 | Chalermkraivuth et al. |
| 2004/0199448 A1 | 10/2004 | Chalermkraivuth et al. |
| 2004/0199452 A1 | 10/2004 | Johnston et al. |
| 2004/0205149 A1 | 10/2004 | Dillon et al. |
| 2005/0005145 A1 | 1/2005 | Teixeira |
| 2005/0027634 A1 | 2/2005 | Gershon |
| 2005/0033672 A1 | 2/2005 | Lasry et al. |
| 2005/0044344 A1 | 2/2005 | Stevens |
| 2005/0080649 A1 | 4/2005 | Alvarez et al. |
| 2005/0086520 A1 | 4/2005 | Dharmapurikar et al. |
| 2005/0091142 A1 | 4/2005 | Renton et al. |
| 2005/0097027 A1 | 5/2005 | Kavanaugh |
| 2005/0131790 A1 | 6/2005 | Benzschawel et al. |
| 2005/0135608 A1 | 6/2005 | Zheng |
| 2005/0187844 A1 | 8/2005 | Chalermkraivuth et al. |
| 2005/0187845 A1 | 8/2005 | Eklund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |
| 2005/0195832 A1 | 9/2005 | Dharmapurikar et al. |
| 2005/0197938 A1 | 9/2005 | Davie et al. |
| 2005/0197939 A1 | 9/2005 | Davie et al. |
| 2005/0197948 A1 | 9/2005 | Davie et al. |
| 2005/0216384 A1 | 9/2005 | Partlow et al. |
| 2005/0229254 A1 | 10/2005 | Singh et al. |
| 2005/0240510 A1 | 10/2005 | Schweickert et al. |
| 2005/0243824 A1 | 11/2005 | Abbazia et al. |
| 2005/0267836 A1 | 12/2005 | Crosthwaite et al. |
| 2005/0283423 A1 | 12/2005 | Moser et al. |
| 2005/0283743 A1 | 12/2005 | Mulholland et al. |
| 2006/0020536 A1 | 1/2006 | Renton et al. |
| 2006/0020715 A1 | 1/2006 | Jungck |
| 2006/0026090 A1 | 2/2006 | Balabon |
| 2006/0031154 A1 | 2/2006 | Noviello et al. |
| 2006/0031156 A1 | 2/2006 | Noviello et al. |
| 2006/0047636 A1 | 3/2006 | Mohania et al. |
| 2006/0053295 A1 | 3/2006 | Madhusudan et al. |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0059083 A1 | 3/2006 | Friesen et al. |
| 2006/0129745 A1 | 6/2006 | Thiel et al. |
| 2006/0143099 A1 | 6/2006 | Partlow et al. |
| 2006/0242123 A1 | 10/2006 | Williams, Jr. |
| 2006/0259407 A1 | 11/2006 | Rosenthal et al. |
| 2006/0259417 A1 | 11/2006 | Marynowski et al. |
| 2006/0269148 A1 | 11/2006 | Farber et al. |
| 2006/0282369 A1 | 12/2006 | White |
| 2006/0294059 A1 | 12/2006 | Chamberlain et al. |
| 2007/0011183 A1 | 1/2007 | Langseth et al. |
| 2007/0011687 A1 | 1/2007 | Ilik et al. |
| 2007/0061231 A1 | 3/2007 | Kim-E |
| 2007/0061241 A1 | 3/2007 | Jovanovic et al. |
| 2007/0067108 A1 | 3/2007 | Buhler et al. |
| 2007/0067481 A1 | 3/2007 | Sharma et al. |
| 2007/0078837 A1 | 4/2007 | Indeck et al. |
| 2007/0094199 A1 | 4/2007 | Deshpande et al. |
| 2007/0112837 A1 | 5/2007 | Houh et al. |
| 2007/0118457 A1 | 5/2007 | Peterffy et al. |
| 2007/0118500 A1 | 5/2007 | Indeck et al. |
| 2007/0130140 A1 | 6/2007 | Cytron et al. |
| 2007/0156574 A1 | 7/2007 | Marynowski et al. |
| 2007/0174841 A1 | 7/2007 | Chamberlain et al. |
| 2007/0179935 A1 | 8/2007 | Lee et al. |
| 2007/0209068 A1 | 9/2007 | Ansari et al. |
| 2007/0237327 A1 | 10/2007 | Taylor et al. |
| 2007/0244859 A1 | 10/2007 | Trippe et al. |
| 2007/0260602 A1 | 11/2007 | Taylor |
| 2007/0277036 A1 | 11/2007 | Chamberlain et al. |
| 2007/0294157 A1 | 12/2007 | Singla et al. |
| 2007/0294162 A1 | 12/2007 | Borkovec |
| 2008/0082502 A1 | 4/2008 | Gupta |
| 2008/0084573 A1 | 4/2008 | Horowitz et al. |
| 2008/0086274 A1 | 4/2008 | Chamberlain et al. |
| 2008/0097893 A1 | 4/2008 | Walsky et al. |
| 2008/0104542 A1 | 5/2008 | Cohen et al. |
| 2008/0109413 A1 | 5/2008 | Indeck et al. |
| 2008/0114724 A1 | 5/2008 | Indeck et al. |
| 2008/0114725 A1 | 5/2008 | Indeck et al. |
| 2008/0114760 A1 | 5/2008 | Indeck et al. |
| 2008/0126320 A1 | 5/2008 | Indeck et al. |
| 2008/0133453 A1 | 6/2008 | Indeck et al. |
| 2008/0133519 A1 | 6/2008 | Indeck et al. |
| 2008/0189251 A1 | 8/2008 | Branscome et al. |
| 2008/0275805 A1 | 11/2008 | Hecht |
| 2009/0076981 A1* | 3/2009 | Schonberg .................. 705/36 R |
| 2009/0182683 A1 | 7/2009 | Taylor et al. |
| 2009/0262741 A1 | 10/2009 | Jungck et al. |
| 2009/0287628 A1 | 11/2009 | Indeck et al. |
| 2010/0005036 A1 | 1/2010 | Kraus et al. |

(56) References Cited

U.S. PATENT DOCUMENTS

| | | |
|---|---|---|
| 2011/0066832 A1 | 3/2011 | Casselman et al. |
| 2011/0125960 A1 | 5/2011 | Casselman |
| 2011/0178911 A1 | 7/2011 | Parsons et al. |
| 2011/0178912 A1 | 7/2011 | Parsons et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179050 A1 | 7/2011 | Parsons et al. |
| 2011/0184844 A1 | 7/2011 | Parsons et al. |
| 2011/0199243 A1 | 8/2011 | Fallon et al. |
| 2011/0231446 A1 | 9/2011 | Buhler et al. |
| 2011/0246353 A1 | 10/2011 | Kraus et al. |
| 2011/0252008 A1 | 10/2011 | Chamberlain et al. |
| 2011/0295967 A1 | 12/2011 | Wang et al. |
| 2012/0089497 A1 | 4/2012 | Taylor et al. |
| 2012/0095893 A1 | 4/2012 | Taylor et al. |
| 2012/0109849 A1 | 5/2012 | Chamberlain et al. |
| 2012/0110316 A1 | 5/2012 | Chamberlain et al. |
| 2012/0116998 A1 | 5/2012 | Indeck et al. |
| 2012/0130922 A1 | 5/2012 | Indeck et al. |
| 2012/0179590 A1 | 7/2012 | Borkovec et al. |
| 2012/0215801 A1 | 8/2012 | Indeck et al. |
| 2012/0246052 A1 | 9/2012 | Taylor et al. |
| 2013/0290163 A1 | 10/2013 | Parsons et al. |

FOREIGN PATENT DOCUMENTS

| | | | |
|---|---|---|---|
| EP | 0851358 | A | 7/1998 |
| EP | 0887723 | | 12/1998 |
| EP | 0911738 | A | 4/1999 |
| JP | 09145544 | A | 6/1997 |
| JP | 11-259559 | A | 9/1999 |
| JP | 11316765 | A | 11/1999 |
| JP | 2000286715 | A | 10/2000 |
| JP | 2001268071 | A | 9/2001 |
| JP | 2001283000 | A | 10/2001 |
| JP | 2002101089 | A | 4/2002 |
| JP | 2002269343 | A | 9/2002 |
| JP | 2003-036360 | A | 2/2003 |
| JP | 2003256660 | A | 9/2003 |
| JP | 4180644 | B1 | 11/2008 |
| WO | 9010910 | | 9/1990 |
| WO | 9409443 | A1 | 4/1994 |
| WO | 9737735 | | 10/1997 |
| WO | 0041136 | A1 | 7/2000 |
| WO | 0122425 | A | 3/2001 |
| WO | 0135216 | A2 | 5/2001 |
| WO | 0172106 | A2 | 10/2001 |
| WO | 0180082 | A2 | 10/2001 |
| WO | 0180558 | | 10/2001 |
| WO | 0190890 | A1 | 11/2001 |
| WO | 02061525 | | 8/2002 |
| WO | 03100650 | | 4/2003 |
| WO | 03036845 | | 5/2003 |
| WO | 03100662 | | 12/2003 |
| WO | 2004017604 | | 2/2004 |
| WO | 2004042560 | A | 5/2004 |
| WO | 2004042561 | A | 5/2004 |
| WO | 2004042562 | | 5/2004 |
| WO | 2004042574 | A | 5/2004 |
| WO | 2005017708 | A | 2/2005 |
| WO | 2005026925 | | 3/2005 |
| WO | 2005048134 | A | 5/2005 |
| WO | 2006023948 | | 3/2006 |
| WO | 2006096324 | | 9/2006 |
| WO | 2007064685 | | 6/2007 |
| WO | 2007/074903 | A1 | 7/2007 |
| WO | 2007087507 | | 8/2007 |
| WO | 2007/127336 | A2 | 11/2007 |
| WO | 2008022036 | | 2/2008 |
| WO | 2009089467 | A2 | 7/2009 |
| WO | 2009140363 | A1 | 11/2009 |
| WO | 2010/077829 | | 7/2010 |

OTHER PUBLICATIONS

Baker et al., "Time and Area Efficient Pattern Matching on FPGAs", ACM, Feb. 22-24, 2004, pp. 223-232.

Gokhale et al., "Reconfigurable Computing: Accelerating Computation with Field-Programmable Gate Arrays", Springer, 2005, pp. 1-54, 92-96.

Howe, Data Analysis for Database Design Third Edition, 2001, 335 pages, Butterworth-Heinemann.

Prosecution History for U.S. Appl. No. 13/077,036, filed Mar. 31, 2011 (Parsons et al.).

Tau et al., "A First Generation DPGA Implementation", Third Canadian Workshop of Field-Programmable Devices, May 1995, pp. 138-143.

Prosecution History for U.S. Appl. No. 13/132,408, filed Dec. 21, 2011 (Taylor et al.).

Prosecution History for U.S. Appl. No. 13/154,824, filed Jun. 7, 2011 (Taylor et al.).

Lockwood, "An Open Platform for Development of Network Processing Modules in Reprogrammable Hardware", IEC DesignCon 2001, Santa Clara, CA Jan. 2001, Paper WB-19.

Lockwood, "Building Networks with Reprogrammable Hardware", Field Programmable Port Extender: Jan. 2002 Gigabit Workshop Tutorial, Washington University, St. Louis, MO, Jan. 3-4, 2002.

Lockwood, "Evolvable Internet Hardware Platforms", NASA/DoD Workshop on Evolvable Hardware (EHW'01), Long Beach, CA, Jul. 12-14, 2001, pp. 271-279.

Lockwood, "Hardware Laboratory Configuration", Field Programmable Port Extender: Jan. 2002 Gigabit Workshop Tutorial, Washington University, St. Louis, MO, Jan. 3-4, 2002.

Lockwood, "Introduction", Field Programmable Port Extender: Jan. 2002 Gigabit Workshop Tutorial, Washington University, St. Louis, MO, Jan. 3-4, 2002.

Lockwood, "Platform and Methodology for Teaching Design of Hardware Modules in Internet Routers and Firewalls", IEEE Computer Society International Conference on Microelectronic Systems Education (MSE'2001), Las Vegas, NV, Jun. 17-18, 2001, pp. 56-57.

Lockwood, "Protocol Processing on the FPX", Field Programmable Port Extender: Jan. 2002 Gigabit Workshop Tutorial, Washington University, St. Louis, MO, Jan. 3-4, 2002.

Lockwood, "Simulation and Synthesis", Field Programmable Port Extender: Jan. 2002 Gigabit Workshop Tutorial, Washington University, St. Louis, MO, Jan. 3-4, 2002.

Lockwood, "Simulation of the Hello World Application for the Field-Programmable Port Extender (FPX)", Washington University, Applied Research Lab, Spring 2001 Gigabits Kits Workshop.

Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.

Madhusudan, "Design of a System for Real-Time Worm Detection", Power Point Presentation in Support of Master's Thesis, Washington Univ., Dept. of Computer Science and Engineering, St. Louis, MO, Aug. 2004.

Mao et al., "Cluster-based Online Monitoring System of Web Traffic", Dept. of Computer Science and Technology, Tsinghua Univ., Bejing, 100084 P.R. China.

Minutes of the Oral Proceedings for EP Patent Application No. 03729000.4 dated Jul. 12, 2010.

Mosanya et al., "A FFGA-Based Hardware Implementation of Generalized Profile Search Using Online Arithmetic", ACM/Sigda International Symposium on Field Programmable Gate Arrays (FPGA '99), Feb. 21-23, 1999, pp. 101-111, Monterey, CA, USA.

Moscola et al., "FPGrep and FPSed: Regular Expression Search and Substitution for Packet Streaming in Field Programmable Hardware", Dept. of Computer Science, Applied Research Lab, Washington University, Jan. 8, 2002, unpublished, pp. 1-19, St. Louis, MO.

Moscola et al., "FPSed: A Streaming Content Search-and-Replace Module for an Internet Firewall", Proc. of Hot Interconnects, 11th Symposium on High Performance Interconnects, pp. 122-129, Aug. 20, 2003.

(56) References Cited

OTHER PUBLICATIONS

Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.

Motwani et al., "Randomized Algorithms", 1995, pp. 215-216, Cambridge University Press.

Mueller, "Upgrading and Repairing PCs, 15th Anniversary Edition", 2004, pp. 63-66, 188, Que.

Navarro, "A Guided Tour to Approximate String Matching", ACM Computing Surveys, vol. 33, No. 1, Mar. 2001, pp. 31-88.

Necker et al., "Tcp-Stream Reassembly and State Tracking in Hardware", School of Electrical and Computer Engineering, Georgia Institute of Technology, Atlanta, GA.

Notice of Allowance for U.S. Appl. No. 11/932,652 dated Jan. 19, 2011.

Nunez et al., "The X-MatchLITE FPGA-Based Data Compressor", Euromicro Conference 1999, Proceedings, Italy, Sep. 8-10, 1999, pp. 126-132, Los Alamitos, CA.

Nwodoh et al., "A Processing System for Real-Time Holographic Video Computation", Reconfigurable Technology: FPGAs for Computing and Application, Proceedings for the SPIE, Sep. 1999, Boston, pp. 129-140, vol. 3844.

Prakash et al., "OC-3072 Packet Classification Using BDDs and Pipelined SRAMs", Department of Electrical and Computer Engineering, The University of Texas at Austin.

Pramanik et al., "A Hardware Pattern Matching Algorithm on a Dataflow"; Computer Journal; Jul. 1, 1985; pp. 264-269; vol. 28, No. 3; Oxford University Press, Surrey, Great Britain.

Prosecution History for U.S. Appl. No. 13/076,968, filed Mar. 31, 2011 (Parsons et al.).

Ramakrishna et al., "A Performance Study of Hashing Functions for Hardware Applications", Int. Conf. on Computing and Information, May 1994, pp. 1621-1636, vol. 1, No. 1.

Ramakrishna et al., "Efficient Hardware Hashing Functions for High Performance Computers", IEEE Transactions on Computers, Dec. 1997, vol. 46, No. 12.

Ratha et al., "Convolution on Splash 2", Proceedings of IEEE Symposium on FPGAS for Custom Computing Machines, Apr. 19, 1995, pp. 204-213, Los Alamitos, California.

Roberts, "Internet Still Growing Dramatically Says Internet Founder", Press Release, Caspian Networks, Inc.—Virtual Pressroom.

Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.

Russ et al., Non-Intrusive Built-In Self-Test for FPGA and MCM Applications, Aug. 8-10, 1995, IEEE, 480-485.

Sachin Tandon, "A Programmable Architecture for Real-Time Derivative Trading", Master's Thesis, University of Edinburgh, 2003.

Schmerken, "With Hyperfeed Litigation Pending, Exegy Launches Low-Latency Ticker Plant", in Wall Street & Technology Blog, Mar. 20, 2007, pp. 1-2.

Schmit, "Incremental Reconfiguration for Pipelined Applications", FPGAs for Custom Computing Machines, Proceedings, The 5th Annual IEEE Symposium, Dept. of ECE, Carnegie Mellon University, Apr. 16-18, 1997, pp. 47-55, Pittsburgh, PA.

Schuehler et al., "Architecture for a Hardware Based, TCP/IP Content Scanning System", IEEE Micro, 24(1):62-69, Jan.-Feb. 2004, USA.

Schuehler et al., "TCP-Splitter: A TCP/IP Flow Monitor in Reconfigurable Hardware", Hot Interconnects 10 (Hotl-10), Stanford, CA, Aug. 21-23, 2002, pp. 127-131.

Seki et al., "High Speed Computation of Shogi With FPGA", Proceedings of 58th Convention Architecture, Software Science, Engineering, Mar. 9, 1999, pp. 1-133-1-134.

Shah, "Understanding Network Processors", Version 1.0, University of California-Berkeley, Sep. 4, 2001.

Shalunov et al., "Bulk TCP Use and Performance on Internet 2", ACM SIGCOMM Internet Measurement Workshop, 2001.

Shasha et al., "Database Tuning", 2003, pp. 280-284, Morgan Kaufmann Publishers.

Shirazi et al., "Quantitative Analysis of FPGA-based Database Searching", Journal of VLSI Signal Processing Systems for Signal, Image, and Video Technology, May 2001, pp. 85-96, vol. 28, No. 1/2, Kluwer Academic Publishers, Dordrecht, NL.

Sidhu et al., "Fast Regular Expression Matching Using FPGAs", IEEE Symposium on Field Programmable Custom Computing Machines (FCCM 2001), Apr. 2001.

Sidhu et al., "String Matching on Multicontext FPGAs Using Self-Reconfiguration", FPGA '99: Proceedings of the 1999 ACM/SIGDA 7th International Symposium on Field Programmable Gate Arrays, Feb. 1999, pp. 217-226.

Singh et al., "The EarlyBird System for Real-Time Detection on Unknown Worms", Technical report CS2003-0761, Aug. 2003.

Skiena et al., "Programming Challenges: The Programming Contest Training Manual", 2003, pp. 30-31, Springer.

Sourdis and Pnevmatikatos, "Fast, Large-Scale String Match for a 10Gbps FPGA-based Network Intrusion Detection System", 13th International Conference on Field Programmable Logic and Applications, 2003.

Steinbach et al., "A Comparison of Document Clustering Techniques", KDD Workshop on Text Mining, 2000.

Tan et al., "A High Throughput String Matching Architecture for Intrusion Detection and Prevention", ISCA 2005: 32nd Annual International Symposium on Computer Architecture, pp. 112-122, 2005.

Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.

Taylor et al., "Generalized RAD Module Interface Specification of the Field Programmable Port Extender (FPX) Version 2", Washington University, Department of Computer Science, Technical Report, Jul. 5, 2001, pp. 1-10.

Taylor et al., "Modular Design Techniques for the FPX", Field Programmable Port Extender: Jan. 2002 Gigabit Workshop Tutorial, Washington University, St. Louis, MO, Jan. 3-4, 2002.

Taylor et al., "Scalable Packet Classification using Distributed Crossproducting of Field Labels", Proceedings of IEEE Infocom, Mar. 2005, pp. 1-12, vol. 20, No. 1.

Taylor, "Models, Algorithms, and Architectures for Scalable Packet Classification", doctoral thesis, Department of Computer Science and Engineering, Washington University, St. Louis, MO, Aug. 2004, pp. 1-201.

Thomson Reuters, "Mellanox InfiniBand Accelerates the Exegy Ticker Plant at Major Exchanges", Jul. 22, 2008, URL: http://www.reuters.com/article/pressRelease/idUS125385+22-Jul-2008+BW20080722.

Uluski et al., "Characterizing Antivirus Workload Execution", SIGARCH Comput. Archit. News, vol. 33, No. 1, pp. 90-98, Mar. 2005.

Villasenor et al., "Configurable Computing Solutions for Automatic Target Recognition", FPGAS for Custom Computing Machines, 1996, Proceedings, IEEE Symposium on Napa Valley, CA, Apr. 17-19, 1996, pp. 70-79, 1996 IEEE, Napa Valley, CA, Los Alamitos, CA, USA.

Waldvogel et al., "Scalable High-Speed Prefix Matching", ACM Transactions on Computer Systems, Nov. 2001, pp. 440-482, vol. 19, No. 4.

Ward et al., "Dynamically Reconfigurable Computing: A Novel Computation Technology with Potential to Improve National Security Capabilities", May 15, 2003, A White Paper Prepared by Star Bridge Systems, Inc. [retrieved Dec. 12, 2006]. Retrieved from the Internet: <URL: http://www.starbridgesystems.com/resources/whitepapers/Dynamically%20Reconfigurable%20Computing.pdf.

Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.

(56) References Cited

OTHER PUBLICATIONS

Web-Pop (Professional Options Package) (www.pmpublishing.com).

West et al., "An FPGA-Based Search Engine for Unstructured Database", Proc. of 2nd Workshop on Application Specific Processors, Dec. 2003, San Diego, CA.

Wooster et al., "HTTPDUMP Network HTTP Packet Snooper", Apr. 25, 1996.

Worboys, "GIS: A Computing Perspective", 1995, pp. 245-247, 287, Taylor & Francis Ltd.

Yamaguchi et al., "High Speed Homology Search with FPGAs", Proceedings Pacific Symposium on Biocomputing, Jan. 3-7, 2002, pp. 271-282, vol. 7, Online, Lihue, Hawaii, USA.

Yan et al., "Enhancing Collaborative Spam Detection with Bloom Filters", 2006, IEEE, pp. 414-425.

Yoshitani et al., "Performance Evaluation of Parallel Volume Rendering Machine Re Volver/C40", Study Report of Information Processing Society, Mar. 5, 1999, pp. 79-84, vol. 99, No. 21.

Ziv et al., "A Universal Algorithm for Sequential Data Compression", IEEE Trans. Inform. Theory, IT-23(3): 337-343 (1997).

NVidia Developer Zone, "GPU Gems 2—Chapter 45, Options Pricing on the GPU"; Mar. 7-11, 2005, 20 pages.

U.S. Appl. No. 61/570,670, filed Dec. 14, 2011 (Taylor et al.).

Dharmapurikar et al., "Deep Packet Inspection Using Parallel Bloom Filters," Symposium on High Performance Interconnects (Hotl), Stanford, California, 2003, pp. 44-51.

Dharmapurikar et al., "Design and Implementation of a String Matching System for Network Intrusion Detection using FPGA-based Bloom Filters", Proc. of 12th Annual IEEE Symposium on Field Programmable Custom Computing Machines, 2004, pp. 1-10.

Dharmapurikar et al., "Longest Prefix Matching Using Bloom Filters," SIGCOMM, 2003, pp. 201-212.

Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.

Ebeling et al., "RaPiD—Reconfigurable Pipelined Datapath", University of Washington, Dept. of Computer Science and Engineering, Sep. 23, 1996, Seattle, WA.

Exegy Inc., "Exegy and HyperFeed to Unveil Exelerate TP at SIA Conference", Release Date: Jun. 20, 2006, downloaded from http://news.thomasnet.com/companystory/488004 on Jun. 19, 2007, 4 pages.

Exegy Inc., "First Exegy Ticker Plant Deployed", Release Date: Oct. 17, 2006, downloaded from http://news.thomasnet.com/companystory/496530 on Jun. 19, 2007, 5 pages.

Feldman, "High Frequency Traders Get Boost From FPGA Acceleration", Jun. 8, 2007, downloaded from http://www.hpcwire.com/hpc.1600113.html on Jun. 19, 2007, 4 pages.

Feldmann, "BLT: Bi-Layer Tracing of HTTP and TCP/IP", AT&T Labs-Research, Florham Park, NJ, USA.

Franklin et al., "An Architecture for Fast Processing of Large Unstructured Data Sets." Proc. of 22nd Int'l Conf. on Computer Design, Oct. 2004, pp. 280-287.

Franklin et al., "Assisting Network Intrusion Detection with Reconfigurable Hardware", Symposium on Field-Programmable Custom Computing Machines (FCCM 2002), Apr. 2002, Napa, California.

Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.

Gavrila et al., "Multi-feature Hierarchical Template Matching Using Distance Transforms", IEEE, Aug. 16-20, 1998, vol. 1, pp. 439-444.

Gokhale et al., "Reconfigurable Computing: Accelerating Computation With Field-Programmable Gate Arrays", 2005, pp. 1-3, 7, 11-15, 39, 92-93, Springer.

Gokhale et al., "Reconfigurable Computing: Accelerating Computation with Field-Programmable Gate Arrays", Springer, 2005, pp. 1-36.

Google Search Results Page for "field programmable gate array financial calculation stock market" over dates of Jan. 1, 1990-May 21, 2002, 1 page.

Gunther et al., "Assessing Document Relevance with Run-Time Reconfigurable Machines", IEEE Symposium on FPGAs for Custom Computing Machines, 1996, pp. 10-17, Proceedings, Napa Valley, CA.

Gupta et al, "High-Speed Implementations of Rule-Based Systems," ACM Transactions on Computer Systems, May 1989, pp. 119-146, vol. 7, Issue 2.

Gupta et al., "Packet Classification on Multiple Fields", Computer Systems Laboratory, Stanford University, Stanford, CA.

Gupta et al, "PMM: A Parallel Architecture for Production Systems," Proceedings of the IEEE, Apr. 1992, pp. 693-696, vol. 2.

Gurtov, "Effect of Delays on TCP Performance", Cellular Systems Development, Sonera Corporation, online at http://cs.helsinki.fi/u/gurtov/papers/pwc01.pdf.

Gyang, "NCBI BLASTN Stage 1 in Reconfigurable Hardware," Technical Report WUCSE-2005-30, Aug. 2004, Department of Computer Science and Engineering, Washington University, St. Louis, MO.

Halaas et al., "A Recursive Misd Architecture for Pattern Matching", IEEE Transactions on Very Large Scale Integration, vol. 12, No. 7, pp. 727-734, Jul. 2004.

Harris, "Pete's Blog: Can FPGAs Overcome the FUD?", Low-Latency.com, May 14, 2007, URL: http://www.a-teamgroup.com/article/pete-blog-can-fpgas-overcome-the-fud/.

Hauck et al., "Software Technologies for Reconfigurable Systems", Northwestern University, Dept. of ECE, Technical Report, 1996.

Hayes, "Computer Architecture and Organization", Second Edition, 1988, pp. 448-459, McGraw-Hill, Inc.

Hezel et al., "FPGA-Based Template Matching Using Distance Transforms", Proceedings of the 10th Annual IEEE Symposium on Field-Programmable Custom Computing Machines, Apr. 22, 2002, pp. 89-97, IEEE Computer Society, USA.

Hirsch, "Tech Predictions for 2008", Reconfigurable Computing, Jan. 16, 2008, URL: http://fpgacomputing.blogspot.com/2008_01_01_archive.html.

Hoinville, et al. "Spatial Noise Phenomena of Longitudinal Magnetic Recording Media", IEEE Transactions on Magnetics, vol. 28, No. 6, Nov. 1992.

Hollaar, "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.

Hutchings et al., "Assisting Network Intrusion Detection with Reconfigurable Hardware", FCCM 2002: 10th Annual IEEE Symposium on Field-Programmable Custom Computing Machines, 2002.

Ibrahim et al., "Lecture Notes in Computer Science: Database and Expert Systems Applications", 2000, p. 769, vol. 1873, Springer.

International Preliminary Report on Patentability (Chapter I) for PCT/US2009/067935 issued Jun. 30, 2011.

International Search Report and Written Opinion for PCT/US2009/067935 dated Apr. 30, 2010.

Jacobson et al., "RFC 1072: TCP Extensions for Long-Delay Paths", Oct. 1988.

Jacobson et al., "tcpdump—dump traffic on a network", Jun. 30, 1997, online at www.cse.cuhk.edu.hk/~cslui/CEG4430/tcpdump.ps.gz.

Johnson et al., "Pattern Matching in Reconfigurable Logic for Packet Classification", College of Computing, Georgia Institute of Technology, Atlanta, GA.

Jones et al., "A Probabilistic Model of Information Retrieval: Development and Status", Information Processing and Management, Aug. 1998, 76 pages.

Keutzer et al., "A Survey of Programmable Platforms—Network Proc", University of California-Berkeley, pp. 1-29.

(56) References Cited

OTHER PUBLICATIONS

Koloniari et al., "Content-Based Routing of Path Queries in Peer-to-Peer Systems", pp. 1-19, E. Bertino et al. (Eds.): EDBT 2004, LNCS 2992, pp. 29-47, 2004, copyright by Springer-Verlag, Germany.

Krishnamurthy et al., "Biosequence Similarity Search on the Mercury System", Proceedings of the 15th IEEE International Conference on Application-Specific Systems, Architectures, and Processors (ASAP04), Sep. 2004, pp. 365-375.

Kulig et al., "System and Method for Controlling Transmission of Data Packets Over an Information Network", pending U.S. Patent Application.

Lancaster et al., "Acceleration of Ungapped Extension in Mercury BLAST", Seventh (7th) Workshop on Media and Streaming Processors, Nov. 12, 2005, Thirty-Eighth (38th) International Symposium on Microarchitecture (MICRO-38), Barcelona, Spain.

Li et al., "Large-Scale IP Traceback in High-Speed Internet: Practical Techniques and Theoretical Foundation", Proceedings of the 2004 IEEE Symposium on Security and Privacy, 2004, pp. 1-15.

Lin et al., "Real-Time Image Template Matching Based on Systolic Array Processor", International Journal of Electronics; Dec. 1, 1992; pp. 1165-1176; vol. 73, No. 6; London, Great Britain.

Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 137-144.

Lockwood et al., "Hello, World: A Simple Application for the Field Programmable Port Extender (FPX)", Washington University, Department of Computer Science, Technical Report WUCS-00-12, Jul. 11, 2000.

Lockwood et al., "Parallel FPGA Programming over Backplane Chassis", Washington University, Department of Computer Science, Technical Report WUCS-00-11, Jun. 12, 2000.

Lockwood et al., "Reprogrammable Network Packet Processing on the Field Programmable Port Extender (FPX)", ACM International Symposium on Field Programmable Gate Arrays (FPGA 2001), Monterey, CA, Feb. 2001, pp. 87-93.

"A Reconfigurable Computing Model for Biological Research Application of Smith-Waterman Analysis to Bacterial Genomes" A White Paper Prepared by Star Bridge Systems, Inc. [retrieved Dec. 12, 2006]. Retrieved from the Internet: <URL: http://www.starbridgesystems.com/resources/whitepapers/Smith%20Waterman%20Whitepaper.pdf.

"ACTIV Financial Announces Hardware Based Market Data Feed Processing Strategy", for Release on Apr. 2, 2007, 2 pages.

"ACTIV Financial Delivers Accelerated Market Data Feed", Apr. 6, 2007, byline of Apr. 2, 2007, downloaded from http://hpcwire.com/hpc.1346816.html on Jun. 19, 2007, 3 pages.

"DRC, Exegy Announce Joint Development Agreement", Jun. 8, 2007, byline of Jun. 4, 2007; downloaded from http://www.hpcwire.com/hpc/1595644.html on Jun. 19, 2007, 3 pages.

"Lucent Technologies Delivers "PayloadPlus" Network Processors for Programmable, MultiProtocol, OC-48c Processing", Lucent Technologies Press Release, downloaded from http://www.lucent.com/press/1000/0010320.meb. html on Mar. 21, 2002.

"Overview, Field Programmable Port Extender", Jan. 2002 Gigabit Workshop Tutorial, Washington University, St. Louis, MO, Jan. 3-4, 2002, pp. 1-4.

"Payload Plus™ Agere System Interface", Agere Systems Product Brief, Jun. 2001, downloaded from Internet, Jan. 2002, pp. 1-6.

"RFC793: Transmission Control Protocol, Darpa Internet Program, Protocol Specification", Sep. 1981.

"Technology Overview", Data Search Systems Incorporated, downloaded from the http://www.datasearchsystems.com/tech.htm on Apr. 19, 2004.

"The Field-Programmable Port Extender (FPX)", downloaded from http://www.arl.wustl.edu/arl/ in Mar. 2002.

Aldwairi et al., "Configurable String Matching Hardware for Speeding up Intrusion Detection", SIRARCH Comput. Archit. News, vol. 33, No. 1, pp. 99-107, Mar. 2005.

Amanuma et al., "A FPGA Architecture for High Speed Computation", Proceedings of 60th Convention Architecture, Software Science, Engineering, Mar. 14, 2000, pp. 1-163-1-164, Information Processing Society, Japan.

Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.

Anonymous, "Method for Allocating Computer Disk Space to a File of Known Size", IBM Technical Disclosure Bulletin, vol. 27, No. 10B, Mar. 1, 1985, New York.

Arnold et al., "The Splash 2 Processor and Applications", Proceedings 1993 IEEE International Conference on Computer Design: VLSI in Computers and Processors (ICCD '93), Oct. 3, 1993, pp. 482-485, IEEE Computer Society, Cambridge, MA USA.

Artan et al., "Multi-packet Signature Detection using Prefix Bloom Filters", 2005, IEEE, pp. 1811-1816.

Asami et al., "Improvement of DES Key Search on FPGA-Based Parallel Machine "RASH—, Proceedings of Information Processing Society, Aug. 15, 2000, pp. 50-57, vol. 41, No. SIG5 (HPS1), Japan.

Baboescu et al., "Scalable Packet Classification," SIGCOMM'01, Aug. 27-31, 2001, pp. 199-210, San Diego, California, USA; http://www.ecsespi.edu/homepages/shivkuma/teaching/sp2001/readings/baboescu-pkt-classification.pdf.

Baer, "Computer Systems Architecture", 1980, pp. 262-265; Computer Science Press, Potomac, Maryland.

Baeza-Yates et al., "New and Faster Filters for Multiple Approximate String Matching", Random Structures and Algorithms (RSA), Jan. 2002, pp. 23-49, vol. 20, No. 1.

Baker et al., "High-throughput Linked-Pattern Matching for Intrusion Detection Systems", ANCS 2005: Proceedings of the 2005 Symposium on Architecture for Networking and Communications Systems, pp. 193-202, ACM Press, 2005.

Barone-Adesi et al., "Efficient Analytic Approximation of American Option Values", Journal of Finance, vol. 42, No. 2 (Jun. 1987), pp. 301-320.

Batory, "Modeling the Storage Architectures of Commercial Database Systems", ACM Transactions on Database Systems, Dec. 1985, pp. 463-528, vol. 10, issue 4.

Behrens et al., "BLASTN Redundancy Filter in Reprogrammable Hardware," Final Project Submission, Fall 2003, Department of Computer Science and Engineering, Washington University.

Berk "JLex. A lexical analyzer generator for Java™", downloaded from http://www.cs.princeton.edu/~appel/modern/java/Jlex/ in Jan. 2002, pp. 1-18.

Bianchi et al., "Improved Queueing Analysis of Shared Buffer Switching Networks", ACM, Aug. 1993, pp. 482-490.

Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.

Braun et al., "Layered Protocol Wrappers for Internet Packet Processing in Reconfigurable Hardware", Proceedings of Hot Interconnects 9 (Hot1-9) Stanford, CA, Aug. 22-24, 2001, pp. 93-98.

Braun et al., "Protocol Wrappers for Layered Network Packet Processing in Reconfigurable Hardware", IEEE Micro, Jan.-Feb. 2002, pp. 66-74.

Brodie et al., "Dynamic Reconfigurable Computing", in Proc. of 9th Military and Aerospace Programmable Logic Devices International Conference, Sep. 2006.

Cavnar et al., "N-Gram-Based Text Categorization", Proceedings of SDAIR-94, 3rd Annual Symposium on Document Analysis and Information Retrieval, Las Vegas, pp. 161-175, 1994.

Celko, "Joe Celko's Data & Databases: Concepts in Practice", 1999, pp. 72-74, Morgan Kaufmann Publishers.

Chamberlain et al., "Achieving Real Data Throughput for an FPGA Co-Processor on Commodity Server Platforms", Proc. of 1st Workshop on Building Block Engine Architectures for Computers and Networks, Oct. 2004, Boston, MA.

Chamberlain et al., "The Mercury System: Embedding Computation Into Disk Drives", 7th High Performance Embedded Computing Workshop, Sep. 2003, Boston, MA.

(56) References Cited

OTHER PUBLICATIONS

Chamberlain et al., "The Mercury System: Exploiting Truly Fast Hardware for Data Search", Proc. of Workshop on Storage Network Architecture and Parallel I/Os, Sep. 2003, New Orleans, LA.

Chaney et al., "Design of a Gigabit ATM Switch", Washington University, St. Louis, 1995.

Cho et al., "Deep Packet Filter with Dedicated Logic and Read Only Memories", 12th Annual IEEE Symposium on Field-Programmable Custom Computing Machines, Apr. 2004.

Choi et al., "Design of a Flexible Open Platform for High Performance Active Networks", Allerton Conference, 1999, Champaign, IL.

Cholleti, "Storage Allocation in Bounded Time", MS Thesis, Dept. of Computer Science and Engineering, Washington Univeristy, St. Louis, MO (Dec. 2002). Available as Washington University Technical Report WUCSE-2003-2.

Clark et al., "Scalable Pattern Matching for High Speed Networks", Proceedings of the 12th Annual IEEE Symposium on Field-Programmable Custom Computing Machines, 2004; FCCM 2004, Apr. 20-23, 2004; pp. 249-257; IEEE Computer Society; Cambridge, MA USA.

Cloutier et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.

Compton et al., "Configurable Computing: A Survey of Systems and Software", Technical Report, Northwestern University, Dept. of ECE, 1999.

Compton et al., "Reconfigurable Computing: A Survey of Systems and Software", Technical Report, Northwestern University, Dept. of ECE, 1999, presented by Yi-Gang Tai.

Cong et al., "An Optional Technology Mapping Algorithm for Delay Optimization in Lookup-Table Based FPGA Designs", IEEE, 1992, pp. 48-53.

Crosman, "Who Will Cure Your Data Latency?", Storage & Servers, Jun. 20, 2007, URL: http://www.networkcomputing.com/article/printFullArticleSrc.jhtml?article ID=199905630.

Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.

Dehon, "DPGA-coupled microprocessors: commodity ICs for the early 21st Century", FPGAS for Custom Computing Machines, 1994, Proceedings. IEEE Workshop on Napa Valley, CA, pp. 31-39, Los Alamitos, CA.

Denoyer et al., "HMM-based Passage Models for Document Classification and Ranking", Proceedings of ECIR-01, 23rd European Colloquim Information Retrieval Research, Darmstatd, DE, pp. 126-135, 2001.

Dharmapurikar et al., "Deep Packet Inspection Using Parallel Bloom Filters," IEEE Micro, Jan.-Feb. 2004, vol. 24, Issue: 1, pp. 52-61.

Dharmapurikar, "Fast and Scalable Pattern Matching for Content Filtering", ACM, ANCS 05, 2005, pp. 183-192.

Office Action for JP Application 2011-540957 dated Feb. 18, 2014.

\* cited by examiner

Figure 3

BID

| Price | Time | Size | Exch | Order ID |
|---|---|---|---|---|
| $25.43 | 9:47:23 | 25 | NASD | N-B |
| $25.42 | 9:51:03 | 100 | NASD | N-C |
| $25.42 | 9:59:49 | 75 | NASD | N-E |

ASK

| Price | Time | Size | Exch | Order ID |
|---|---|---|---|---|
| $25.44 | 9:50:57 | 100 | NASD | N-F |
| $25.45 | 9:59:23 | 200 | NASD | N-D |
| $25.46 | 9:45:31 | 10 | NASD | N-A |
| $25.46 | 9:51:17 | 30 | NASD | N-G |

Figure 4(a)

BID

| Price | Time | Size | Exch | Count |
|---|---|---|---|---|
| $ 25.43 | 9:47:23 | 25 | NASD | 1 |
| $ 25.42 | 9:59:49 | 175 | NASD | 2 |

ASK

| Price | Time | Size | Exch | Count |
|---|---|---|---|---|
| $ 25.44 | 9:50:57 | 100 | NASD | 1 |
| $ 25.45 | 9:59:23 | 200 | NASD | 1 |
| $ 25.46 | 9:51:17 | 40 | NASD | 2 |

Figure 4(b)

BID

| Price | Time | Size | Exch | Count |
|---|---|---|---|---|
| $ 25.43 | 9:46:31 | 50 | ARCA | 1 |
| $ 25.43 | 9:47:23 | 25 | NASD | 1 |
| $ 25.42 | 9:59:49 | 175 | NASD | 2 |
| $ 25.41 | 9:41:48 | 5 | ARCA | 1 |
| $ 25.41 | 9:42:12 | 40 | BATS | 1 |

ASK

| Price | Time | Size | Exch | Count |
|---|---|---|---|---|
| $ 25.44 | 9:47:01 | 50 | BATS | 1 |
| $ 25.44 | 9:50:57 | 100 | NASD | 1 |
| $ 25.45 | 9:49:43 | 125 | ARCA | 2 |
| $ 25.45 | 9:59:23 | 200 | NASD | 1 |
| $ 25.46 | 9:48:20 | 500 | ARCA | 1 |
| $ 25.46 | 9:45:31 | 20 | BATS | 1 |
| $ 25.46 | 9:51:17 | 40 | NASD | 2 |

Figure 4(c)

BID

| Price | Time | Size | Exch | Count |
|---|---|---|---|---|
| $ 25.43 | 9:47:23 | 75 | - | 2 |
| $ 25.42 | 9:59:49 | 175 | - | 2 |
| $ 25.41 | 9:42:12 | 45 | - | 2 |

ASK

| Price | Time | Size | Exch | Count |
|---|---|---|---|---|
| $ 25.44 | 9:50:57 | 150 | - | 2 |
| $ 25.45 | 9:59:23 | 325 | - | 3 |
| $ 25.46 | 9:51:17 | 560 | - | 4 |

| PRICE | VOLUME | IMPLIED | IMPLIED_VOLUME |
|---|---|---|---|
| 98.57 | 100 | n | 0 |
| 98.56 | 250 | n | 0 |
| 98.55 | 100 | n | 0 |
| 98.54 | 75 | n | 0 |
| 98.52 | 50 | n | 0 |

Figure 5

| PRICE | VOLUME | IMPLIED | IMPLIED_VOLUME |
|---|---|---|---|
| 98.57 | 50 | y | 50 |
| 98.57 | 100 | n | 0 |
| 98.56 | 50 | y | 50 |
| 98.56 | 250 | n | 0 |
| 98.55 | 100 | n | 0 |
| 98.54 | 75 | n | 0 |
| 98.52 | 50 | n | 0 |

Figure 6

| PRICE | VOLUME | IMPLIED | IMPLIED_VOLUME |
|---|---|---|---|
| 98.57 | 150 | y | 50 |
| 98.56 | 300 | y | 50 |
| 98.55 | 100 | n | 0 |
| 98.54 | 75 | n | 0 |
| 98.52 | 50 | n | 0 |

Figure 7

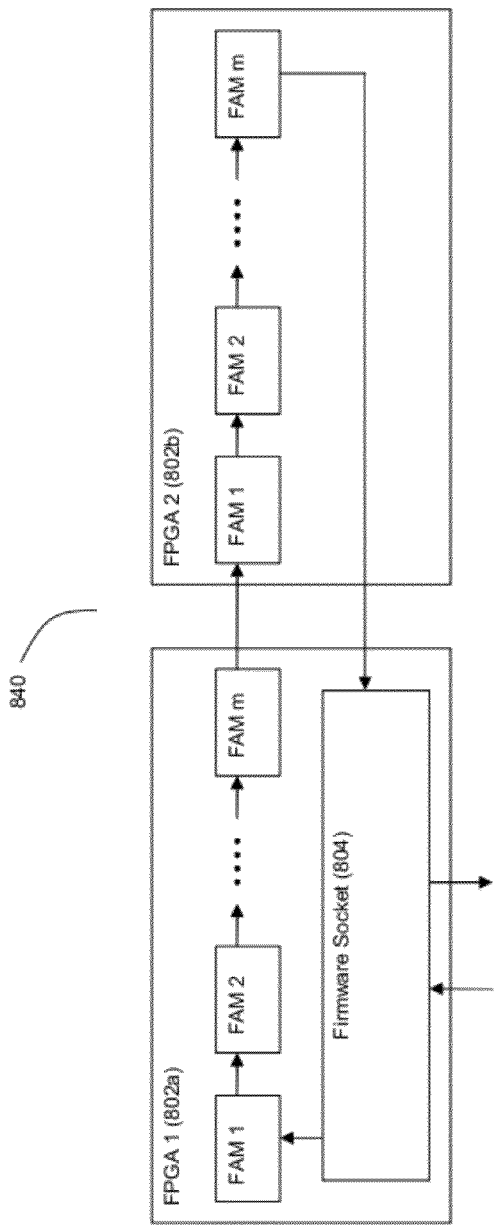
Figure 10
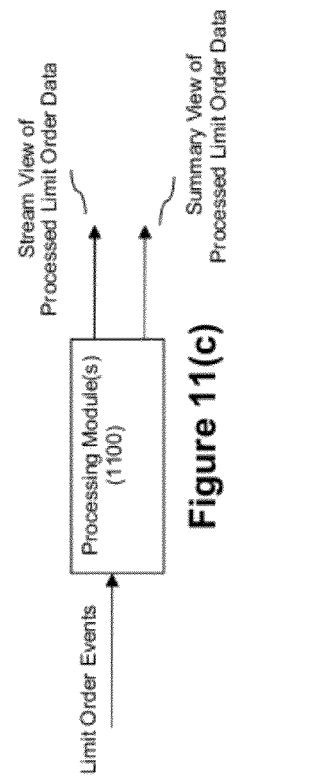
Figure 11(a)
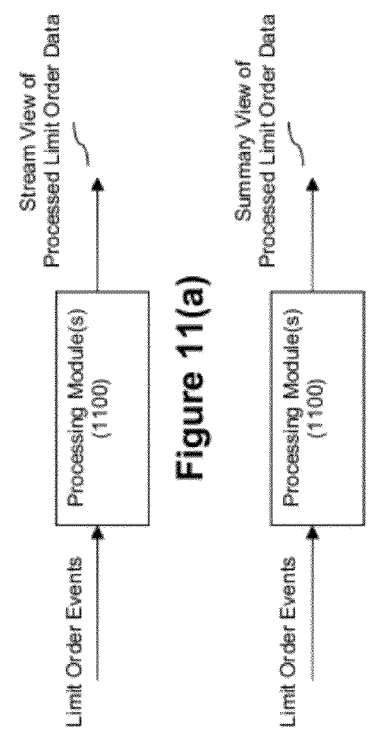
Figure 11(b)
Figure 11(c)

HYBRID APPROACH

Limit Order Event (1600)

| Symbol (1902) | GEID (1904) | Ref # (1906) | Bid/Ask Flag (1908) | Price (1910) | Size (1912) | Time (1914) | Attribute Flag (1916) | Add, Modify, Delete Flags (1918) | ... |

Figure 19

Limit Order Record (2000)

| Unique Internal ID (2002) | Symbol (2004) | GEID (2006) | Ref # (2008) | Bid/Ask Flag (2010) | Price (2012) | Size (2014) | Time (2016) | A0 Flag (2018) | A1 Flag (2020) | Interest Vector (2022) | ... |

Order Attribute Vector (2030)

Figure 20

Regional Price Point Record (2100)

| UI Regional Price ID (2102) | Symbol (2104) | GEID (2106) | Bid/Ask Flag (2108) | Price (2110) | Volume (2112) | Count (2114) | Time (2116) | ... | A0 Flag (2118) | A0 Volume (2120) | A0 Count (2122) | A1 Flag (2124) | A1 Volume (2126) | A1 Count (2128) | Interest Vectors (2130) | ... |

Regional Price Attribute Vector (2140)

Figure 21(a)

Composite Price Point Record (2150)

| UI Composite Price ID (2152) | Symbol (2154) | Bid/Ask Flag (2156) | Price (2158) | Volume (2160) | Count (2162) | Time (2164) | ... | A0 Flag (2166) | A0 Volume (2168) | A0 Count (2170) | A1 Flag (2172) | A1 Volume (2174) | A1 Count (2176) | Interest Vectors (2178) | ... |

Composite Price Attribute Vector (2180)

Figure 21(b)

Enriched Limit Order Event (1604)

| UI IDs (2202) | Symbol (2204) | GEID (2206) | Ref # (2208) | Bid/Ask Flag (2210) | Price (2212) | Size (2214) | Time (2216) | Reg Vol (2218) | Reg Count (2220) | Comp Vol (2222) | Comp Count (2224) | Order AMD (2226) | Price AMD (2228) | Order AV (2230) | Reg AV (2232) | Comp AV (2234) | Interest Vectors (2236) | ... |

Enriched Attribute Vector (2250)

Figure 22

METHOD AND APPARATUS FOR HIGH-SPEED PROCESSING OF FINANCIAL MARKET DEPTH DATA

CROSS-REFERENCE AND PRIORITY CLAIM TO RELATED PATENT APPLICATIONS

This application is a divisional of International Patent Application No. PCT/US2009/067935, filed Dec. 14, 2009, and designating the U.S., which claims priority to U.S. patent application 61/122,673, filed Dec. 15, 2008, entitled "Method and Apparatus for High-Speed Processing of Financial Market Depth Data", the entire disclosures of both of which are incorporated herein by reference.

This application is related to (1) U.S. patent application Ser. No. 12/013,302, filed Jan. 11, 2008, entitled "Method and System for Low Latency Basket Calculation", published as U.S. Patent Application Publication 2009/0182683, (2) U.S. patent application Ser. No. 11/765,306, filed Jun. 19, 2007, entitled "High Speed Processing of Financial Information Using FPGA Devices", published as U.S. Patent Application Publication 2008/0243675, (3) U.S. patent application Ser. No. 11/760,211, filed Jun. 8, 2007, entitled "Method and System for High Speed Options Pricing", published as U.S. Patent Application Publication 2007/0294157, and (4) U.S. patent application Ser. No. 11/561,615, filed Nov. 20, 2006, entitled "Method and Apparatus for Processing Financial Information at Hardware Speeds Using FPGA Devices", published as U.S. Patent Application Publication 2007/0078837, the entire disclosures of each of which are incorporated herein by reference.

TERMINOLOGY

The following paragraphs provide several definitions for various terms used herein. These paragraphs also provide background information relating to these terms.

Financial Instrument: As used herein, a "financial instrument" refers to a contract representing an equity ownership, debt, or credit, typically in relation to a corporate or governmental entity, wherein the contract is saleable. Examples of financial instruments include stocks, bonds, options, commodities, currency traded on currency markets, etc. but would not include cash or checks in the sense of how those items are used outside the financial trading markets (i.e., the purchase of groceries at a grocery store using cash or check would not be covered by the term "financial instrument" as used herein; similarly, the withdrawal of $100 in cash from an Automatic Teller Machine using a debit card would not be covered by the term "financial instrument" as used herein).

Financial Market Data: As used herein, the term "financial market data" refers to data contained in or derived from a series of messages that individually represent a new offer to buy or sell a financial instrument, an indication of a completed sale of a financial instrument, notifications of corrections to previously-reported sales of a financial instrument, administrative messages related to such transactions, and the like. Feeds of messages which contain financial market data are available from a number of sources and exist in a variety of feed types—for example, Level 1 feeds and Level 2 feeds as discussed herein.

Basket: As used herein, the term "basket" refers to a collection comprising a plurality of elements, each element having one or more values. The collection may be assigned one or more Net Values (NVs), wherein a NV is derived from the values of the plurality of elements in the collection. For example, a basket may be a collection of data points from various scientific experiments. Each data point may have associated values such as size, mass, etc. One may derive a size NV by computing a weighted sum of the sizes, a mass NV by computing a weighted sum of the masses, etc. Another example of a basket would be a collection of financial instruments, as explained below.

Financial Instrument Basket: As used herein, the term "financial instrument basket" refers to a basket whose elements comprise financial instruments. The financial instrument basket may be assigned one or more Net Asset Values (NAVs), wherein a NAV is derived from the values of the elements in the basket. Examples of financial instruments that may be included in baskets are securities (stocks), bonds, options, mutual funds, exchange-traded funds, etc. Financial instrument baskets may represent standard indexes, exchange-traded funds (ETFs), mutual funds, personal portfolios, etc. One may derive a last sale NAV by computing a weighted sum of the last sale prices for each of the financial instruments in the basket, a bid NAV by computing a weighted sum of the current best bid prices for each of the financial instruments in the basket, etc.

GPP: As used herein, the term "general-purpose processor" (or GPP) refers to a hardware device having a fixed form and whose functionality is variable, wherein this variable functionality is defined by fetching instructions and executing those instructions, of which a conventional central processing unit (CPU) is a common example. Exemplary embodiments of GPPs include an Intel Xeon processor and an AMD Opteron processor.

Reconfigurable Logic: As used herein, the term "reconfigurable logic" refers to any logic technology whose form and function can be significantly altered (i.e., reconfigured) in the field post-manufacture. This is to be contrasted with a GPP, whose function can change post-manufacture, but whose form is fixed at manufacture.

Software: As used herein, the term "software" refers to data processing functionality that is deployed on a GPP or other processing devices, wherein software cannot be used to change or define the form of the device on which it is loaded.

Firmware: As used herein, the term "firmware" refers to data processing functionality that is deployed on reconfigurable logic or other processing devices, wherein firmware may be used to change or define the form of the device on which it is loaded.

Coprocessor: As used herein, the term "coprocessor" refers to a computational engine designed to operate in conjunction with other components in a computational system having a main processor (wherein the main processor itself may comprise multiple processors such as in a multi-core processor architecture). Typically, a coprocessor is optimized to perform a specific set of tasks and is used to offload tasks from a main processor (which is typically a GPP) in order to optimize system performance. The scope of tasks performed by a coprocessor may be fixed or variable, depending on the architecture of the coprocessor. Examples of fixed coprocessor architectures include Graphics Processor Units which perform a broad spectrum of tasks and floating point numeric coprocessors which perform a relatively narrow set of tasks. Examples of reconfigurable coprocessor architectures include reconfigurable logic devices such as Field Programmable Gate Arrays (FPGAs) which may be reconfigured to implement a wide variety of fixed or programmable computational engines. The functionality of a coprocessor may be defined via software and/or firmware.

Hardware Acceleration: As used herein, the term "hardware acceleration" refers to the use of software and/or firmware implemented on a coprocessor for offloading one or more processing tasks from a main processor to decrease processing latency for those tasks relative to the main processor.

Bus: As used herein, the term "bus" refers to a logical bus which encompasses any physical interconnect for which devices and locations are accessed by an address. Examples of buses that could be used in the practice of the present invention include, but are not limited to the PCI family of buses (e.g., PCI-X and PCI-Express) and HyperTransport buses.

Pipelining: As used herein, the terms "pipeline", "pipelined sequence", or "chain" refer to an arrangement of application modules wherein the output of one application module is connected to the input of the next application module in the sequence. This pipelining arrangement allows each application module to independently operate on any data it receives during a given clock cycle and then pass its output to the next downstream application module in the sequence during another clock cycle.

BACKGROUND AND SUMMARY OF THE INVENTION

The process of trading financial instruments may be viewed broadly as proceeding through a cycle as shown in FIG. 1. At the top of the cycle is the exchange which is responsible for matching up offers to buy and sell financial instruments. Exchanges disseminate market information, such as the appearance of new buy/sell offers and trade transactions, as streams of events known as market data feeds. Trading firms receive market data from the various exchanges upon which they trade. Note that many traders manage diverse portfolios of instruments requiring them to monitor the state of multiple exchanges. Utilizing the data received from the exchange feeds, trading systems make trading decisions and issue buy/sell orders to the financial exchanges. Orders flow into the exchange where they are inserted into a sorted "book" of orders, triggering the publication of one or more events on the market data feeds.

Exchanges keep a sorted listing of limit orders for each financial instrument, known as an order book. As used herein, a "limit order" refers to an offer to buy or sell a specified number of shares of a given financial instrument at a specified price. Limit orders can be sorted based on price, size, and time according to exchange-specific rules. Many exchanges publish market data feeds that disseminate order book updates as order add, modify, and delete events. These feeds belong to a class of feeds known as level 2 data feeds. It should be understood that each exchange may be a little different as to when data is published on the feed and how much normalization the exchange performs when publishing events on the feed, although it is fair to expect that the amount of normalization in the level 2 feed is minimal relative to a level 1 feed. These feeds typically utilize one of two standard data models: full order depth or price aggregated depth. As shown in FIG. 2(a), full order depth feeds contain events that allow recipients to construct order books that mirror the order books used by the exchange matching engines. This is useful for trading strategies that require knowledge of the state of specific orders in the market.

As shown in FIG. 2(b), price aggregated depth feeds contain events that allow recipients to construct order books that report the distribution of liquidity (available shares) over prices for a given financial instrument.

Order book feeds are valuable to electronic trading as they provide what is generally considered the fastest and deepest insight into market dynamics. The current set of order book feeds includes feeds for order books of equities, equity options, and commodities. Several exchanges have announced plans to provide new order book feeds for derivative instruments such as equity options. Given its explosive growth over the past several years, derivative instrument trading is responsible for the lion's share of current market data traffic. The Options Price Reporting Authority (OPRA) feed is the most significant source of derivatives market data, and it belongs to the class of feeds known as "level 1" feeds. Level 1 feeds report quotes, trades, trade cancels and corrections, and a variety of summary events. For a given financial instrument, the highest buy price and lowest sell price comprise the "best bid and offer" (BBO) that are advertised as the quote. As an exchange's sorted order book listing changes due to order executions, modifications, or cancellations, the exchange publishes new quotes. When the best bid and offer prices match in the exchange's order book, the exchange executes a trade and advertises the trade transaction on its level 1 market data feed. Note that some amount of processing is required prior to publishing a quote or trade event because of the latency incurred by the publisher's computer system when processing limit orders to build order books and identify whether trades or quotes should be generated. Thus, level 1 data feeds from exchanges or other providers possess inherent latency relative to viewing "raw" order events on order book feeds. A feed of raw limit order data belongs to a class of feeds known as "level 2" feeds.

In order to minimize total system latency, many electronic trading firms ingest market data feeds, including market data feeds of limit orders, directly into their own computer systems from the financial exchanges. While some loose standards are in place, most exchanges define unique protocols for disseminating their market data. This allows the exchanges to modify the protocols as needed to adjust to changes in market dynamics, regulatory controls, and the introduction of new asset classes. The ticker plant resides at the head of the platform and is responsible for the normalization, caching, filtering, and publishing of market data messages. A ticker plant typically provides a subscribe interface to a set of downstream trading applications. By normalizing data from disparate exchanges and asset classes, the ticker plant provides a consistent data model for trading applications. The subscribe interface allows each trading application to construct a custom normalized data feed containing only the information it requires. This is accomplished by performing subscription-based filtering at the ticker plant.

In traditional market data platforms known to the inventors, the ticker plant may perform some normalization tasks on order book feeds, but the task of constructing sorted and/or price-aggregated views of order books is typically pushed to downstream components in the market data platform. The inventors believe that such a trading platform architecture increases processing latency and the number of discrete systems required to process order book feeds. As an improvement over such an arrangement, an embodiment of the invention disclosed herein enables a ticker plant to perform order feed processing (e.g., normalization, price-aggregation, sorting) in an accelerated and integrated fashion, thereby increasing system throughput and decreasing processing latency. In an exemplary embodiment, the ticker plant employs a coprocessor that serves as an offload engine to accelerate the building of order books. Financial market data received on a feed into the ticker plant can be transferred on a streaming basis to the coprocessor for high speed processing.

Thus, in accordance with an exemplary embodiment of the invention, the inventors disclose a method for generating an order book view from financial market depth data, the method comprising: (1) maintaining a data structure representative of a plurality of order books for a plurality of financial instruments, and (2) hardware-accelerating a processing of a plurality of financial market depth data messages to update the order books within the data structure. Preferably the hardware-accelerating step is performed by a coprocessor within a ticker plant. The inventors also disclose a system for generating an order book view from financial market depth data, the system comprising: (1) a memory for storing a data structure representative of a plurality of order books for a plurality of financial instruments, and (2) a coprocessor configured to process of a plurality of financial market depth data messages to update the order books within the data structure.

Using these order books, the method and system can also produce views of those order books for ultimate delivery to interested subscribers. The inventors define two general classes of book views that can be produced in accordance with various exemplary embodiments: stream views (unsorted, non-cached) and summary views (sorted, cached). Stream views provide client applications with a normalized stream of updates for limit orders or aggregated price-points for the specified regional symbol, composite symbol, or feed source (exchange). Summary views provide client applications with multiple sorted views of the book, including composite views (a.k.a. "virtual order books") that span multiple markets.

In an exemplary embodiment, stream views comprise a normalized stream of updates for limit orders or aggregated price-points for the specified regional symbol, composite symbol, or feed source (exchange). Following the creation of a stream subscription, a ticker plant can be configured to provide a client application with a stream of normalized events containing limit order or price point updates. As stream subscriptions do not provide sorting, it is expected that stream view data would be employed by client applications that construct their own book views or journals from the normalized event stream from one or more specified exchanges.

An example of a stream view that can be generated by various embodiments is an order stream view. An order stream view comprises a stream of normalized limit order update events for one or more specified regional symbols. The normalized events comprise fields such as the type of update (add, modify, delete), the order price, order size, exchange timestamp, and order identifier (if provided by the exchange). Another example of an order stream view is an order exchange stream view that comprises a stream of normalized limit order update events for one or more specified exchanges or clusters of instruments within an exchange. The normalized events comprise fields such as the type of update (add, modify, delete), the order price, order size, exchange timestamp, and order identifier (if provided by the exchange).

Another example of a stream view that can be generated by various embodiments is a price stream view. A price stream view comprises a stream of normalized price level update events for one or more specified regional symbols. The normalized events comprise fields such as the type of update (add, modify, delete), the aggregated price, order volume at the aggregated price, and the order count at the aggregated price. Another example of a price stream view is a price exchange stream view. A price exchange stream view comprises a stream of normalized price level update events for one or more specified exchanges or clusters of instruments within an exchange. The normalized events comprise fields such as the type of update (add, modify, delete), the aggregated price, order volume at the aggregated price, and order count at the aggregated price.

Another example of a stream view that can be generated by various embodiments is an aggregate stream view. An aggregate stream view comprises a stream of normalized price level update events for one or more specified composite symbols. The normalized events comprise fields such as the type of update (add, modify, delete), the (virtual) aggregated price, (virtual) order volume at the aggregated price, and (virtual) order count at the aggregated price.

As explained in the above-referenced and incorporated U.S. Patent Application Publication 2008/0243675, a regional symbol serves to identify a financial instrument traded on a particular exchange while a composite symbol serves to identify a financial instrument in the aggregate on all of the exchanges upon which it trades. It should be understood that embodiments of the invention disclosed herein may be configured to store both regional and composite records for the same financial instrument in situations where the financial instrument is traded on multiple exchanges.

Summary views provide liquidity insight, and the inventors believe it is highly desirable to obtain such liquidity insight with ultra low latency. In accordance with an embodiment disclosed herein, by offloading a significant amount of data processing from client applications to a ticker plant, the ticker plant frees up client processing resources, thereby enabling those client resources to implement more sophisticated trading applications that retain first mover advantage.

An example of a summary view that can be generated by various embodiments is an order summary view. An order summary view represents a first-order liquidity view of the raw limit order data disseminated by a single feed source. The inventors define an order summary view to be a sorted listing comprising a plurality of individual limit orders for a given financial instrument on a given exchange. The sort order is preferably by price and then by time (or then by size for some exchanges). An example of an order summary view is shown in FIG. 3.

Another example of a summary view that can be generated by various embodiments is a price summary view. A price summary view represents a second-order liquidity view of the raw limit order data disseminated by a single feed source. The inventors define a price summary view to be a sorted listing comprising a plurality of price levels for a given financial instrument on a given exchange, wherein each price level represents an aggregation of same-priced orders from that exchange. The price level timestamp in the summary view preferably reports the timestamp of the most recent event at that price level from that exchange. An example of a price summary view is shown in FIG. 4(a). Note that a price summary view produced by an embodiment disclosed herein may be limited to a user-specified number of price points starting from the top of the book.

Another example of a summary view that can be generated by various embodiments is a spliced price summary view. A spliced price summary view represents a second-order, pan-market liquidity view of the raw limit order data disseminated by multiple feed sources. The inventors define a spliced price summary view to be a sorted listing comprising a plurality of price levels for a given financial instrument across all contributing exchanges where each price level represents an aggregation of same-priced orders from a unique contributing exchange. The price level timestamp in the spliced price summary view preferably reports the timestamp of the most recent event at that price level for the specified exchange. An example of a spliced price summary view is shown in FIG. 4(b). Note that a spliced price summary view produced by an embodiment disclosed herein may be limited to a user-specified number of price points starting from the top of the book.

Another example of a summary view that can be generated by various embodiments is an aggregate price summary view. An aggregate price summary view represents a third-order, pan-market liquidity view of the raw limit order data disseminated by multiple feed sources. The inventors define an aggregate price summary view to be a sorted listing comprising a plurality of price levels for a given financial instrument where each price level represents an aggregation of same-priced orders from all contributing exchanges. The price level timestamp in the aggregate price summary view preferably reports the timestamp of the most recent event at that price level from any contributing exchange. An example of an aggregate price summary view is shown in FIG. 4(c). Note that an aggregate price summary view produced by an embodiment disclosed herein may be limited to a user-specified number of price points starting from the top of the book.

The inventors further note that financial exchanges have continued to innovate in order to compete and to provide more efficient markets. One example of such innovation is the introduction of ephemeral regional orders in several equity markets (e.g., FLASH orders on NASDAQ, BOLT orders on BATS) that provide regional market participants the opportunity to view specific orders prior to public advertisement. Another example of such innovation is implied liquidity in several commodity markets (e.g. CME, ICE) that allow market participants to trade against synthetic orders whose price is derived from other derivative instruments. In order to capture and distinguish this type of order or price level in an order book, the inventors define the concept of attributes and apply this concept to the data structures employed by various embodiments disclosed herein. Each entry in an order book or price book may have one or more attributes. Conceptually, attributes are a vector of flags that may be associated with each order book or price book entry. By default, every order or aggregated price level is "explicit" and represents a limit order to buy or sell the associated financial instrument entered by a market participant. In some equity markets, an order or price level may be flagged using various embodiments disclosed herein with an attribute to indicate whether the order or price level relates to an ephemeral regional order (ERO). Similarly, in some commodity markets, an order or price level may be flagged using various embodiments disclosed herein to indicate whether the order or price level relates to an implied liquidity.

By capturing such attributes in the data structures employed by exemplary embodiments, the inventors note that these attributes thus provide another dimension to the types of book views that various embodiments disclosed herein generate. For example, one commodity trading application may wish to view a price aggregated book that omits implied liquidity, another commodity trading application may wish to view a price aggregated book with the explicit and implied price levels shown independently (spliced view), while another commodity trading application may wish to view a price aggregated book with explicit and implied entries aggregated by price. These three examples of attribute-based book views are shown in FIGS. 5, 6 and 7, respectively.

Thus, in accordance with an exemplary embodiment, the inventors disclose the use of attribute filtering and price level merging to capture the range of options in producing book views for books that contain entries with attributes. Attribute filtering allows applications to specify which entries should be included and/or excluded from the book view. Price level merging allows applications to specify whether or not entries that share the same price but differing attributes should be aggregated into a single price level.

The inventors also disclose several embodiments wherein a coprocessor can be used to enrich a stream of limit order events pertaining to financial instruments with order book data, both stream view order book data and summary view order book data, as disclosed herein.

These and other features and advantages of the present invention will be described hereinafter to those having ordinary skill in the art.

BRIEF DESCRIPTION OF THE DRAWINGS

FIG. 3 depicts exemplary bid and ask order summary views;

FIG. 4(a) depicts exemplary bid and ask price summary views;

FIG. 4(b) depicts exemplary bid and ask spliced price summary views;

FIG. 4(c) depicts exemplary bid and ask aggregate price summary views;

FIG. 5 depicts an exemplary price book view, with implied attributes filtered out;

FIG. 6 depicts an exemplary price book view, including a spliced attribute view;

FIG. 7 depicts an exemplary price book view, including a price merged attribute view;

FIG. 10 depicts an example of how a firmware pipeline can be deployed across multiple reconfigurable logic devices;

FIGS. 11(a)-(c) depicts various embodiments of a processing module for processing limit order data;

FIG. 19 depicts an exemplary limit order event;

FIG. 20 depicts an exemplary limit order record;

FIG. 21(a) depicts an exemplary regional price point record;

FIG. 21(b) depicts an exemplary composite price point record;

FIG. 22 depicts an exemplary enriched limit order event;

DETAILED DESCRIPTION OF THE PREFERRED EMBODIMENTS

Figure 1:
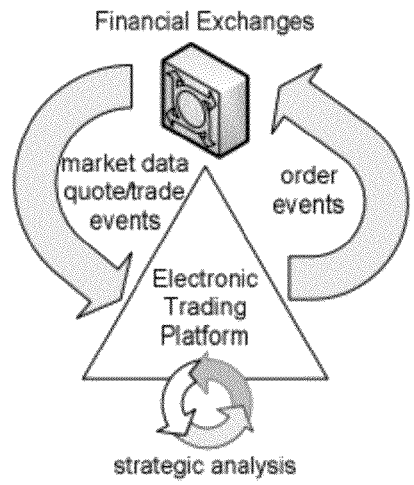
FIG. 1 depicts an exemplary process cycle for trading financial instruments.
Figure 2A:
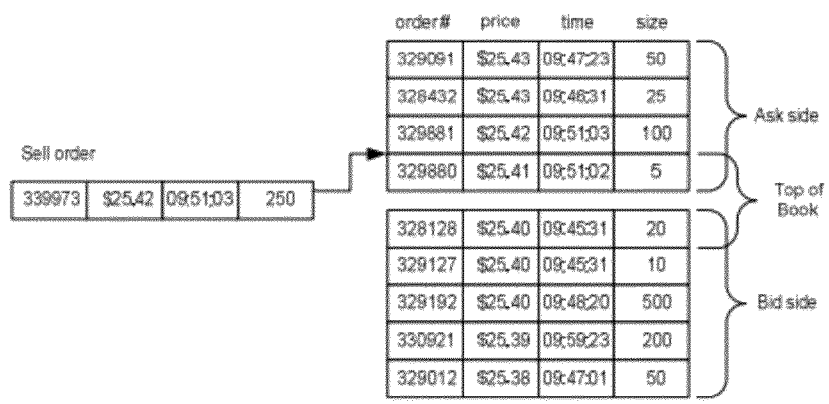
FIG. 2(a) depicts an exemplary limit order event and its relation to a full order depth book.
Figure 2B:
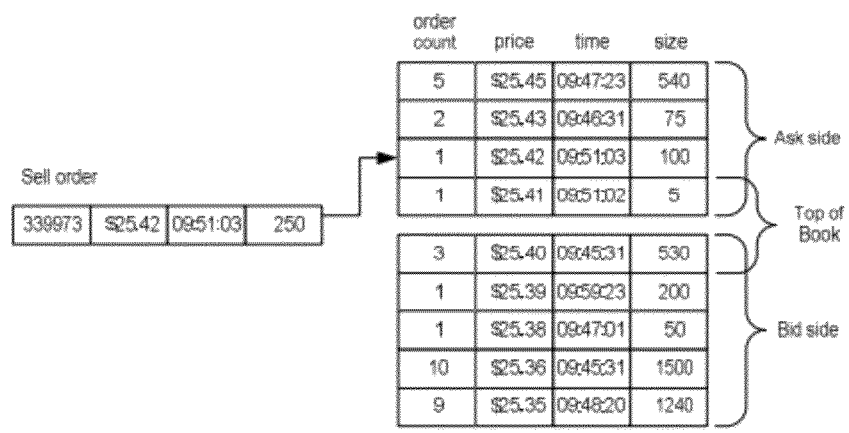
FIG. 2(b) depicts an exemplary limit order event and its relation to a price aggregated depth order book.
Figure 8A:
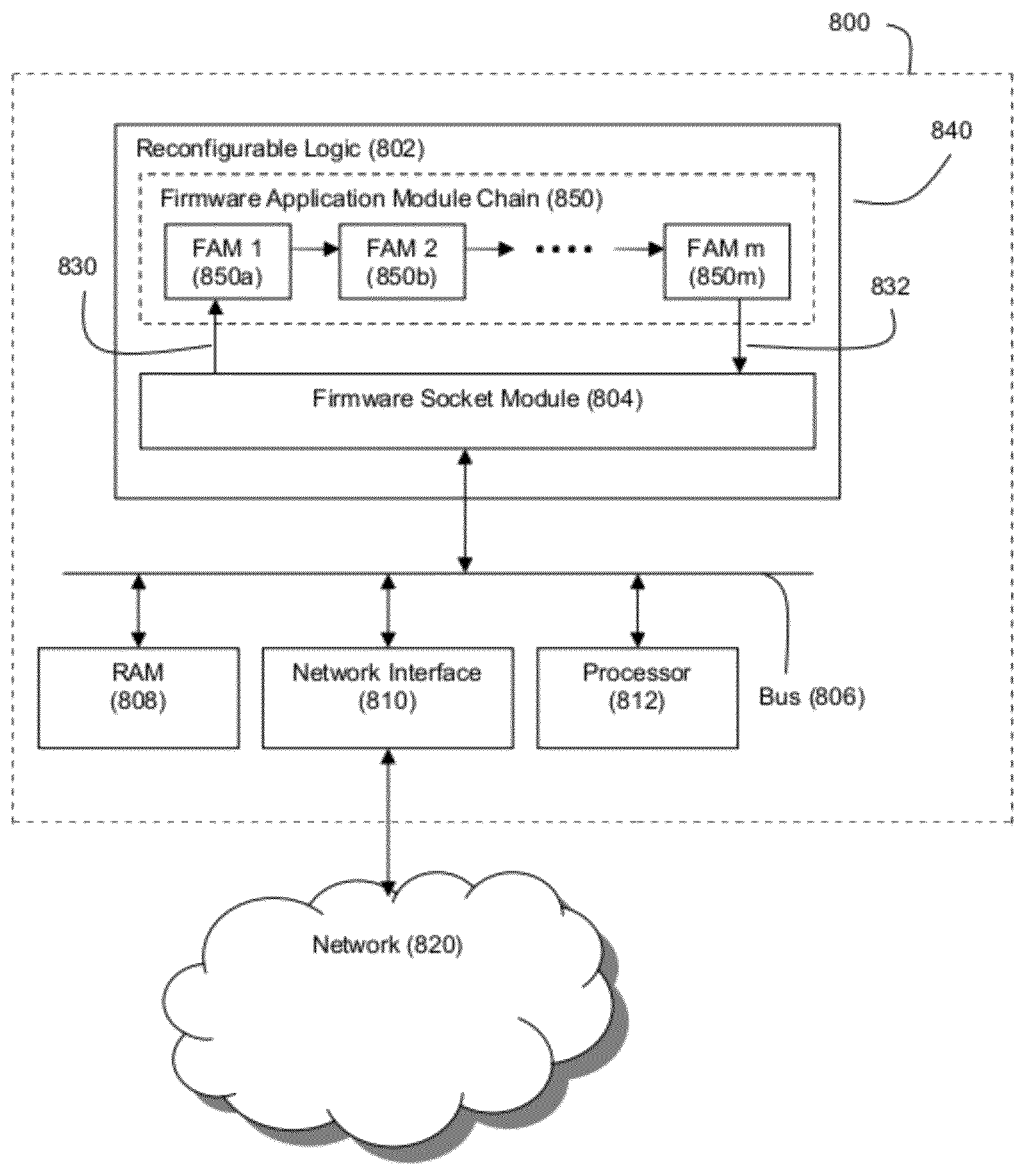
FIGS. 8(a) and (b) depict examples of suitable platforms for processing market depth data.

Examples of suitable platforms for implementing exemplary embodiments of the invention are shown in FIGS. 8(a) and (b). FIG. 8(a) depicts a system 800 employs a hardware-accelerated data processing capability through coprocessor 840 to process financial market depth data. Within system 800, a coprocessor 840 is positioned to receive data that streams into the system 800 from a network 820 (via network interface 810). In a preferred embodiment, system 800 is employed to receive financial market limit order data and process financial market depth data. Network 820 thus preferably comprises a network through which system 800 can access a source for Level 2 financial data such as the exchanges themselves (e.g., NYSE, NASDAQ, etc.) or a third party provider (e.g., extranet providers such as Savvis or BT Radians). Such incoming data preferably comprises a series of financial market data messages, the messages representing events such as limit orders relating to financial instruments. These messages can exist in any of a number of formats, as is known in the art.

The computer system defined by processor 812 and RAM 808 can be any commodity computer system as would be understood by those having ordinary skill in the art. For example, the computer system may be an Intel Xeon system or an AMD Opteron system. Thus, processor 812, which serves as the central or main processor for system 800, preferably comprises a GPP.

In a preferred embodiment, the coprocessor 840 comprises a reconfigurable logic device 802. Preferably, data streams into the reconfigurable logic device 802 by way of system bus 806, although other design architectures are possible (see FIG. 9(b)). Preferably, the reconfigurable logic device 802 is a field programmable gate array (FPGA), although this need not be the case. System bus 806 can also interconnect the reconfigurable logic device 802 with the processor 812 as well as RAM 808. In a preferred embodiment, system bus 806 may be a PCI-X bus or a PCI-Express bus, although this need not be the case.

The reconfigurable logic device 802 has firmware modules deployed thereon that define its functionality. The firmware socket module 804 handles the data movement requirements (both command data and target data) into and out of the reconfigurable logic device, thereby providing a consistent application interface to the firmware application module (FAM) chain 850 that is also deployed on the reconfigurable logic device. The FAMs 850i of the FAM chain 850 are configured to perform specified data processing operations on any data that streams through the chain 850 from the firmware socket module 804. Examples of FAMs that can be deployed on reconfigurable logic in accordance with a preferred embodiments of the present invention are described below.

The specific data processing operation that is performed by a FAM is controlled/parameterized by the command data that FAM receives from the firmware socket module 804. This command data can be FAM-specific, and upon receipt of the command, the FAM will arrange itself to carry out the data processing operation controlled by the received command. For example, within a FAM that is configured to perform an exact match operation between data and a key, the FAM's exact match operation can be parameterized to define the key(s) that the exact match operation will be run against. In this way, a FAM that is configured to perform an exact match operation can be readily re-arranged to perform a different exact match operation by simply loading new parameters for one or more different keys in that FAM. As another example pertaining to baskets, a command can be issued to the one or more FAMs that make up a basket calculation engine to add/delete one or more financial instruments to/from the basket.

Once a FAM has been arranged to perform the data processing operation specified by a received command, that FAM is ready to carry out its specified data processing operation on the data stream that it receives from the firmware socket module. Thus, a FAM can be arranged through an appropriate command to process a specified stream of data in a specified manner. Once the FAM has completed its data processing operation, another command can be sent to that FAM that will cause the FAM to re-arrange itself to alter the nature of the data processing operation performed thereby. Not only will the FAM operate at hardware speeds (thereby providing a high throughput of data through the FAM), but the FAMs can also be flexibly reprogrammed to change the parameters of their data processing operations.

The FAM chain 850 preferably comprises a plurality of firmware application modules (FAMs) 850a, 850b, . . . that are arranged in a pipelined sequence. However, it should be noted that within the firmware pipeline, one or more parallel paths of FAMs 850i can be employed. For example, the firmware chain may comprise three FAMs arranged in a first pipelined path (e.g., FAMs 850a, 850b, 850c) and four FAMs arranged in a second pipelined path (e.g., FAMs 850d, 850e, 850f, and 850g), wherein the first and second pipelined paths are parallel with each other. Furthermore, the firmware pipeline can have one or more paths branch off from an existing pipeline path. A practitioner of the present invention can design an appropriate arrangement of FAMs for FAM chain 850 based on the processing needs of a given application.

A communication path 830 connects the firmware socket module 804 with the input of the first one of the pipelined FAMs 850a. The input of the first FAM 850a serves as the entry point into the FAM chain 850. A communication path 832 connects the output of the final one of the pipelined FAMs 850m with the firmware socket module 804. The output of the final FAM 850m serves as the exit point from the FAM chain 850. Both communication path 830 and communication path 832 are preferably multi-bit paths.

The nature of the software and hardware/software interfaces used by system 800, particularly in connection with data flow into and out of the firmware socket module are described in greater detail in U.S. Patent Application Publication 2007/0174841, the entire disclosure of which is incorporated herein by reference.

Figure 8B:
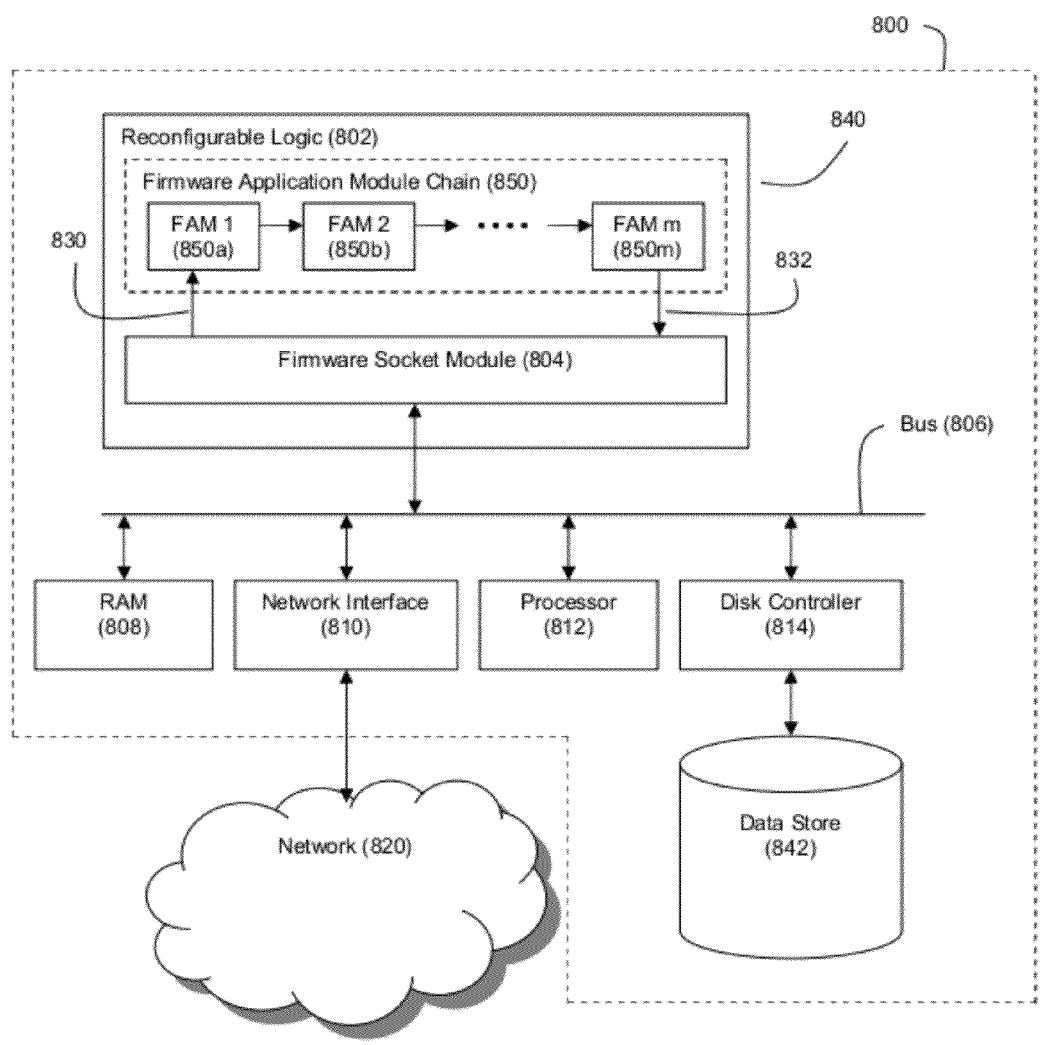

FIG. 8(b) depicts another exemplary embodiment for system 800. In the example of FIG. 8(b), system 800 includes a data store 842 that is in communication with bus 806 via disk controller 814. Thus, the data that is streamed through the coprocessor 840 may also emanate from data store 842. Data store 842 can be any data storage device/system, but it is preferably some form of mass storage medium. For example, data store 842 can be a magnetic storage device such as an array of Seagate disks.

Figure 9A:
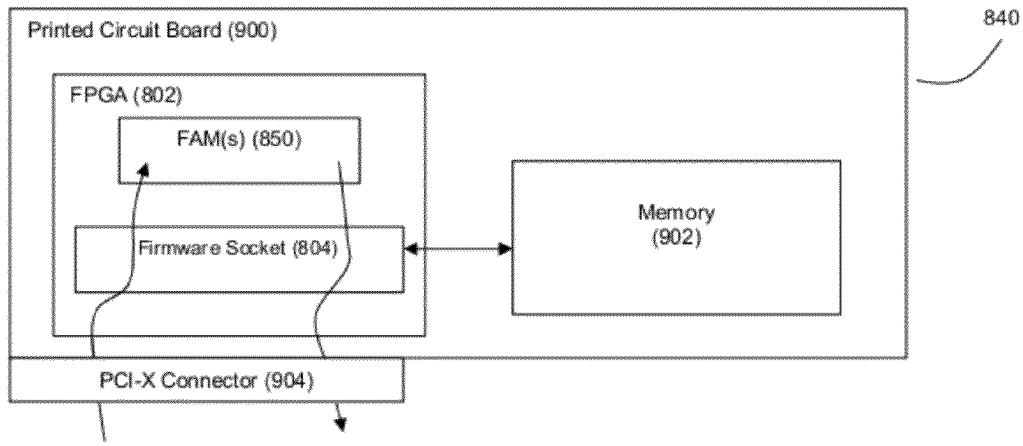
FIGS. 9(a) and (b) depict exemplary printed circuit boards for use as a coprocessor.

FIG. 9(a) depicts a printed circuit board or card 900 that can be connected to the PCI-X or PCI-e bus 806 of a commodity computer system for use as a coprocessor 840 in system 800 for any of the embodiments of FIGS. 8(a)-(b). In the example of FIG. 9(a), the printed circuit board includes an FPGA 802 (such as a Xilinx Virtex 5 FPGA) that is in communication with a memory device 902 and a PCI-X bus connector 904. A preferred memory device 902 comprises SRAM and DRAM memory. A preferred PCI-X or PCI-e bus connector 904 is a standard card edge connector.

Figure 9B:
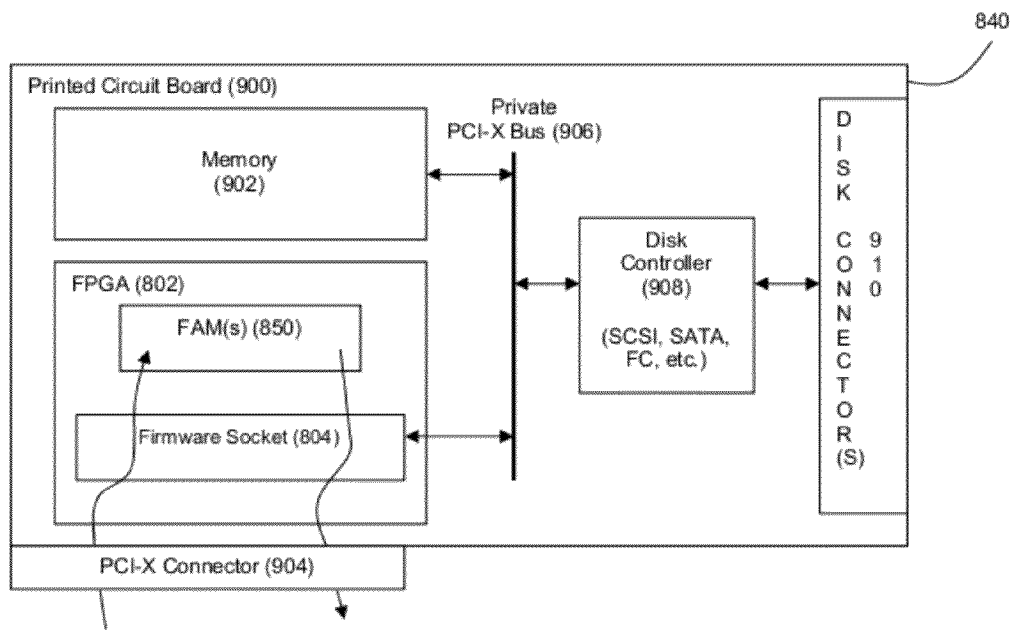

FIG. 9(b) depicts an alternate configuration for a printed circuit board/card 900. In the example of FIG. 9(b), a bus 906 (such as a PCI-X or PCI-e bus), one or more disk controllers 908, and a disk connector 910 are also installed on the printed circuit board 900. Any commodity disk interface technology can be supported, as is understood in the art. In this configuration, the firmware socket 804 also serves as a PCI-X to PCI-X bridge to provide the processor 812 with normal access to any disk(s) connected via the private PCI-X bus 906. It should be noted that a network interface can be used in addition to or in place of the disk controller and disk connector shown in FIG. 9(b).

It is worth noting that in either the configuration of FIG. 9(a) or 9(b), the firmware socket 804 can make memory 902 accessible to the bus 806, which thereby makes memory 902 available for use by an OS kernel as the buffers for transfers to the FAMs from a data source with access to bus. It is also worth noting that while a single FPGA 802 is shown on the printed circuit boards of FIGS. 9(a) and (b), it should be understood that multiple FPGAs can be supported by either including more than one FPGA on the printed circuit board 900 or by installing more than one printed circuit board 900 in the system 800. FIG. 10 depicts an example where numerous FAMs in a single pipeline are deployed across multiple FPGAs.

FIGS. 11(a)-(c) depict examples of processing modules 1100 that can be employed within coprocessor 840 to process limit order events. The processing module 1100 of FIG. 11(a) is configured to generate a stream view of processed limit order data. The processing module 1100 of FIG. 11(b) is configured to generate a summary view of processed limit order data, and the processing module 1100 of FIG. 11(c) is configured to generate both a stream view and a summary view of processed limit order data.

Figure 12A:
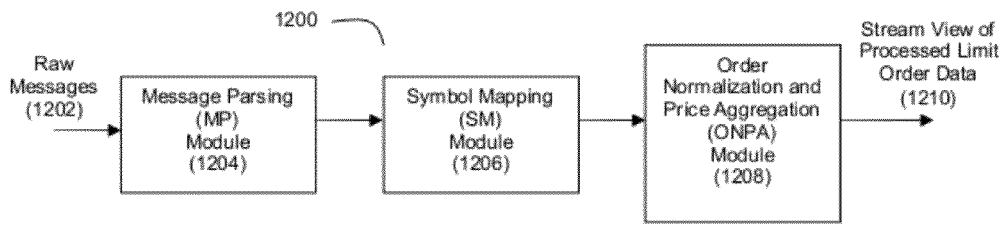
FIGS. 12(a)-(c) depict various embodiments of a pipeline for generating stream views of order books.
Figure 12B:
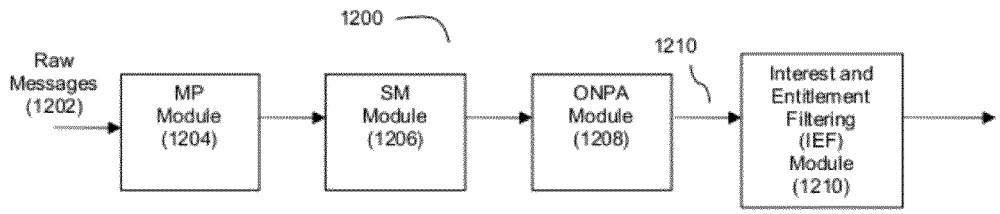
Figure 12C:
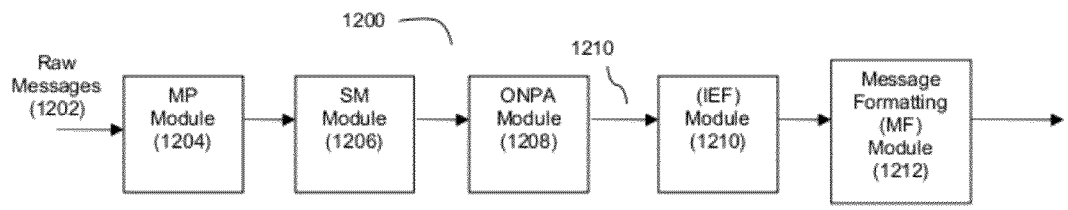

In the exemplary embodiments of FIG. 12(a)-(c), a data processing module 1100 for generating a stream view of processed limit order data can be realized via a pipeline 1200. In the example of FIG. 12(a), the pipeline comprises a message parsing (MP) module 1204 that receives raw messages 1202. These messages 1202 comprise a stream of financial market data events, of which at least a plurality comprise limit order events. Downstream from the MP module 1204 is a symbol mapping (SM) module 1206, and downstream from the SM module 1206 is an Order Normalization and Price Aggregation (ONPA) module 1208. The ONPA module 1208, as explained below, is configured to generate the stream view of the limit order data contained in limit order events.

The MP module 1204 is configured to parse the incoming stream of raw messages 1202 into a plurality of parsed messages having data fields that can be understood by downstream modules. Exemplary embodiments for such an MP module are described in the above-referenced and incorporated U.S. Patent Application Publication 2008/0243675. Thus, the MP modules is configured to process incoming raw messages 1202 to create limit order events that can be understood by downstream modules.

Figure 13:
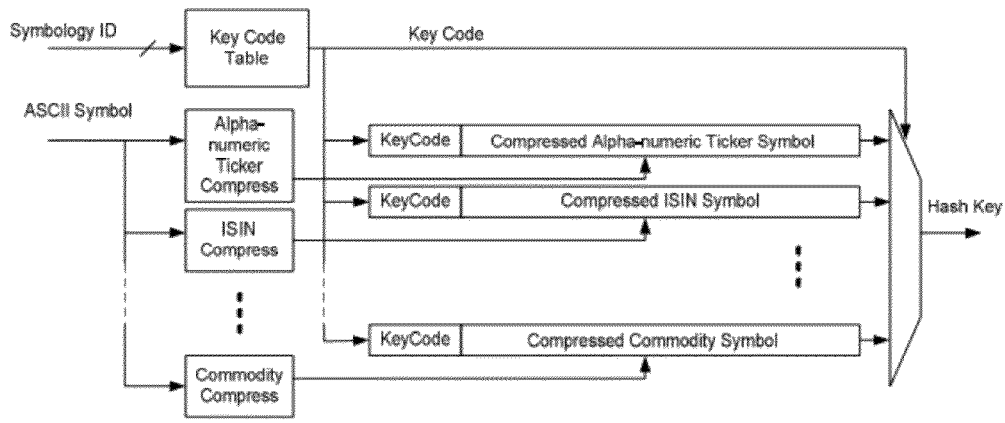
FIG. 13 depicts an exemplary embodiment of a compression function used to generate a hash key for symbol mapping.

The SM module 1206 resolves a unique symbol identifier for the base financial instrument and the associated market center for a received event. Input events may contain a symbol field that uniquely identifies the base financial instrument. In this case, the symbol mapping stage performs a one-to-one translation from the input symbol field to the symbol identifier, which is preferably a minimally-sized binary tag that provides for efficient lookup of associated state information for the financial instrument. Thus, the SM module 1206 operates to map the known symbol for a financial instrument (or set of financial instruments) as defined in the parsed message to a symbology that is internal to the platform (e.g., mapping the symbol for IBM stock to an internal symbol "12345"). Preferably, the internal platform symbol identifier (ID) is an integer in the range 0 to N−1, where N is the number of entries in a symbol index memory. Also, the symbol ID may formatted as a binary value of size $M=\log_2(N)$ bits. The format of financial instrument symbols in input exchange messages varies for different message feeds and financial instrument types. Typically, the symbol is a variable-length ASCII character string. A symbology ID is an internal control field that uniquely identifies the format of the symbol string in the message. As shown in FIG. 13, a symbology ID is preferably assigned by a feed handler and present in all incoming messages, as the symbol string format is typically shared by all messages on a given input feed.

An exemplary embodiment of the SM module 1206 maps each unique symbol character string to a unique binary number of size M bits. In such an exemplary embodiment, the symbol mapping FAM performs a format-specific compression of the symbol to generate a hash key of size K bits, where K is the size of the entries in a symbol index memory. The symbology ID may be used to lookup a Key Code that identifies the symbol compression technique that should be used for the input symbol. Preferably, the symbol mapping FAM compresses the symbol using format-specific compression engines and selects the correct compressed symbol output using the key code. Also, the key code can be concatenated with the compressed symbol to form the hash key. In doing so, each compression technique is allocated a subset of the range of possible hash keys. This ensures that hash keys will be unique, regardless of the compression technique used to compress the symbol. An example is shown in FIG. 13 wherein the ASCII symbol for a financial instrument is compressed in parallel by a plurality of different compression operations (e.g., alpha-numeric ticker compression, ISIN compression, and commodity compression). Compression techniques for different symbologies can be selected and/or devised on an ad hoc basis as desired by a practitioner. A practitioner is free to select a different compression operation as may be appropriate for a given symbology. Based on the value of the key code, the SM module will pass one of the concatenations of the key code and compression results as the output from the multiplexer for use as the hash key.

Alternatively, the format-specific compression engines may be implemented in a programmable processor. The key code may then be used to fetch a sequence of instructions that specify how the symbol should be compressed.

Once the hash key is generated, the SM module 1206 maps the hash key to a unique address in a symbol index memory in the range 0 to N−1. The symbol index memory may be implemented in a memory "on-chip" (e.g., within the reconfigurable logic device) or in "off-chip" high speed memory devices such as SRAM and SDRAM that are accessible to the reconfigurable logic device. Preferably, this mapping is performed by a hash function. A hash function attempts to minimize the number of probes, or table lookups, to find the input hash key. In many applications, additional meta-data is associated with the hash key. In an exemplary embodiment, the location of the hash key in the symbol index memory is used as the unique internal Symbol ID for the financial instrument.

Figure 14:
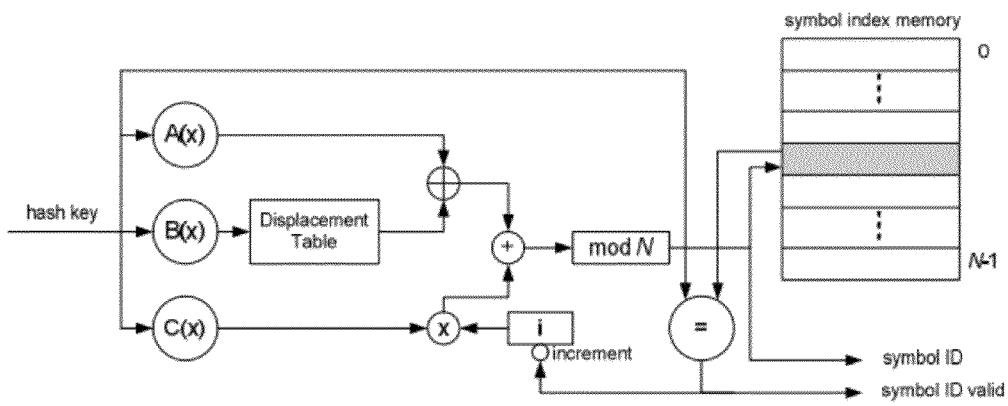
FIG. 14 depicts an exemplary embodiment of a hash function for symbol mapping.

FIG. 14 shows an exemplary embodiment of a hash function to perform this mapping that represents a novel combination of known hashing methods. The hash function of FIG. 14 uses near-perfect hashing to compute a primary hash function, then uses open-addressing to resolve collisions. The hash function H(x) is described as follows:

$$H(x) = (h1(x) + (i*h2(x))) \bmod N$$

$$h1(x) = A(x) \oplus d(x)$$

$$d(x) = T(B(x))$$

$$h2(x) = C(x)$$

The operand x is the hash key generated by the previously described compression stage. The function $h1(x)$ is the primary hash function. The value i is the iteration count. The iteration count i is initialized to zero and incremented for each hash probe that results in a collision. For the first hash probe, hash function $H(x)=h1(x)$, thus the primary hash function determines the first hash probe. The preferred hash function disclosed herein attempts to maximize the probability that the hash key is located on the first hash probe. If the hash probe results in a collision, the hash key stored in the hash slot does not match hash key x, the iteration count is incremented and combined with the secondary hash function $h2(x)$ to generate an offset from the first hash probe location. The modulo N operation ensures that the final result is within the range 0 to N−1, where N is the size of the symbol index memory. The secondary hash function $h2(x)$ is designed so that its outputs are prime relative to N. The process of incrementing i and recomputing H(x) continues until the input hash key is located in the table or an empty table slot is encountered. This technique of resolving collisions is known as open-addressing.

The primary hash function, $h1(x)$, is computed as follows. Compute hash function B(x) where the result is in the range 0 to Q−1. Use the result of the B(x) function to lookup a displacement vector d(x) in table T containing Q displacement vectors. Preferably the size of the displacement vector d(x) in bits is equal to M. Compute hash function A(x) where the result is M bits in size. Compute the bitwise exclusive OR, ⊖, of A(x) and d(x). This is one example of near-perfect hashing where the displacement vector is used to resolve collisions among the set of hash keys that are known prior to the beginning of the query stream. Typically, this fits well with streaming financial data where the majority of the symbols for the instruments trading in a given day is known. Methods for computing displacement table entries are known in the art.

The secondary hash function, $h2(x)$, is computed by computing a single hash function C(x) where the result is always prime relative to N. Hash functions A(x), B(x), and C(x) may be selected from the body of known hash functions with favorable randomization properties. Preferably, hash functions A(x), B(x), and C(x) are efficiently implemented in hardware. The set of H3 hash functions are good candidates. (See Krishnamurthy et al., "*Biosequence Similarity Search on the Mercury System*", Proc. of the IEEE 15th Int'l Conf. on Application-Specific Systems, Architectures and Processors, September 2004, pp. 365-375, the entire disclosure of which is incorporated herein by reference).

Once the hash function H(x) produces an address whose entry is equal to the input hash key, the address is passed on as the new Symbol ID to be used internally by the ticker plant to reference the financial instrument. As shown in FIG. 14, the result of the hash key compare function may be used as a valid signal for the symbol ID output.

Hash keys are inserted in the table when an exchange message contains a symbol that was unknown at system initialization. Hash keys are removed from the table when a financial instrument is no longer traded. Alternatively, the symbol for the financial instrument may be removed from the set of known symbols and the hash table may be cleared, recomputed, and initialized. By doing so, the displacement table used for the near-perfect hash function of the primary hash may be optimized. Typically, financial markets have established trading hours that allow for after-hours or overnight processing. The general procedures for inserting and deleting hash keys from a hash table where open-addressing is used to resolve collisions is well-known in the art.

Figure 15:
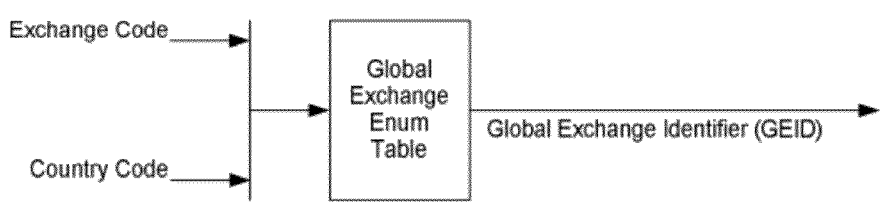
FIG. 15 depicts an exemplary embodiment for generating a global exchange identifier (GEID) for symbol mapping.

In an exemplary embodiment, the SM module 1210 can also be configured to compute a global exchange identifier (GEID) that maps the exchange code and country code fields in the exchange message to an integer in the range 0 to G−1, as shown in FIG. 15. Similar to the symbol field for financial instruments, the exchange code and country code fields uniquely identify the source of the exchange message. Thus, the global exchange identifier (GEID) preferably comprises a binary tag that uniquely identifies a particular exchange for this the message is relevant. The value of G should be selected such that it is larger than the total number of sources (financial exchanges) that will be generating input messages for a given instance of the system. Hashing could be used to map the country codes and exchange codes to the GEID. Alternatively, a "direct addressing" approach can be used to map country and exchange codes to GEIDs. For example, the exchange code and country codes can each be represented by two character codes, where the characters are 8-bit uppercase ASCII alpha characters. These codes can then be truncated to 5-bit characters in embodiment where only 26 unique values of these codes are needed. For each code, these truncated values are concatenated to generate a 10-bit address that is used to lookup a compressed intermediate value in a stage 1 table. Then the compressed intermediate values for the exchange and country code can be concatenated to generate an address for a stage 2 lookup. The result of the stage 2 lookup is the GEID. The size of the intermediate values and the stage 2 address will depend on the number of unique countries and the max number of exchanges in any one country, which can be adjusted as new exchanges open in different countries.

Figure 16:
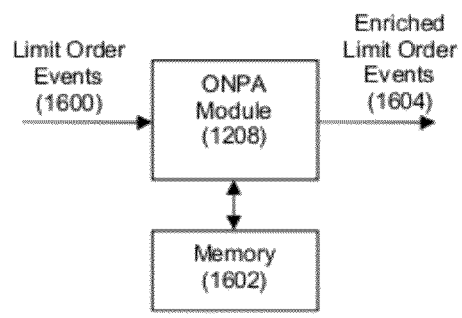
FIG. 16 depicts an exemplary embodiment of a module configured to enrich limit order events with normalization and price aggregation data.

The ONPA module 1208 then receives a stream of incoming limit order events 1600, as shown in FIG. 16. The ONPA module accesses a memory 1602 that stores data structures which comprise the various order books tracked by the system to determine (1) how to update the data structures in view of the received limit order event, and (2) how to enrich the limit order event in view of its relation to the tracked order books. The output from the ONPA module 1208 is an outgoing stream of enriched limit order events 1604.

FIG. 19 depicts an exemplary limit order event 1600. As exemplary data fields, the limit order event comprises a symbol field 1902 and GEID field 1904 (as mapped by the SM module 1206). The event may also include a reference number field 1906, typically assigned by the publisher of the event to identify a particular limit order. Additional data fields for the event 1600 comprise a flag 1908 to identify whether the limit order pertains to a bid or ask, a field 1910 to identify a price for the limit order, a field 1912 to identify the size for the limit order (e.g., share count), and a timestamp field 1914. Furthermore, the event 1600 preferably comprises one or more flags 1916 that identify whether one or more attributes are applicable to the event. For example, as discussed above, the value of the attribute flag field 1916 can identify whether the limit order pertains to an ephemeral regional order (e.g., a FLASH order on NASDAQ or a BOLT order on BATS) and whether the limit order is implied. Lastly, the limit order event 1600 may comprise one or more flags 1918 for identifying whether the limit order event is an add event, modify event or delete event. Thus the add, modify, delete (AMD) flags field 1918 will enable an ONPA module 1208 to decide whether a received limit order event represents a new limit order (the add flag), a modification to a pre-existing limit order (the modify flag), or a deletion of an pre-existing limit order (the delete flag).

It should be understood that many limit order events 1600 will not have the same fields shown in the example of FIG. 19, whether there be differences in the number of fields and/or the types of fields. For example, many limit order events will have fields that vary based on the value of the AMD flag field 1918. As another example, some limit order events 1600 will not include a symbol field 1902. In such an instance, the symbol mapping task would be performed by the ONPA module 1208 rather than the SM module 1206. As an example of such a circumstance, in order to conserve bandwidth on data transmission links, several market centers minimize the size of event messages by sending "static" information regarding outstanding limit orders only once. Typically, the first message advertising the addition of a new limit order includes all associated information (such as the symbol, source identifier, price and size of the order, etc.) as well as a reference number for the order. Subsequent messages reporting modification or deletion of the order may only include a reference number that uniquely identifies the order (thus omitting a symbol field from the event). In a preferred embodiment, one of the roles for the ONPA module 1208 is to pass complete order information to downstream consumers of the event messages. For limit order event messages, the ONPA module 1208 normalizes the messages by ensuring that all desired fields are present in a regular format and the message consistently communicates the market event. For example, a market center may choose to advertise all events using order modification events. In such a scenario, with a preferred embodiment, it is the responsibility of the ONPA module 1208 to determine if the event results in the addition of a new order, modification of an existing order, or deletion of an existing order. In practice, market centers have disparate data models for communicating limit order events; the ONPA module 1208 ensures that a consistent data model is presented to downstream processing blocks and trading applications. All output events contain a consistent set of fields where each field has a well-defined type. For example, some exchanges may only send the order reference number in a delete event. The ONPA module 1208 fills in missing fields such as the price and size of the deleted order.

In order to resolve the symbol identifier for input events lacking a symbol field, the ONPA module 1208 can use another identifying field (such as an order reference number). In this case, the ONPA module 1208 performs a many-to-one translation to resolve the symbol identifier, as there may be many outstanding orders to buy or sell a given financial instrument. It is important to note that this many-to-one mapping requires maintaining a dynamic set of items that map to a given symbol identifier, items may be added, modified, or removed from the set at any time as orders enter and execute at market centers.

While there are several viable approaches to solve the order normalization problem, the preferred method is to maintain a record for every outstanding limit order advertised by the set of input market data feeds. An example of such a limit order record 2000 is shown in FIG. 20. An event reporting the creation of a new limit order must contain a symbol field, thus when the event arrives at the ONPA module 1208 it will contain the symbol identifier resolved by the symbol mapping stage. If the event is from a market center that uses order reference numbers to minimize subsequent message sizes, the event will also contain an order reference number. The ONPA module 1208 maintains a map to the order record, where the record 2000 may contain the symbol identifier, order reference number, price, size, and other fields provided by the market center. Preferably, the ONPA module 1208 also assigns a unique internal order identifier 2002 that may be used to directly address the order record by other system components.

In the example of FIG. 20, the limit order record 2000 comprises a plurality of fields, such as:

A unique internal identifier field 2002 as noted herein.
A symbol field 2004 as noted herein.
A GEID field 2006 as noted herein.
A reference number field 2008 as noted herein.
A bid/ask flag field 2010 as noted herein.
A price field 2012 as noted herein.
A size field 2014 as noted herein. As explained below, the value of this field in the record 2000 may be updated over time as order modify events are received.
A timestamp field 2016 as noted herein
A flag field 2018 for a first attribute (A0) (e.g., to identify whether the order pertains to an ephemeral regional order)
A flag field for a second attribute (A1) (e.g., to identify whether the order is an implied order. Together the A0 and A1 flags can be characterized as an order attribute vector 2030 within the limit order record 2000.
An interest vector field 2022 that serves to identify downstream subscribers that have an interest in the subject limit order. Optionally, this vector can be configured to not only identify which subscribers are interested in which limit orders but also what fields in each limit order record each subscriber has an interest in.

Once again, however, it should be noted that limit order records 2000 can be configured to have more or fewer and/or different data fields.

Preferably, the mapping of a received limit order event 1600 to a limit order record 2000 is performed using hashing in order to achieve constant time access performance on average. The hash key may be constructed from the order reference number, symbol identifier, or other uniquely identifying fields. The type of hash key is determined by the type of market center data feed. Upstream feed handlers that perform pre-normalization of the events set flags in the event that notify the ONPA module as to what type of protocol the exchange uses and what fields are available for constructing unique hash keys. For example, this information may be encoded in the GELD field 2006 or in some other field of the limit order event 1600. There are a variety of hash functions that could be used by the ONPA module. In the preferred embodiment, the ONPA employs H3 hash functions as discussed above and in the above-referenced and incorporated U.S. Patent Application Publication 2008/0243675 due to their efficiency and amenability to parallel hardware implementation. Hash collisions may be resolved in a number of ways. In the preferred embodiment, collisions are resolved via chaining, creating a linked list of entries that map to the same hash slot. A linked list is a simple data structure that allows memory to be dynamically allocated as the number of entries in the set changes.

Once the record is located, the ONPA module updates fields in the record and copies fields from the record to the message, filling in missing fields as necessary to normalize the output message. It is during this step that the ONPA module may modify the type of the message to be consistent with the result of the market event. For example, if the input message is a modify event that specifies that 100 shares should be subtracted from the order (due to a partial execution at the market center) and the outstanding order is for 100 shares, then the ONPA will change the type of the message to a delete event, subject to market center rules. Note that market centers may dictate rules such as whether or not zero size orders may remain on an order book. In another scenario, if the outstanding order was for 150 shares, the ONPA module would update the size field 2014 of the limit order record to replace the 150 value with 50 reflect the removal of 100 shares from the order. In general, the ONPA module attempts to present the most descriptive and consistent view of the market data events. Hardware logic within the ONPA module can be configured to provide these updating and normalization tasks.

In addition to normalizing order messages, the ONPA module may additionally perform price aggregation in order to support price aggregated views of the order book. Preferably, the ONPA module maintains an independent set of price point records. In this data structure, a record is maintained for each unique price point in an order book. At minimum, the set of price point records preferably contain the price, volume (sum of order sizes at that price, which can be referred to as the price volume), and order count (total number of orders at that price). Order add events increase the volume and order count fields, order delete events decrease the volume and order count fields, etc. Price point records are created when an order event adds a new price point to the book. Likewise, price point records are deleted when on order event removes the only record with a given price point from the book. Preferably, the ONPA module updates AMD flags in an enriched limit order event 1604 that specify if the event resulted in the addition, modification, or deletion of a price entry in the book (see the price AMD field 2226 in FIG. 22). This information may be used to optimize downstream sorting engines. Preferably, the ONPA module also assigns a unique internal price identifier to each price record that may be used to directly address the price record by other system components.

Note that mapping a limit order event 1600 to a price point record is also a many-to-one mapping problem. Preferably, the set of price point records is maintained using a hash mapping, similar to the order records. In order to locate the price point record associated with an order event, the hash key is constructed from fields such as the symbol identifier, global exchange identifier, and price. Preferably, hash collisions are resolved using chaining as with the order record data structure. Other data structures may be suitable for maintaining the sets of order and price point records, but hash maps have the favorable property of constant time accesses (on average).

In order to support efficient attribute filtering and price level merging in downstream book views, the ONPA module preferably maintains a price attribute vector as part of the price point records, wherein the price attribute vectors also comprise a vector of volumes and price counts in each price point record. For example, the price point record may include the following fields: price, volume (total shares or lots at this price), order count (total orders at this price), attribute flags, attribute volume 0 (total shares or lots at this price with attribute 0), order count 0 (total orders at this price with attribute 0), attribute volume 1, attribute order count 1, etc. Examples of such price point records are shown in FIGS. 21(*a*) and (*b*). In general, the number of unique attributes for a given financial instrument is expected to be small. Preferably, the ONPA module is configurable to allow the number of possible attributes to be defined dynamically for a given financial instrument.

The ONPA module may append the volume, order count, and price attribute to events when creating enriched limit order events 1604. Preferably, the ONPA module maintains price interest vectors that specify if any downstream applications or components require the price aggregated and/or attribute information. Furthermore, the ONPA module preferably updates flags in the event that specify if the event resulted in the addition, modification, or deletion of a price entry in the book as defined by attribute (see the price AMD field 2226 in FIG. 22).

The data structure used to store price point records preferably separately maintains regional price point records 2100 and composite price point records 2150 for limit orders. A regional price point record 2100 stores price point information for limit orders pertaining to a financial instrument traded on a specific regional exchange. A composite price point record 2150 stores price point information for limits order pertaining to a financial instrument traded across multiple exchanges. An example of a regional price point record is shown in FIG. 21(*a*), and an example of a composite price point record is shown in FIG. 21(*b*).

An exemplary regional price point record 2100 comprises a plurality of fields, such as:

A unique internal (UI) regional price identifier field 2102 for providing an internal identifier with respect to the subject price point record.

A symbol field 2104 as noted herein.

A GEID field 2106 as noted herein.

A bid/ask flag field 2108 as noted herein.

A price field 2110 as noted herein.

A volume field 2112, which identifies the volume of shares across all limit orders for the financial instrument (see the symbol field 2104) on the regional exchange (see the GEID field 2106) at the price identified in the price field 2110.

A count field 2114, which comprises a count of how many limit orders make up the volume 2112.

A timestamp field 2116 as noted above (which preferably is representative of the timestamp 1914 for the most recent limit order event 1600 that caused an update to the subject price point record.

A regional price attribute vector 2140, which as noted above, preferably not only flags whether any attributes are applicable to at least a portion of the volume making up the subject price point record, but also provides a breakdown of a volume and count for each attribute. For example, a flag 2118 to indicate whether attribute A0 is applicable, together with a volume 2120 and count 2122 for attribute A0, and a flag 2124 to indicate whether attribute A1 is applicable, together with a volume 2126 and count 2128 for attribute A1.

An interest vector field 2130 that serves to identify downstream subscribers that have an interest in the subject price point record. Optionally, this vector can be configured to not only identify which subscribers are interested in the regional price point record but also what fields in each regional price point record should each subscriber has an interest in.

An exemplary composite price point record 2150 comprises a plurality of fields, such as:

- A unique internal (UI) composite price identifier field 2152 for providing an internal identifier with respect to the subject price point record.
- A symbol field 2154 as noted herein.
- A bid/ask flag field 2156 as noted herein.
- A price field 2158 as noted herein.
- A volume field 2160, which essentially comprises the sum of the volume fields 2112 for all regional price point records which are aggregated together in the composite price point record.
- A count field 2162, which essentially comprises the sum of the count fields 2114 for all regional price point records which are aggregated together in the composite price point record.
- A timestamp field 2164 as noted above (which preferably is representative of the timestamp 1914 for the most recent limit order event 1600 that caused an update to the subject price point record.
- A composite price attribute vector 2180, which as noted above, preferably not only flags whether any attributes are applicable to at least a portion of the volume making up the subject price point record, but also provides a breakdown of a volume and count for each attribute. For example, a flag 2166 to indicate whether attribute A0 is applicable, together with a volume 2168 and count 2170 for attribute A0, and a flag 2172 to indicate whether attribute A1 is applicable, together with a volume 2174 and count 2176 for attribute A1.
- An interest vector field 2178 that serves to identify downstream subscribers that have an interest in the subject price point record. Optionally, this vector can be configured to not only identify which subscribers are interested in the composite price point record but also what fields in each composite price point record should each subscriber has an interest in.

Once again, however, it should be noted that regional and composite price point records 2100 and 2150 can be configured to have more or fewer and/or different data fields.

In the preferred embodiment, parallel engines update and maintain the order and price aggregation data structures in parallel. In one embodiment, the data structures are maintained in the same physical memory. In this case, the one or more order engines and one or more price engines interleave their accesses to memory, masking the memory access latency of the memory technology and maximizing throughput of the system. There are a variety of well-known techniques for memory interleaving. In one embodiment, an engine controller block utilizes a time-slot approach where each engine is granted access to memory at regular intervals. In another embodiment, a memory arbitration block schedules outstanding memory requests on the shared interface and notifies engines when their requests are fulfilled. Preferably, the memory technology is a high-speed dynamic memory such as DDR3 SDRAM. In another embodiment, the order and price data structures are maintained in separate physical memories. As in the single memory architecture, multiple engines may interleave their accesses to memory in order to mask memory access latency and maximize throughput.

Figure 17:
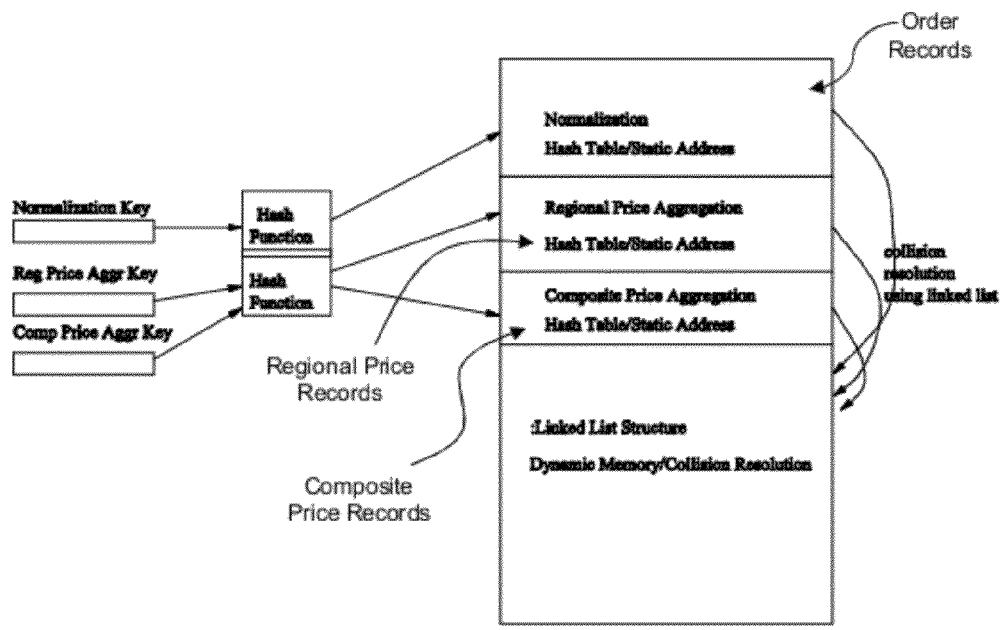
FIG. 17 depicts an exemplary embodiment for storing and accessing limit order records and price point records, wherein such records are stored in a shared memory.
Figure 18:
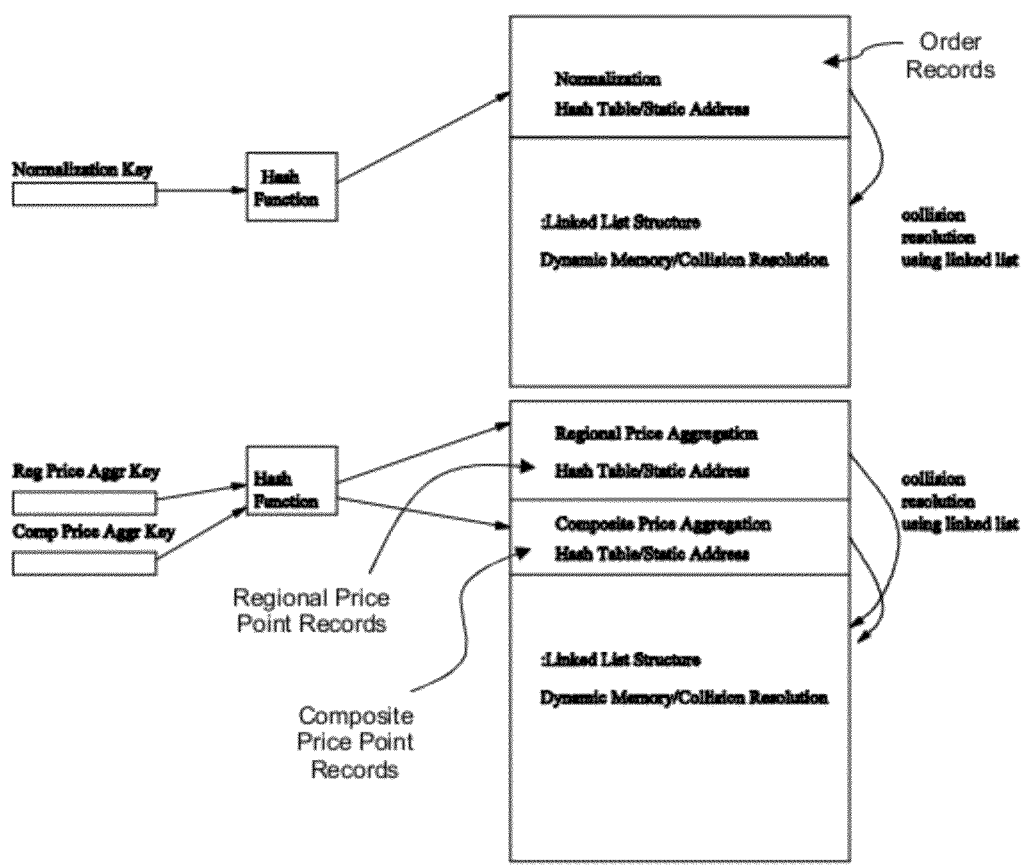
FIG. 18 depicts another exemplary embodiment for storing and accessing limit order records and price point records, wherein such records are partitioned across multiple physical memories.

FIG. 17 shows an example of how a single shared memory may be partitioned to support order normalization, regional price aggregation, and composite price aggregation. In this example, each hash table is allocated a portion of the memory space. Hash collisions are resolved by chaining, creating a linked list of entries that map to the same hash slot. Linked list entries for all three hash tables are dynamically allocated from a common memory space. FIG. 18 shows an example of how the ONPA module data structures may be partitioned across multiple physical memories. In this particular example, the normalization data structure is stored in one physical memory, while the regional and composite price aggregation data structures are stored in a second physical memory. This architecture allows memory accesses to be performed in parallel.

The ONPA module 1208, upon receipt of a limit order event 1600, thus (1) processes data in the limit order event 1600 to access memory 1602 (which may be multiple physical memories) and retrieve a limit order record 2000, regional price point record 2100 and composite price point record 2150 as appropriate, (2) processes data in the limit order event and retrieved records to update the records as appropriate, and (3) enriches the limit order event 1600 with new information to create an enriched limit order event 1604. An example of such an enriched limit order event 1604 is shown in FIG. 22. Preferably, the ONPA module appends a number of fields onto the limit order event 1600 that provide downstream subscribers with valuable information about market depth. In the example of FIG. 22, the enriched limit order event 1604 comprises fields such as:

- A field 2202 for the unique internal (UI) identifiers (such as UI ID 2002, UI regional price ID 2102 and UI composite price ID 2152).
- A symbol field 2204 as noted herein.
- A GEID field 2206 as noted herein.
- A reference number field 2208 as noted herein.
- A bid/ask flag field 2210 as noted herein.
- A price field 2212 as noted herein.
- A size field 2214 as noted herein.
- A timestamp field 2216 as noted herein.
- A regional volume field 2218 and a regional count field 2220. It should be noted that the ONPA module 1208 is preferably configured to append these fields onto the limit order event based on the updated volume and count values for the retrieved regional price point record pertinent to that limit order event.
- A composite volume field 2222 and a composite count field 2224. It should be noted that the ONPA module 1208 is preferably configured to append these fields onto the limit order event based on the updated volume and count values for the retrieved composite price point record pertinent to that limit order event.
- A field 2226 for identifying whether the limit order pertains to an add, modify or delete (AMD) (a field that the ONPA module may update based on the content of the limit order event relative to its pertinent limit order record).
- A price AMD field 2228 for identifying whether the limit order event caused an addition, modification, or deletion from a regional price point record and/or a composite price point record. The ONPA module can append this field onto the limit order event based on how the regional and composite price point records were processed in response to the content of the received limit order record 1600.

An enriched attribute vector 2250, which the ONPA module can append to the limit order event as a consolidation of the updated attribute vectors 2140 and 2180 for the regional and composite price point records that are pertinent to the limit order event. This enriched attribute vector can also include the order attribute vector 2030 from the pertinent limit order record. Thus, the enriched attributed vector 2250 may comprise an order attribute vector field 2230, a regional price attribute vector field 2232 and a composite price attribute vector field 2234.

An interest vector field 2236 that serves to identify downstream subscribers that have an interest in data found in the enriched limit order event. The ONPA module can append the interest vector as a consolidation of the interest vectors 2022, 2130 and 2178 for the limit order, regional price point and composite price point records that are pertinent to the limit order event.

Once again, however, it should be noted the ONPA module can be configured to enrich limit order events with more and fewer and/or different data fields.

The outgoing enriched limit order events 1604 thus serve as the stream view of processed limit order data 1210 that can be produced by the ONPA module 1208 at extremely low latency.

Figure 23:
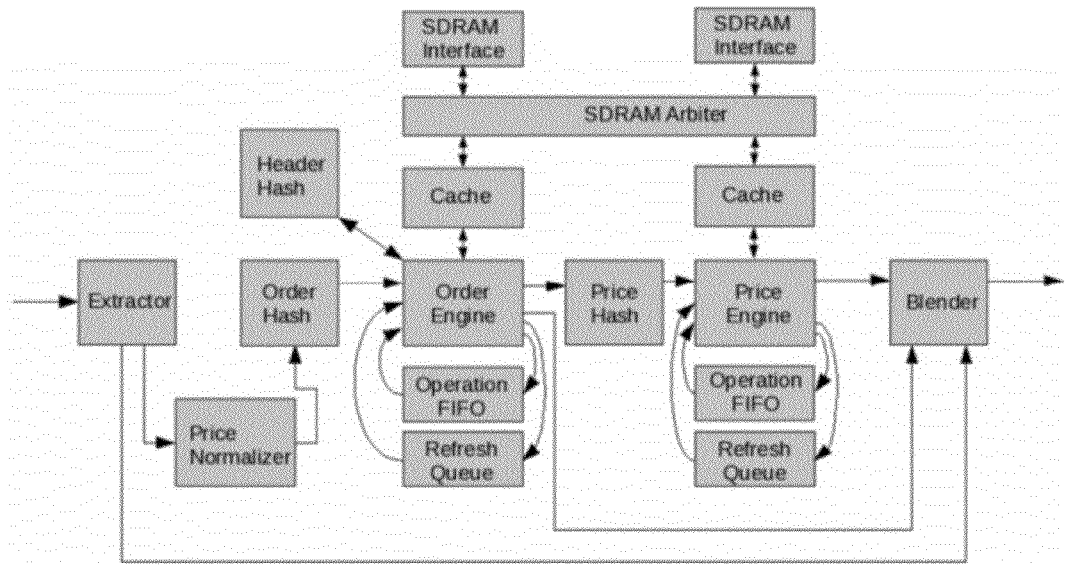
FIG. 23 depicts an exemplary architecture for an order normalization and price aggregation (ONPA) module.

A block diagram of an exemplary embodiment for the ONPA module 1208 is shown in FIG. 23.

The Extractor module is responsible for extracting from an input market event the fields needed by the rest of the modules within the ONPA module and presenting those fields in parallel to downstream modules. The Extractor also forwards the event to the Blender module for message reconstruction.

The Price Normalizer module converts variably typed prices into normalized fixed-sized prices (e.g. 64-bit values). In the preferred embodiment, the new prices are in units of either billionths or 256ths. The power of 2 price conversions may be performed by simple shifts. The power of 10 price conversions take place in a pipeline of shifts and adds.

In the preferred embodiment, the Hash modules are responsible for doing the following:

Order Hash Module—Hashing the symbol, exchange identifier, and order reference number to create an address offset into the static order region of the memory which contains the first entry in the linked list that contains or will contain the desired order.

Price Hash Module—Hashing the symbol, exchange identifier, and price to create an address offset into the static price region of the memory (for both regional price records and composite price records) which contains the first entry in the linked list that contains or will contain the desired price level.

Header Hash Module—Hashing the symbol and the exchange identifier to create an address offset into the static header region that contains pointers to the first entries in both the order refresh list and the price refresh list.

With respect to such refresh lists, the inventors note that a refresh event can be used to initialize the book view provided to client applications. Thus, one of the responsibilities of the Level 2 processing pipeline can be to generate book snapshots for client application initialization. At subscription time, a refresh event provides a snapshot of the book at a particular instant in time. It is at this point that the appropriate bits in the interest vector are set in the appropriate data structures. Following the refresh event, incremental update events are delivered to the client application in order to update the client application's view of the book. Refresh events may be processed in-line with incremental update events in the FAM pipeline. In order to minimize the overhead of generating the book snapshot, refresh events may be processed asynchronously. So long as the snapshot of the book is an atomic event that records the event sequence number of the most recent update, the snapshot need not be processed synchronous to all incremental update traffic. Synchronizing buffers in the client API may be used to buffer incremental updates received prior to receipt of the refresh event. When the refresh event is received, incremental updates in the synchronization buffer are processed. Updates with sequence numbers less than or equal to the sequence number noted in the refresh event are discarded.

The Order Engine module is responsible for the following:
Traversing the hash linked list for limit order records.
Traversing the refresh linked lists for refreshes.
Performing adds, modifies, and deletes on the limit order records.
Performing necessary maintenance to the linked lists.

The Price Engine module is responsible for the following:
Traversing the hash linked list for price levels in the regional and composite price point records.
Traversing the refresh linked lists for refreshes.
Performing aggregation tasks for order adds, modifies, and deletes at a given price level for the regional and composite price point records.
Adding and deleting price levels as appropriate from the data structure.
Performing necessary maintenance to the linked lists.

The Cache module optimizes performance by maintaining the most recently accessed records in a fast, on-chip memory. The Cache module is responsible for the following:
Storing limit order records, price point records, and header nodes for fast and non-stale access.
Keeping track of which SDRAM addresses are cached.
Fetching un-cached data from SDRAM when requested by an order or price engine.
Providing the local on-chip memory address for direct access when an SDRAM address is queried.

The Operation FIFO module is responsible for the following:
Storing operation data during pipeline hibernation.
Monitoring next pointer information from the order and price engines during deletes for automatic address forwarding.

The Refresh Queue module is configured to store refreshes that are received while another refresh is currently being processed. The Blender module may only able to check one order refresh and one price refresh at a time, which limits the number of concurrent refreshes. The SDRAM arbiter module arbitrates accesses from the order and price engines to the two SDRAM interfaces. The Blender module also constructs an outgoing enriched and normalized event using the original event and various fields created by the order and price engines (see FIG. 22). It also coalesces micro-events from refreshes to create outgoing requested refresh images. The Blender module is also preferably configured to normalize conflicts between the refresh and the event stream.

If desired by a practitioner, the ONPA module's stream view output 1210, comprising the enriched limit order events, may be transmitted directly to clients with appropriate stream view subscriptions. An Interest and Entitlement Filtering (IEF) module 1210 can be located downstream from the ONPA module as shown in FIGS. 12 (*b*) and (*c*). The IEF module 1210 can be configured to utilize the mapped symbol index to resolve the set of interested and entitled clients for the given enriched limit order event, as described in the above-referenced and incorporated U.S. Patent Application Publication 2008/0243675. Also, for enriched limit order events 1604 that include an interest vector field 2234, the IEF module 1210 can also utilize such an interest vector to identify interested and entitled clients. The filtering aspect of the IEF module may be extended to filter specific fields from enriched limit order events 1604 based on the type of book view specified by client applications. For example, a sorted order view does not require price aggregated volume and order count fields, and the IEF module 1210 can be configured to remove those fields from enriched limit order events for clients who want a sorted order view. Event transmission latency can be reduced and downstream network bandwidth can be conserved by omitting these fields from update events.

As shown in FIG. 12(*c*), a message formatting (MF) module 1212 can be deployed downstream from the IEF module 1210 to format outgoing enriched limit order events destined for interested and entitled subscribers to a message format expected by those subscribers. An exemplary embodiment for the MF module 1212 is described in the above-referenced and incorporated U.S. Patent Application Publication 2008/0243675.

As noted above, some clients may prefer to receive a stream view comprising enriched limit order events because they will build their own sorted data structures of the order book data. Thus, in one embodiment of the invention, the output of the pipeline 1200 shown in FIGS. 12(*a*)-(*c*) can be transmitted to a consuming system (client machine) where it is processed by an Application Programming Interface (API) associated with the ticker plant, as shown in connection with FIG. 24. The API performs the sorting and presents the client application with a summary view of the data. The sorting task may be performed using a variety of techniques known in the art.

Figure 24:
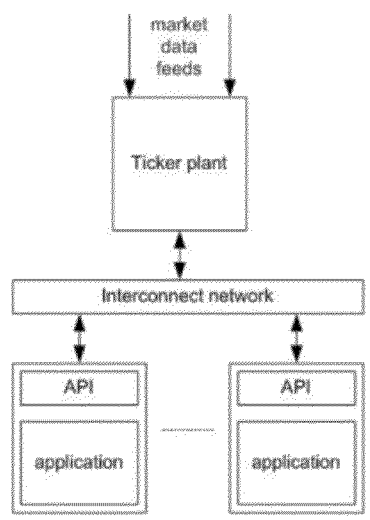
FIG. 24 depicts an exemplary embodiment where an API in a client application is configured to produce a sorted view of an order book from a stream view of an order book provided by a ticker plant.
Figure 25A:
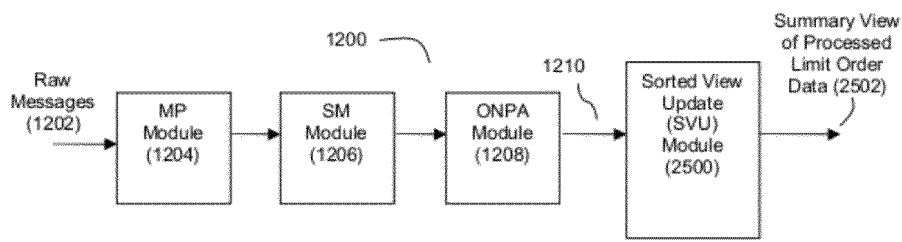
FIGS. 25(a)-(d) depict various embodiments of a pipeline for generating summary views of order books.
Figure 25B:
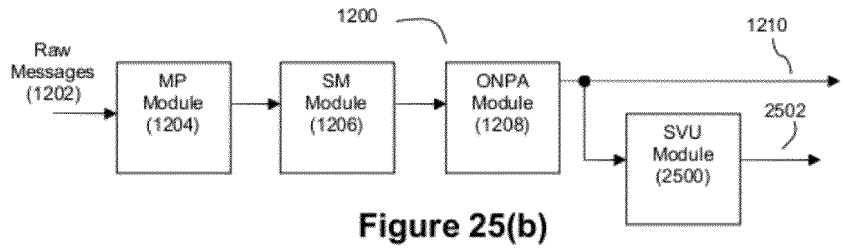
Figure 25C:
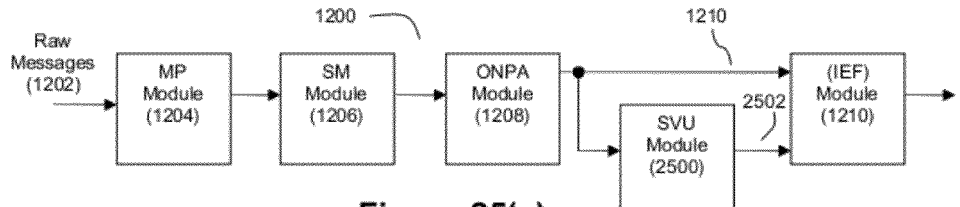
Figure 25D:
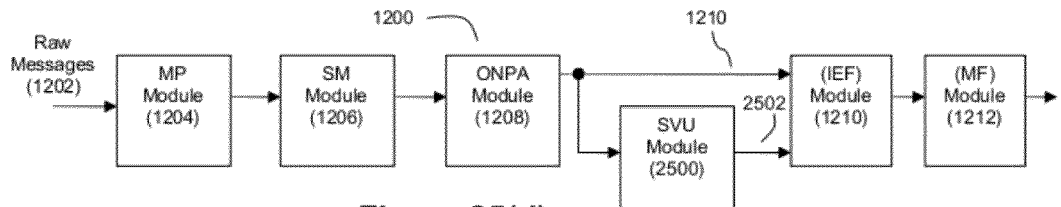

However, other clients may prefer to receive the summary view from the ticker plant itself. For additional embodiments of the invention, the inventors disclose sorting techniques that can be deployed in pipeline 1200 implemented within the ticker plant coprocessor to create summary views of the order data. However, it should be noted that these sorting techniques could also be performed in an API as shown in FIG. 24 if desired by a practitioner.

FIGS. 25(*a*)-(*d*) depict exemplary embodiments of the pipeline 1200 where a Sorted View Update (SVU) module 2500 is included to create a summary view 2502 of the order books from the enriched limit order events. With the examples of FIGS. 25(*b*)-(*d*), it should be noted that the pipeline 1200 is configured to provide both stream views 1210 to interest clients and summary views 2402 to interest clients.

While the SVU module 2500 can be configured to provide sorting functionality via any of a number of techniques, with a preferred embodiment, the SVU module employs sorting engines to independently maintain each side (bid and ask) of each order book. Since input order and price events only affect one side of the order book, accessing each side of the book independently reduces the potential number of entries that must be accessed and provides for parallel access to the sides of the book. Each side of the book is maintained in sorted order in physical memory. The book is "anchored" at the bottom of the memory allocation for the book, i.e. the last entry is preferably always stored at the last address in the memory allocation. As a consequence the location of the "top" of the book (the first entry) varies as the composition of the order book changes. In order to locate the top of the book, the SVU module 2500 maintains a record that contains pointers to the top of the bid and ask side of the book, as well as other meta-data that may describe the book. The record may be located directly by using the symbol map index. Note that inserting an entry into the book moves entries above the insertion location up one memory location. Deleting an entry in the book moves entries above the insertion location down one memory location. While these operations may result in large numbers of memory copies, performance is typically good as the vast majority of order book transactions affect the top positions in the order book. Since the price AMD field 2226 in the enriched limit order event 1604 specifies whether or not a price entry has been inserted or deleted, the sorting engine within the SVU module 2500 can make use of this information to make a single pass through the sorted memory array. Furthermore, since the price aggregation engine within the ONPA module maintains all volume, order count, and attribute information for each price entry in the price point records, the entries in the SVU data structure only need to store the values required for sorting.

For regional order summary views, the SVU module preferably maintains a pair of bid and ask books for each symbol on each exchange upon which it trades. The entries in each book are from one exchange. Since the order engine within the ONPA module maintains all information associated with an order, the SVU data structure only needs to maintain the fields necessary for sorting and the unique order identifier assigned by the ONPA module. In some cases, only the price and timestamp are required for sorting.

For price summary views, the SVU module preferably maintains a pair of spliced bid and ask books for each symbol. The entries in each book are from every exchange upon which the symbol trades. Since the price aggregation engine within the ONPA module maintains all information associated with a price level, the SVU data structure only needs to maintain the fields necessary for sorting (i.e. price) and the unique price identifier assigned by the ONPA module. Composite, spliced, and regional views of the price book may be synthesized from this single spliced book. Attribute filtered and price merged views of the price book may be synthesized in the same way. A price book sorting engine in the SVU module computes the desired views by aggregating multiple regional entries to produce composite entries and positions, and filters unwanted regional price entries to produce regional entries and positions. These computations are performed as the content of each book is streamed from memory through the engine. In order to minimize the memory bandwidth consumed for each update event, the engine requests chunks of memory that are typically smaller in size than the entire order book. Typically, a default memory chunk size is specified at system configuration time. Engines request the default chunk size in order to fetch the top of the book. If additional book entries must be accessed, the engines request the next memory chunk, picking up at the next address relative to the end of the previous chunk. In order to mask the latency of reading chunks of memory, processing, and requesting the next chunk of memory, multiple engines interleave their accesses to memory. As within the ONPA module, interleaving is accomplished by using a memory arbitration block that schedules memory transactions for multiple engines. Note that a time-slot memory controller may also be used. Engines may operate on unique symbols in parallel without affecting the correctness of the data.

Figure 26:
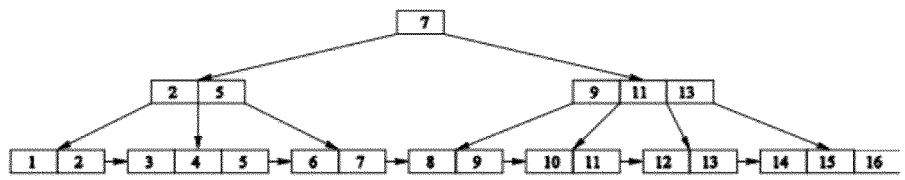
FIG. 26 depicts an example of a B+ tree.

In another embodiment of the Sorted View Update module, each side of the book is organized as a hierarchical multi-way tree. The depth of a multi-way tree is dictated by the number of child branches leaving each node. A B+ tree is an example of a multi-way tree where all entries in the tree are stored at the same level, i.e. the leaf level. Typically, the height of a multi-way tree is minimized in order to minimize the number of nodes that must be visited in order to reach a leaf node in the tree, i.e. the desired entry. An example of a B+ tree is shown in FIG. 26. Note that the leaf nodes may be organized as a linked list such that the entire contents of the tree may be accessed by navigating to the leftmost child and following the pointers to the next child node. This feature can be exploited in the SVU module to quickly produce a refresh event, a snapshot of the entire contents of the order book in order to initialize newly subscribed clients. Furthermore, a direct pointer to the leftmost child may be stored along with the root node in order to provide fast access to the top of the sorted book.

FIG. 26 shows a simple example of a set of positive integers sorted using a B+ tree. Note that all of the stored integers are stored in the leaf nodes. As is well-known in the art, B+ tree nodes vary in size between a minimum and maximum size threshold that is dictated by the branching factor of the tree. Note that "next pointers" are stored in each leaf node to create a linked list of leaf nodes that may be quickly traversed to retrieve the entire sorted order. Internal tree nodes contain integers that dictate ranges stored the child nodes. For example, all integers less than or equal to 7 are stored in the left sub-tree of the root node.

Figure 27:
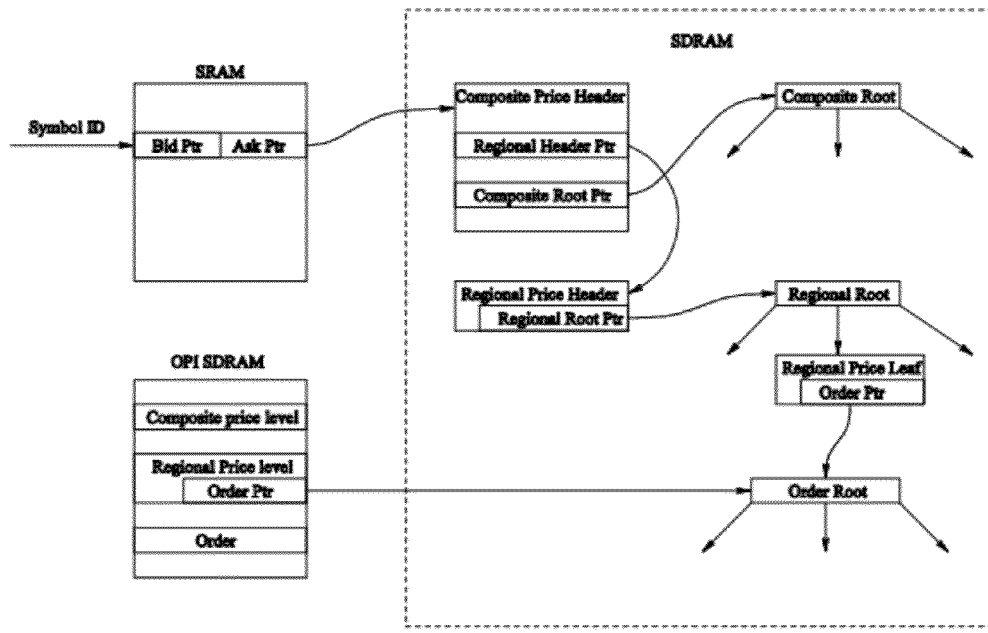
FIG. 27 depicts an example of how a module can be configured to access sorted order book data within a data structure.

The SVU module can be configured to utilize hierarchical B+ trees to minimize the number of memory accesses required to update the various book views. As shown in FIG. 27, the SVU module can be configured to maintain a header record that contains pointers to the root of the composite and regional book trees. The root tree is the price aggregated tree. Each leaf of the price aggregated tree contains a pointer to a B+ tree that maintains a sort of the orders at the given price point. With such an embodiment, the SVU module preferably maintains a hierarchical B+ tree for the composite views and each regional view of the book. Note that each side of the book (bid and ask) corresponds to a hierarchical B+ tree. Note that hierarchical B+ trees may also be used in the embodiment where sorting is performed by the API on the client machine. Furthermore, note that a portion of the sorting may be offloaded to the API on the client machine. For example, construction of the spliced view of the book may be offloaded to the API by subscribing to the summary view of all regional books.

Similar to the insertion sorting engines in the previous embodiment, a parallel set of tree traversal engines can operate in parallel and interleave their accesses to memory. Furthermore, the SVU module may optionally cache recently accessed tree nodes in on-chip memory in order to further reduce memory read latency.

Figure 28:
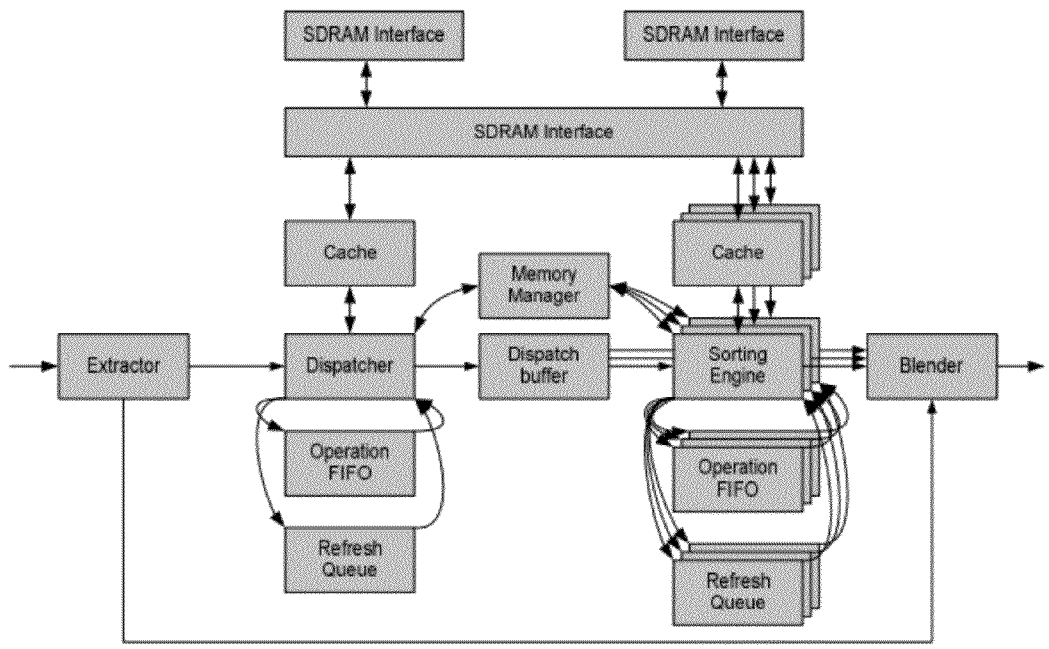
FIG. 28 depicts an exemplary architecture for a sorted view update (SVU) module.

FIG. 28 depicts an exemplary embodiment for the SVU module 2500. Like the ONPA module, the SVU module 2500 of FIG. 28 utilizes a functional pipeline to achieve parallelism among the dispatching and sorting engines. It also uses data parallelism to instantiate multiple sorting engines in order to make full use of the available memory bandwidth to maximize message throughput performance.

The Extractor module provides the same service of extracting necessary fields for processing as described in connection with the ONPA module, and the Extractor module further propagates those fields to the Dispatcher. The Extractor module also preferably propagates the full event to the Blender module.

The Dispatcher module is responsible for fetching the header record that contains pointers to the composite and regional book trees. A cache positioned between the Dispatcher module and the SDRAM Arbiter module provides quick access to recently accessed header records. The operation FIFO module stores event fields and operational state while the Dispatcher module is waiting for memory operations to complete. This allows the Dispatcher module to operate on multiple events in parallel.

When the book pointers have been received from memory, the Dispatcher module passes the event fields and the book pointers to one of several parallel sorting engine modules. All events for a given symbol are preferably processed by the same sorting engine module, but events for different symbols may be processed in parallel by different sorting engine modules. The Dispatcher module may balance the workload across the parallel sorting engines using a variety of techniques well-known in the art. For example, the inventors have found that a random distribution of symbols across sorting engines provides an approximately even load balance on average. Note that a Dispatch Buffer module resides between the Dispatcher module and the sorting engines. This buffer maintains separate queues of pending events for each sorting engine. It reduces the probability of head-of-line blocking when a single sorting engine is backlogged. Pending events for that engine are buffered, while events scheduled for other sorting engines may be processed when the associated sorting engine is ready. The sorting engine may utilize the modified insertion sort or B+ tree sorting data structures described above. In the preferred embodiment, the B+ tree sorting data structure is used. The sorting engine is responsible for:

Inserting and removing price levels from the sorted data structure

Inserting and removing orders from sorted price levels in the sorted listing

Identifying the relative position of the price level

Identifying the relative position of the order

The sorting engines include the relative price and order position in outgoing events. For example, the sorting engines can be configured to append data fields onto the order events it processes that identify the sort position for the order and/or price within the various books maintained by the data structure. Thus, the SVU module can create the summary views by further enriching the limit order events that it receives with sort position information for one or more books maintained by the pipeline. This positional information may be in the form of a scalar position (e.g. $3^{rd}$ price level) or a pointer to the previous entry (e.g. pointer to the previous price level). Each sorting engine has an associated cache, operation FIFO, and refresh FIFO. The cache provides fast access to recently accessed memory blocks, which optimizes latency performance for back-to-back operations to the top of the same order book. Each sorting engine may operate on multiple events in parallel by storing in-process fields and state in its operation FIFO. Note that the sorting engines ensure correctness and data structure coherency by monitoring for accesses to the same data structure nodes. Similarly, the sorting engines incrementally process refresh events to service new client subscriptions by employing the refresh queue, similar to the ONPA module.

The output of each sorting engine is passed to the Blender module which constructs the normalized output event by blending the positional information from the sorting engine with the event fields passed by the Extractor module. Note that the Blender maintains a queue for each sorting engine that stores the pending event fields.

Level 2 updates from the ticker plant may be delivered to client applications in the form of discrete events that update the state of one or more book views presented by the client API. For summary views, the API preferably maintains a mirror data structure to the SVU module. For example, if the SVU module employs B+ trees the API preferably maintains a B+ tree. This allows the SVU module to include parent/child pointers in the update event. Specifically, the SVU module assigns a locally unique identifier to each node in the B+ tree for the given book view. The SVU module enriches the update events with these identifiers to specify the maintenance operations on affected nodes in the data structure. For example, the update event may specify that the given price identifier be added to a given node. This allows the API to perform constant time updates to its data structure using direct addressing and prevents the need for a tree search operation.

Level 2 updates from the ticker plant may also be delivered to client applications in the form of snapshots of the top N levels of a book view, where N is typically on the order of 10 or less. N may be specified by the ticker plant or the subscribing application. In the case that the book view is natively maintained by the SVU module, the snapshot is readily produced by simply reading the first N entries in the sorted data structure. When B+ trees are used, nodes may be sized such that snapshots may be produced in a single memory read. In the case that the SVU module synthesizes the book view (such as composite or attribute filtered views), the SVU preferably reads a sufficient number of entries from the underlying sorted view to produce N entries in the synthesized view. Snapshot delivery from the ticker plant significantly reduces the amount of processing required on client systems by the API to produce the specified book views. The API simply copies the snapshot into a memory array and presents the view to the client application.

Figure 29:
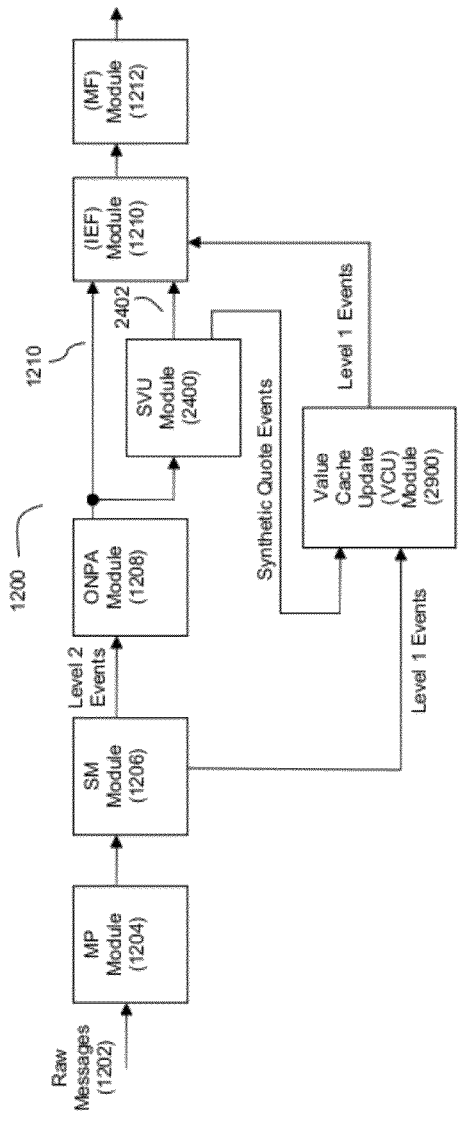
FIG. 29 depicts an exemplary pipeline that includes a value cache update (VCU) module operating on synthetic quote events created by an SVU module.
Figure 30:
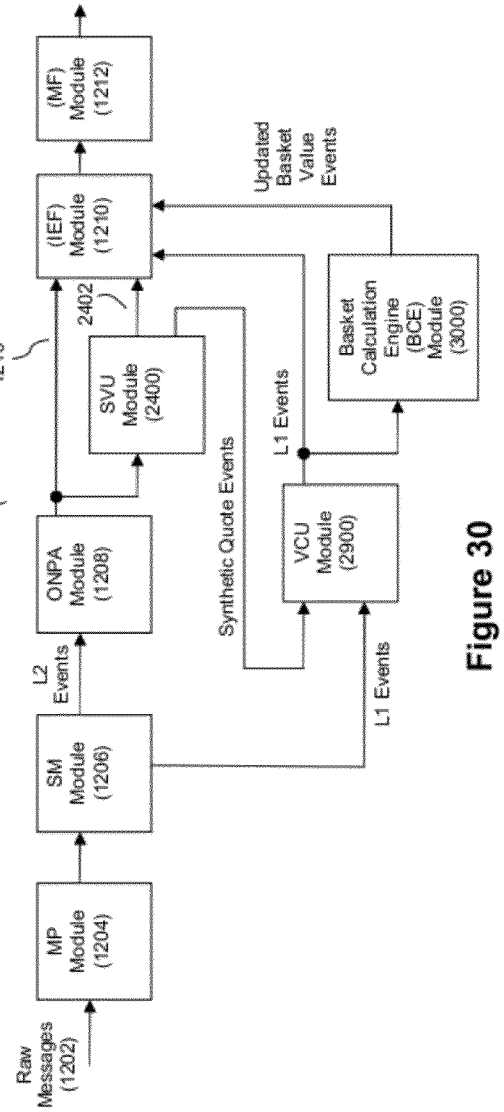
FIG. 30 depicts an exemplary pipeline that includes a basket calculation engine (BCE) module driven in part by synthetic quote events created by an SVU module.

In accordance with another embodiment, the pipeline 1200 can leverage its likely ability to generate quote messages before that quote appears in a Level 1 feed published by an exchange. As shown in FIG. 29, the pipeline 1200 can be augmented to pass synthetic quote events from the SVU module to a Value Cache Update (VCU) module 2900 that handles Level 1 traffic. With the embodiment of FIG. 29, the SVU module is configured with logic for detecting when an order or price book update event modifies the top of the book (best bid or offer) (e.g., new price, size, or timestamp). In response to detecting such an event, the SVU module generates a synthetic quote event that contains the new bid or ask price and aggregate order size at that price for the given regional and/or composite view of the book for the associated symbol. The VCU module 2900 receives this synthetic quote event, updates a Last Value Cache (LVC) data structure that contains the associated Level 1 record for the symbol and transmits a Level 1 quote message to interested and entitled subscribers. Records in the LVC data structure represent a current state of a financial instrument in the market place. As indicated above, because of the extreme low latency provided by the ONPA and SVU modules, it is expected that the SVU module will be able to recognize when order events affect the top of a book before that situation is reflected in a conventional level 1 feed from an exchange. Thus, by recognizing and delivering synthetic quote events to the VCU module 2900, the inventors believe that the pipeline 1200 of FIG. 29 is configured to generate level 1 events from a feed of level 2 events with favorably low latency.

It should be noted that an exemplary embodiment for the VCU module 2900 is described in the above-referenced and incorporated U.S. Patent Application Publication 2008/0243675 (e.g., see FIGS. 15(a) and (b) therein).

In yet another exemplary embodiment, the pipeline 1200 of FIG. 29 can be further configured to include a basket calculation engine (BCE) module 3000 downstream from the VCU module 2900. An exemplary embodiment for the BCE module 3000 is described in the above-referenced and incorporated U.S. Patent Application Publication 2009/0182683. The BCE module 3000 can be configured to operate on level 1 event resulting from the synthetic quote event to effectively drive Net Asset Value (NAV) computations for baskets of financial instruments from low latency Level 2 data. The inventors believe that this chaining of synthetic quote generation and basket calculation is capable of providing a considerable speed advantage for a number of trading strategies including index arbitrage.

Figure 31:
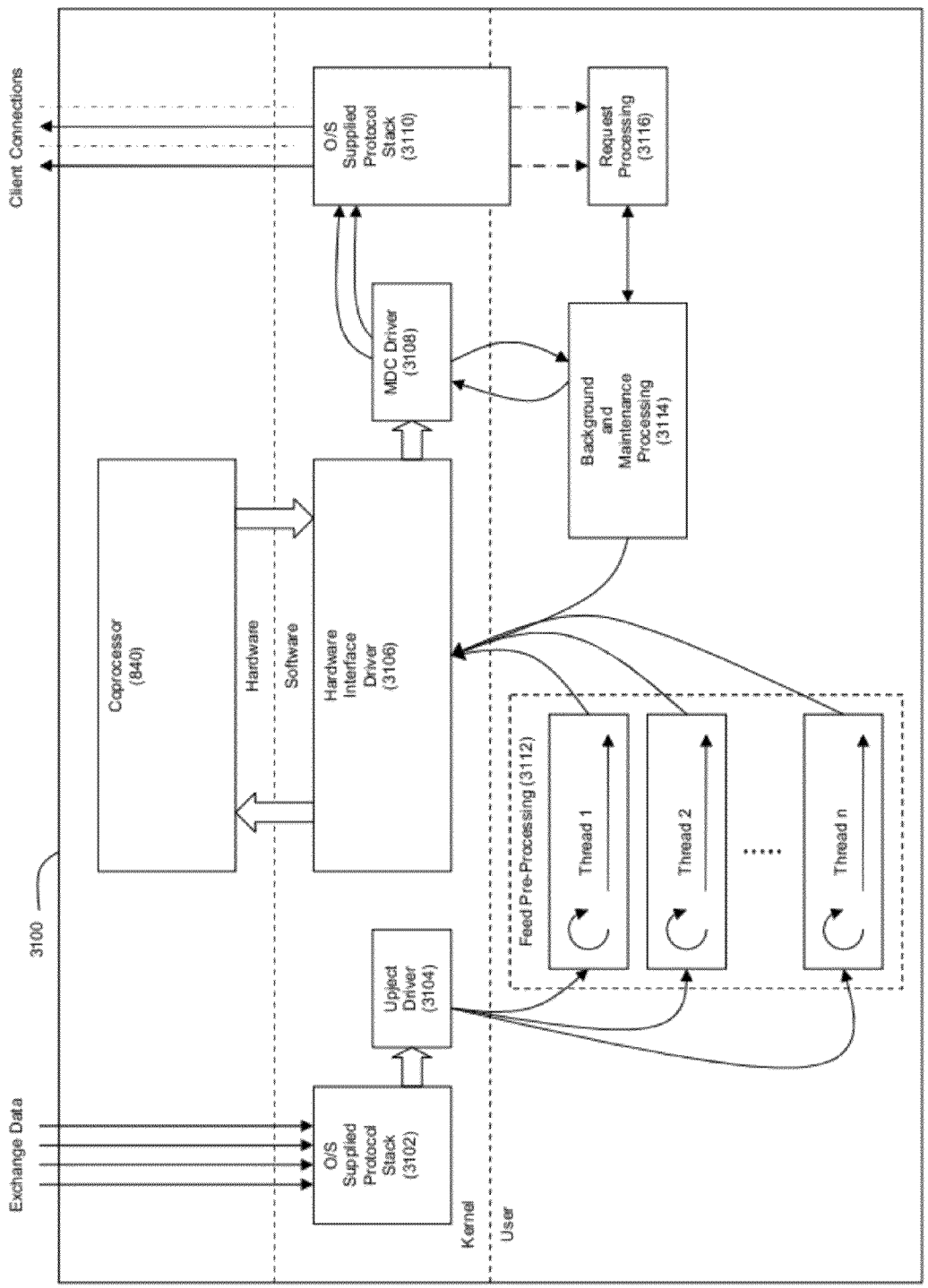
FIG. 31 depicts an exemplary ticker plant architecture in which a pipeline configured to process financial market depth data can be employed.

The aforementioned embodiments of the pipeline 1200 may be implemented in a variety of parallel processing technologies including: Field Programmable Gate Arrays (FPGAs), Chip Multi-Processors (CMPs), Application Specific Integrated Circuits (ASICs), Graphics Processing Units (GPUs), and multi-core superscalar processors. Furthermore, such pipelines 1200 may be deployed on coprocessor 840 of a ticker plant platform 3100 as shown in FIG. 31. It should also be noted that the pipelines disclosed herein can be implemented not only in the ticker plants resident in trading firms but also in the ticker plants resident within the exchanges themselves to accelerate the exchanges' abilities to create and maintain their own order books. Additional details regarding such a ticker plant platform 3100 can be found in the above-referenced and incorporated U.S. Patent Application Publications 2009/0182683 and 2008/0243675. In summary, the financial market data from the exchanges is received at the O/S supplied protocol stack 3102 executing in the kernel space on processor 812 (see FIGS. 8(a)-(b)). An upject driver 3104 delivers this exchange data to multi-threaded feed pre-processing software 3112 executing in the user-space on processor 812. These threads may then communicate data destined for the coprocessor 840 to the hardware interface driver software 3106 running in the kernel space.

Instructions from client applications may also be communicated to the hardware interface driver 3106 for ultimate delivery to coprocessor 840 to appropriately configure pipeline 1200 that is instantiated on coprocessor 840. Such instructions arrive at an O/S supplied protocol stack 3110 from which they are delivered to a request processing software module 3116. A background and maintenance processing software module 3114 thereafter determines whether the client application has the appropriate entitlement to issue such instructions. If so entitled, the background and maintenance processing block 3114 communicates a command instruction to the hardware interface driver 3106 for delivery to the coprocessor to appropriately update the pipeline 1200 to reflect any appropriate instructions.

The hardware interface driver 3106 then can deliver an interleaved stream of financial market data and commands to the coprocessor 840 for consumption thereby. Details regarding this stream transfer are described in the above-referenced and incorporated U.S. Patent Application Publication 2007/0174841. Outgoing data from the coprocessor 840 returns to the hardware interface driver 3106, from which it can be supplied to MDC driver 3108 for delivery to the client connections (via protocol stack 3110) and/or delivery to the background and maintenance processing block 3114.

While the present invention has been described above in relation to its preferred embodiments, various modifications may be made thereto that still fall within the invention's scope. Such modifications to the invention will be recognizable upon review of the teachings herein. Accordingly, the full scope of the present invention is to be defined solely by the appended claims and their legal equivalents.

What is claimed is:

1. A method comprising:
   streaming data representative of a plurality of limit order events pertaining to a plurality of financial instruments into a reconfigurable logic device;
   the reconfigurable logic device processing the streaming data to determine order book data associated with the limit order events; and
   the reconfigurable logic device generating a stream of enriched limit order events by enriching the limit order events with data indicative of the determined order book data.

2. The method of claim 1 wherein the generating step comprises the reconfigurable logic device appending a plurality of data fields to a plurality of limit order events to generate the enriched limit order events.

3. The method of claim 2 wherein the appending step comprises the reconfigurable logic device appending at least one price volume field to a limit order event.

4. The method of claim 3 wherein the at least one price volume field comprises a regional price volume field.

5. The method of claim 3 wherein the at least one price volume field comprises a composite price volume field.

6. The method of claim 2 wherein the appending step comprises the reconfigurable logic device appending at least one price order count field to a limit order event.

7. The method of claim 6 wherein the at least one price order count field comprises a regional price order count field.

8. The method of claim 6 wherein the at least one price order count field comprises a composite price order count field.

9. The method of claim 2 wherein the appending step comprises the reconfigurable logic device appending at least one order attribute vector field to a limit order event, the order attribute vector indicative of an impact of an attribute on an order book associated with the limit order event.

10. The method of claim 2 wherein the appending step comprises the reconfigurable logic device appending at least one price attribute vector field to a limit order event, the price attribute vector indicative of an impact of an attribute on a price point order book associated with the limit order event.

11. The method of claim 10 wherein the at least one price attribute vector field comprises a regional price attribute vector field.

12. The method of claim 10 wherein the at least one price attribute vector field comprises a composite price attribute vector field.

13. The method of claim 2 wherein the appending step comprises the reconfigurable logic device appending at least one sort order field to a limit order event, the sort order field being indicative of a relative position of the limit order event within an associated order book.

14. The method of claim 13 wherein the sort order field is indicative of a relative position of the limit order event within an associated price aggregated order book.

15. The method of claim 13 wherein the sort order field is indicative of a relative position of the limit order event within an associated composite price aggregated order book.

16. The method of claim 2 wherein the appending step comprises the reconfigurable logic device appending at least one interest vector field to a limit order event, the interest vector field being indicative of which of a plurality of client applications are interested in receiving the enriched limit order event.

17. The method of claim 16 wherein the interest vector field is further indicative of which fields of the enriched limit order event each of the plurality of client applications are interested in receiving.

18. The method of claim 1 wherein the processing step comprises:
   the reconfigurable logic device resolving each of a plurality of limit order events to at least one record associated with an order book in a data structure and
   the reconfigurable logic device updating the records based on the content of the plurality of limit order events.

19. The method of claim 1 wherein the enriched limit order events comprises a stream view of a plurality of order books associated with the limit order events.

20. The method of claim 1 wherein the enriched limit order events comprises a summary view of a plurality of order books associated with the limit order events.

21. The method of claim 1 wherein the reconfigurable logic device is resident within a ticker plant.

22. The method of claim 1 wherein each of the limit order events is associated with a limit order for the financial instrument to which it pertains, the method further comprising:
   accessing the order book data in a memory, the order book data comprising (1) a plurality of limit order records corresponding to a plurality of limit orders for a plurality of financial instruments and (2) a plurality of price point records corresponding to financial instruments for which there are limit order records, the limit order records comprising a plurality of limit order record fields, and the price point records comprising a plurality of price point record fields;
   wherein the processing step comprises the reconfigurable logic device (1) mapping a plurality of the limit order events to the limit order records corresponding to their associated limit orders, (2) mapping a plurality of the limit order events to the price point records corresponding to the financial instruments for their associated limit orders, and (3) updating the mapped limit order records and the mapped price point records based on the limit order events; and
   wherein the generating step comprises the reconfigurable logic device, for those limit order events that are mapped to limit order records and price point records, appending at least one limit order record field from the updated limit order records and at least one price point record field from the updated price point records to those limit order events to generate enriched limit order events.

23. The method of claim 22 wherein the reconfigurable logic device performs the method steps at hardware processing speeds as the limit order events stream through the reconfigurable logic device, wherein the generating step comprises the reconfigurable logic device directly generating the stream of enriched limit order events from the received streaming data, and wherein the method further comprises communicating the stream of enriched limit order events downstream.

24. The method of claim 22 wherein the mapped limit order record for at least one of the limit order events includes a limit order record field that comprises an identifier for an attribute with respect to the determined limit order record; and
   wherein the appending step comprises the reconfigurable logic device appending the attribute identifier to the at least one limit order event.

25. The method of claim 24 wherein the attribute identifier is indicative of whether the determined limit order record pertains to an ephemeral regional order.

26. The method of claim 24 wherein the attribute identifier is indicative of whether the determined limit order record relates to an implied liquidity.

27. The method of claim 22 wherein the mapped limit order record for at least one of the limit order events includes a limit order record field that comprises an attribute identifier indicative of whether the mapped limit order record pertains to an ephemeral regional order and a limit order record field that comprises an attribute identifier indicative of whether the mapped limit order record relates to an implied liquidity, the ephemeral regional order attribute identifier and the implied liquidity attribute identifier serving as an attribute vector; and
wherein the appending step comprises the reconfigurable logic device appending the attribute vector to the at least one limit order event.

28. The method of claim 22 wherein the mapped price point record for at least one of the limit order events includes a price point record field that comprises an identifier for an attribute with respect to the mapped price point record; and
wherein the appending step comprises the reconfigurable logic device appending the attribute identifier to the at least one limit order event.

29. The method of claim 28 wherein the attribute identifier is indicative of whether the mapped price point record includes price data pertaining to one or more ephemeral regional orders;
wherein the mapped price point record for the at least one limit order event further includes a price point record field that comprises a volume for the one or more ephemeral regional orders and a price point record field that comprises a count for the one or more ephemeral regional orders; and
wherein the appending step further comprises the reconfigurable logic device appending the ephemeral regional order volume and the ephemeral regional order count to the at least one limit order event.

30. The method of claim 28 wherein the attribute identifier is indicative of whether the mapped price point record includes price data that relates to implied liquidity;
wherein the mapped price point record for the at least one limit order event further includes a price point record field that comprises a volume for the implied liquidity and a price point record field that comprises a count for the implied liquidity; and
wherein the appending step further comprises the reconfigurable logic device appending the implied liquidity volume and the implied liquidity count to the at least one limit order event.

31. The method of claim 22 wherein the mapped price point record for at least one of the limit order events includes (1) a price point record field that comprises an attribute identifier indicative of whether the mapped price point record includes price data pertaining to one or more ephemeral regional orders, (2) a price point record field that comprises a volume for the one or more ephemeral regional orders, (3) a price point record field that comprises a count for the one or more ephemeral regional orders, (4) a price point record field that comprises an attribute identifier indicative of whether the mapped price point record includes price data that relates to implied liquidity, (5) a price point record field that comprises a volume for the implied liquidity and (6) a price point record field that comprises a count for the implied liquidity;
wherein the ephemeral regional order attribute identifier, the ephemeral regional order volume, the ephemeral regional order count, the implied liquidity attribute identifier, the implied liquidity volume, and the implied liquidity count serve as an attribute vector; and
wherein the appending step comprises the reconfigurable logic device appending the attribute vector to the at least one limit order event.

32. The method of claim 22 wherein the mapped price point record for at least one of the limit order events includes a price point record field that comprises a price volume and a price point record field that comprises a price count;
wherein the updating step comprises the reconfigurable logic device (1) computing an updated price volume and an updated price count for the mapped price point record based on the at least one limit order event, and (2) updating the mapped price point record with the updated price volume and the updated price count; and
wherein the appending step comprises the reconfigurable logic device appending the updated price volume and the updated price count to the at least one limit order event.

33. The method of claim 22 wherein the price point records comprise a plurality of regional price point records and a plurality of composite price point records;
wherein the price point records mapping step comprises the reconfigurable logic device mapping a plurality of the limit order events to the regional and composite price point records corresponding to the financial instruments for their associated limit orders;
wherein the updating step comprises the reconfigurable logic device updating the determined limit order records, the determined regional price point records, and the determined composite price point records based on the limit order events; and
wherein the appending step comprises the reconfigurable logic device, for those limit order events that are mapped to limit order records, regional price point records, and composite price point records, appending at least one limit order record field from the updated limit order records, at least one price point record field from the updated regional price point records, and at least one price point record field from the updated composite price point records to the limit order events to generate the enriched limit order events.

34. The method of claim 33 wherein the mapped regional price point record for at least one of the limit order events includes a regional price point record field that comprises a regional price volume and a regional price point record field that comprises a regional price count;
wherein the mapped composite price point record for the at least one limit order event includes a composite price point record field that comprises a composite price volume and a composite price point record field that comprises a composite price count;
wherein the updating step comprises the reconfigurable logic device (1) computing an updated regional price volume and an updated regional price count for the mapped regional price point record based on the at least one limit order event, (2) computing an updated composite price volume and an updated composite price count for the mapped composite price point record based on the at least one limit order event, (3) updating the mapped regional price point record with the updated regional price volume and the updated regional price count, and (4) updating the mapped composite price point record with the updated composite price volume and the updated composite price count; and
wherein the appending step comprises the reconfigurable logic device appending the updated regional price volume, the updated regional price count, the updated composite price volume, and the updated composite price count to the at least one limit order event.

35. The method of claim 22 wherein the mapped limit order record for at least one of the limit order events includes a limit order record field that comprises an interest vector indicative of which of a plurality of subscribers are interested in the mapped limit order record, and wherein the mapped price point record for the at least one limit order event includes a price point record field that comprises an interest vector indicative of which of the subscribers are interested in the mapped price point record;

wherein the processing step further comprises the reconfigurable logic device combining the interest vectors from the mapped limit order record and the mapped price point record into a consolidated interest vector; and wherein the appending step comprises the reconfigurable logic device appending the consolidated interest vector to the at least one limit order event.

36. The method of claim 35 further comprising selectively communicating the streaming enriched limit order events to a plurality of downstream subscribers in accordance with their appended consolidated interest vectors.

37. The method of claim 22 wherein the updating step comprises the reconfigurable logic device updating the mapped limit order records and the mapped price point records in parallel using separate hardware logic to update the mapped limit order records and the mapped price point records.

38. The method of claim 22 wherein at least one of limit order events includes data indicative of whether the at least one limit order event is an addition, modification, or deletion event; and wherein the appending step comprises the reconfigurable logic device appending data from the mapped limit order record for the at least one limit order event based on the data indicative of whether the limit order event is an addition, modification, or deletion event.

39. The method of claim 22 wherein the generating step further comprises the reconfigurable logic device normalizing the enriched limit order event, the method further comprising:

communicating the streaming normalized enriched limit order events to a plurality of downstream subscribers.

40. The method of claim 22 wherein the memory comprises a first physical memory in which the limit order records are stored and a second physical memory in which the price point records are stored.

41. An apparatus comprising:

a reconfigurable logic device configured to (1) receive streaming data representative of a plurality of limit order events pertaining to a plurality of financial instruments, (2) process the streaming data to determine order book data associated with the limit order events, and (3) generate a stream of enriched limit order events, wherein the enriched limit order events are enriched with data indicative of the determined order book data.

42. The apparatus of claim 41 wherein the reconfigurable logic device is further configured to generate the stream of enriched limit order events by appending a plurality of data fields to a plurality of limit order events.

43. The apparatus of claim 42 wherein the reconfigurable logic device is further configured to generate the stream of enriched limit order events by appending at least one price volume field to a limit order event.

44. The apparatus of claim 43 wherein the at least one price volume field comprises a regional price volume field.

45. The apparatus of claim 43 wherein the at least one price volume field comprises a composite price volume field.

46. The apparatus of claim 42 wherein the reconfigurable logic device is further configured to generate the stream of enriched limit order events by appending at least one price order count field to a limit order event.

47. The apparatus of claim 46 wherein the at least one price order count field comprises a regional price order count field.

48. The apparatus of claim 46 wherein the at least one price order count field comprises a composite price order count field.

49. The apparatus of claim 42 wherein the reconfigurable logic device is further configured to generate the stream of enriched limit order events by appending at least one order attribute vector field to the limit order event, the order attribute vector indicative of an impact of an attribute on an order book associated with a limit order event.

50. The apparatus of claim 42 wherein the reconfigurable logic device is further configured to generate the stream of enriched limit order events by appending at least one price attribute vector field to the limit order event, the price attribute vector indicative of an impact of an attribute on a price point order book associated with a limit order event.

51. The apparatus of claim 50 wherein the at least one price attribute vector field comprises a regional price attribute vector field.

52. The apparatus of claim 49 wherein the at least one price attribute vector field comprises a composite price attribute vector field.

53. The apparatus of claim 42 wherein the reconfigurable logic device is further configured to generate the stream of enriched limit order events by appending at least one sort order field to a limit order event, the sort order field being indicative of a relative position of the limit order event within an associated order book.

54. The apparatus of claim 53 wherein the sort order field is indicative of a relative position of the limit order event within an associated price aggregated order book.

55. The apparatus of claim 53 wherein the sort order field is indicative of a relative position of the limit order event within an associated composite price aggregated order book.

56. The apparatus of claim 42 wherein the reconfigurable logic device is further configured to generate the stream of enriched limit order events by appending at least one interest vector field to a limit order event, the interest vector field being indicative of which of a plurality of client applications are interested in receiving the enriched limit order event.

57. The apparatus of claim 56 wherein the interest vector field is further indicative of which fields of the enriched limit order event each of the plurality of client applications are interested in receiving.

58. The apparatus of claim 41 wherein the reconfigurable logic device is further configured to (1) resolve each of a plurality of limit order events to at least one record associated with an order book in a data structure, and (2) update the records based on the content of the plurality of limit order events.

59. The apparatus of claim 41 wherein the enriched limit order events comprises a stream view of a plurality of order books associated with the limit order events.

60. The apparatus of claim 41 wherein the enriched limit order events comprises a summary view of a plurality of order books associated with the limit order events.

61. The apparatus of claim 41 wherein the reconfigurable logic device is resident within a ticker plant.

62. The apparatus of claim 41 wherein each of the limit order events is associated with a limit order for the financial instrument to which it pertains, the apparatus further comprising:

a memory in which the order book data is stored, the order book data comprising (1) a plurality of limit order records corresponding to a plurality of limit orders for a plurality of financial instruments and (2) a plurality of price point records corresponding to financial instruments for which there are limit order records, the limit order records comprising a plurality of limit order record fields, and the price point records comprising a plurality of price point record fields;

wherein the reconfigurable logic device is further configured to (1) perform the processing operation by (i) mapping a plurality of the limit order events to the limit order records corresponding to their associated limit orders, (ii) mapping a plurality of the limit order events to the price point records corresponding to the financial instruments for their associated limit orders, and (iii) updating the mapped limit order records and the mapped price point records based on the limit order events, and perform the generation operation by, for those limit order events that are mapped to limit order records and price point records, appending at least one limit order record field from the updated limit order records and at least one price point record field from the updated price point records to those limit order events to generate enriched limit order events.

63. The apparatus of claim 62 wherein the reconfigurable logic device is further configured to (1) perform the processing operation and the generation operation at hardware processing speeds as the limit order events stream through the reconfigurable logic device, (2) directly generate the stream of enriched limit order events from the received streaming data, and (3) communicate the stream of enriched limit order events downstream.

64. The apparatus of claim 62 wherein the mapped limit order record for at least one of the limit order events includes a limit order record field that comprises an identifier for an attribute with respect to the mapped limit order record; and wherein the reconfigurable logic device is further configured to append the attribute identifier to the at least one limit order event.

65. The apparatus of claim 64 wherein the attribute identifier is indicative of whether the mapped limit order record pertains to an ephemeral regional order.

66. The apparatus of claim 64 wherein the attribute identifier is indicative of whether the mapped limit order record relates to an implied liquidity.

67. The apparatus of claim 62 wherein the mapped limit order record for at least one of the limit order events includes a limit order record field that comprises an attribute identifier indicative of whether the mapped limit order record pertains to an ephemeral regional order and a limit order record field that comprises an attribute identifier indicative of whether the mapped limit order record relates to an implied liquidity, the ephemeral regional order attribute identifier and the implied liquidity attribute identifier serving as an attribute vector; and wherein the reconfigurable logic device is further configured to append the attribute vector to the at least one limit order event.

68. The apparatus of claim 62 wherein the mapped price point record for at least one of the limit order events includes a price point record field that comprises an identifier for an attribute with respect to the mapped price point record; and wherein the reconfigurable logic device is further configured to append the attribute identifier to the at least one limit order event.

69. The apparatus of claim 68 wherein the attribute identifier is indicative of whether the mapped price point record includes price data pertaining to one or more ephemeral regional orders;

wherein the mapped price point record for the at least one limit order event further includes a price point record field that comprises a volume for the one or more ephemeral regional orders and a price point record field that comprises a count for the one or more ephemeral regional orders; and wherein the reconfigurable logic device is further configured to append the ephemeral regional order volume and the ephemeral regional order count to the at least one limit order event.

70. The apparatus of claim 68 wherein the attribute identifier is indicative of whether the mapped price point record includes price data that relates to implied liquidity;

wherein the mapped price point record for the at least one limit order event further includes a price point record field that comprises a volume for the implied liquidity and a price point record field that comprises a count for the implied liquidity; and wherein the reconfigurable logic device is further configured to append the implied liquidity volume and the implied liquidity count to the at least one limit order event.

71. The apparatus of claim 62 wherein the mapped price point record for at least one of the limit order events includes (1) a price point record field that comprises an attribute identifier indicative of whether the mapped price point record includes price data pertaining to one or more ephemeral regional orders, (2) a price point record field that comprises a volume for the one or more ephemeral regional orders, (3) a price point record field that comprises a count for the one or more ephemeral regional orders, (4) a price point record field that comprises an attribute identifier indicative of whether the mapped price point record includes price, data that relates to implied liquidity, (5) a price point record field that comprises a volume for the implied liquidity and (6) a price point record field that comprises a count for the implied liquidity;

wherein the ephemeral regional order attribute identifier, the ephemeral regional order volume, the ephemeral regional order count, the implied liquidity attribute identifier, the implied liquidity volume, and the implied liquidity count serve as an attribute vector; and wherein the reconfigurable logic device is further configured to append the attribute vector to the at least one limit order event.

72. The apparatus of claim 62 wherein the mapped price point record for at least one of the limit order events includes a price point record field that comprises a price volume and a price point record field that comprises a price count;

wherein the reconfigurable logic device is further configured to perform the update operation by (1) computing an updated price volume and an updated price count for the mapped price point record based on the at least one limit order event, and (2) updating the mapped price point record with the updated price volume and the updated price count; and wherein the reconfigurable logic device is further configured to append the updated price volume and the updated price count to the at least one limit order event.

73. The apparatus of claim 62 wherein the price point records comprise a plurality of regional price point records and a plurality of composite price point records;

wherein the reconfigurable logic device is further configured to perform the price point records mapping operation by mapping a plurality of the limit order events to the regional and composite price point records corresponding to the financial instruments for their associated limit orders;

wherein the reconfigurable logic device is further configured to perform the update operation by updating the mapped limit order records, the mapped regional price point records, and the mapped composite price point records based on the limit order events; and wherein the reconfigurable logic device is further configured to, for those limit order events that are mapped to limit order records, regional price point records, and composite price point records, append at least one limit order record field from the updated limit order records, at least one price point record field from the updated regional price point records, and at least one price point record field from the updated composite price point records to the limit order events to generate the enriched limit order events.

74. The apparatus of claim 73 wherein the mapped regional price point record for at least one of the limit order events includes a regional price point record field that comprises a regional price volume and a regional price point record field that comprises a regional price count;

wherein the mapped composite price point record for the at least one limit order event includes a composite price point record field that comprises a composite price volume and a composite price point record field that comprises a composite price count;

wherein the reconfigurable logic device is further configured to perform the update operation by (1) computing an updated regional price volume and an updated regional price count for the mapped regional price point record based on the at least one limit order event, (2) computing an updated composite price volume and an updated composite price count for the mapped composite price point record based on the at least one limit order event, (3) updating the mapped regional price point record with the updated regional price volume and the updated regional price count, and (4) updating the mapped composite price point record with the updated composite price volume and the updated composite price count; and wherein the reconfigurable logic device is further configured to append the updated regional price volume, the updated regional price count, the updated composite price volume, and the updated composite price count to the at least one limit order event.

75. The apparatus of claim 62 wherein the mapped limit order record for at least one of the limit order events includes a limit order record field that comprises an interest vector indicative of which of a plurality of subscribers are interested in the mapped limit order record, and wherein the mapped price point record for the at least one limit order event includes a price point record field that comprises an interest vector indicative of which of the subscribers are interested in the mapped price point record;

wherein the reconfigurable logic device is further configured to perform the processing operation by combining the interest vectors from the mapped limit order record and the mapped price point record into a consolidated interest vector; and wherein the reconfigurable logic device is further configured to append the consolidated interest vector to the at least one limit order event.

76. The apparatus of claim 75 wherein the reconfigurable logic device is further configured to selectively communicate the streaming enriched limit order events to a plurality of downstream subscribers in accordance with their appended consolidated interest vectors.

77. The apparatus of claim 62 wherein the reconfigurable logic device comprises order engine hardware logic and price engine hardware logic, wherein the order engine hardware logic is configured update the mapped limit order records, wherein the price engine hardware logic is configured to update the mapped price point records, wherein the order engine hardware logic and the price engine hardware logic are configured to operation in parallel.

78. The apparatus of claim 62 wherein at least one of limit order events includes data indicative of whether the at least one limit order event is an addition, modification, or deletion event; and wherein the reconfigurable logic device is further configured to append data from the mapped limit order record for the at least one limit order event based on the data indicative of whether the limit order event is an addition, modification, or deletion event.

79. The apparatus of claim 62 wherein the reconfigurable logic device is further configured to (1) perform the generation operation by normalizing the enriched limit order event, and (2) communicate the streaming normalized enriched limit order events to a plurality of downstream subscribers.

80. The apparatus of claim 62 wherein the memory comprises a first physical memory in which the limit order records are stored and a second physical memory in which the price point records are stored.

81. A method comprising:
streaming data representative of a plurality of limit order events into a reconfigurable logic device, wherein each of the limit order events is associated with a limit order for a financial instrument;

accessing order book data in a memory, the order book data comprising (1) a plurality of limit order records corresponding to a plurality of limit orders for a plurality of financial instruments and (2) a plurality of price point records corresponding to financial instruments for which there are limit order records, the limit order records comprising a plurality of limit order record fields, and the price point records comprising a plurality of price point record fields;

the reconfigurable logic device mapping a plurality of the limit order events to the limit order records corresponding to their associated limit orders;

the reconfigurable logic device mapping a plurality of the limit order events to the price point records corresponding to the financial instruments for their associated limit orders;

the reconfigurable logic device updating the mapped limit order records and the mapped price point records based on the limit order events;

the reconfigurable logic device, for those limit order events that are mapped to limit order records and price point records, appending at least one limit order record field from the updated limit order records and at least one price point record field from the updated price point records to those limit order events to directly generate a plurality of enriched limit order events from the streaming data; and the reconfigurable logic device sending the enriched limit order events downstream; wherein the reconfigurable logic device performs its respective steps at hardware processing speeds as the limit order events stream through.

82. The method of claim 81 further comprising:
the reconfigurable logic device, for each limit order event that does not map to any limit order record and does not map to any price point record, creating and storing a limit order record and a price point record in the memory for that limit order event; and
the reconfigurable logic device, for each limit order event that maps to a limit order record and does not map to any price point record, (1) creating and storing a price point record in the memory for that limit order event, and (2) appending at least one limit order record field from the updated limit order record for that limit order event to directly generate an enriched limit order event from the streaming data for that limit order event.

* * * * *